(12) United States Patent
Scheuring et al.

(10) Patent No.: US 9,976,332 B2
(45) Date of Patent: May 22, 2018

(54) ELECTROMECHANICAL STRUT WITH INTEGRATED FLEX COUPLING AND SLIP DEVICE AND CLUTCH/COUPLING ASSEMBLY THEREFOR

(71) Applicant: MAGNA CLOSURES INC., Newmarket (CA)

(72) Inventors: Joseph Scheuring, Richmond Hill (CA); Wieslaw Nowicki, Mississauga (CA)

(73) Assignee: MAGNA CLOSURES INC., Newmarket (CA)

(*) Notice: Subject to any disclaimer, the term of this patent is extended or adjusted under 35 U.S.C. 154(b) by 213 days.

(21) Appl. No.: 14/750,042

(22) Filed: Jun. 25, 2015

(65) Prior Publication Data

US 2015/0376929 A1 Dec. 31, 2015

Related U.S. Application Data

(60) Provisional application No. 62/024,736, filed on Jul. 15, 2014, provisional application No. 62/018,102, filed on Jun. 27, 2014.

(51) Int. Cl.
*E05F 15/00* (2015.01)
*E05F 15/622* (2015.01)
(Continued)

(52) U.S. Cl.
CPC ............ *E05F 15/622* (2015.01); *F16D 43/21* (2013.01); *F16H 25/24* (2013.01);
(Continued)

(58) Field of Classification Search
CPC ............ E05F 15/622; E05Y 2201/216; E05Y 2900/546; F16D 41/064; F16D 2041/0665; F16D 41/066; F16H 24/24; F16H 25/24
See application file for complete search history.

(56) References Cited

U.S. PATENT DOCUMENTS 3,542,178 A * 11/1970 Ripple .................... F16D 1/101
192/108
3,552,145 A 1/1971 Barton et al.
(Continued)

FOREIGN PATENT DOCUMENTS

EP 1086317 A2 3/2001
*Primary Examiner* — Stacey Fluhart
(74) *Attorney, Agent, or Firm* — Dickinson Wright PLLC

(57) ABSTRACT

An electromechanical strut is provided for moving a pivotal closure member between an open position and a closed position relative to a motor vehicle body. The electromechanical strut includes a housing connected to one of the closure member and the motor vehicle body. An extensible shaft is connected to the other of the closure member and the motor vehicle body for slidable movement relative to the housing. A motor-gear assembly operably drives a rotatable power screw. A drive mechanism converts rotary motion of the power screw into linear motion of the extensible shaft to move the extensible shaft between a retracted position corresponding to the closed position of the closure member and an extended position corresponding to the open position of the closure member. A clutch/coupling assembly is operably disposed between the motor-gear assembly and the power screw and integrates a slip clutch device and a flexible coupling into a common unit.

41 Claims, 37 Drawing Sheets

(51) Int. Cl.
  *F16D 43/21* (2006.01)
  *F16H 25/24* (2006.01)
  *F16D 41/064* (2006.01)
  *F16H 25/20* (2006.01)

(52) U.S. Cl.
  CPC ... *E05Y 2201/216* (2013.01); *E05Y 2201/236* (2013.01); *E05Y 2900/546* (2013.01); *F16D 41/064* (2013.01); *F16H 2025/2071* (2013.01); *F16H 2025/2087* (2013.01)

(56) References Cited

U.S. PATENT DOCUMENTS

| | | | |
|---|---|---|---|
| 4,346,749 A * | 8/1982 | Singletary | E06B 9/90 160/301 |
| 4,357,137 A | 11/1982 | Brown | |
| 4,479,394 A * | 10/1984 | Greenwood | F02N 15/063 192/52.3 |
| 4,687,082 A * | 8/1987 | Lenfeldt | F16D 7/048 192/110 R |
| 5,267,903 A | 12/1993 | Kuribayashi | |
| 5,522,489 A * | 6/1996 | Savkar | F16D 41/064 192/41 R |
| 6,516,567 B1 | 2/2003 | Stone et al. | |
| 6,761,503 B2 | 7/2004 | Breese | |
| 7,052,399 B2 | 5/2006 | Duggan | |
| 7,938,473 B2 | 5/2011 | Paton et al. | |
| 8,001,861 B2 | 8/2011 | Fisher et al. | |
| 2004/0084265 A1 | 5/2004 | Muller et al. | |
| 2006/0082188 A1* | 4/2006 | Mitchell | E05F 1/1008 296/146.8 |
| 2008/0060273 A1 | 3/2008 | Bochen et al. | |
| 2008/0238253 A1* | 10/2008 | Hamasaki | F16D 41/061 310/323.02 |
| 2012/0000304 A1 | 1/2012 | Hamminga et al. | |
| 2013/0119212 A1* | 5/2013 | Benjamin | F16D 41/06 248/188.2 |

* cited by examiner

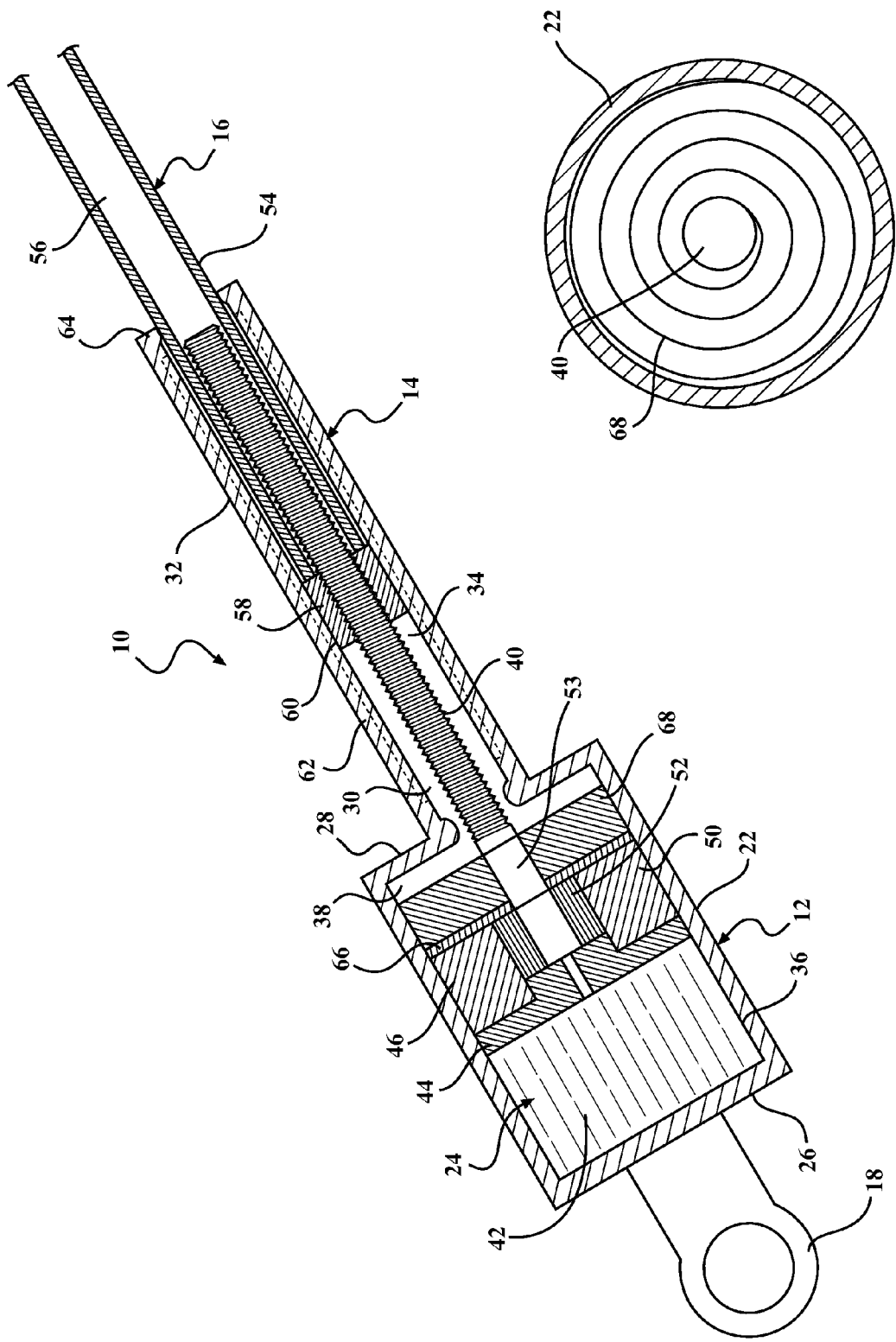

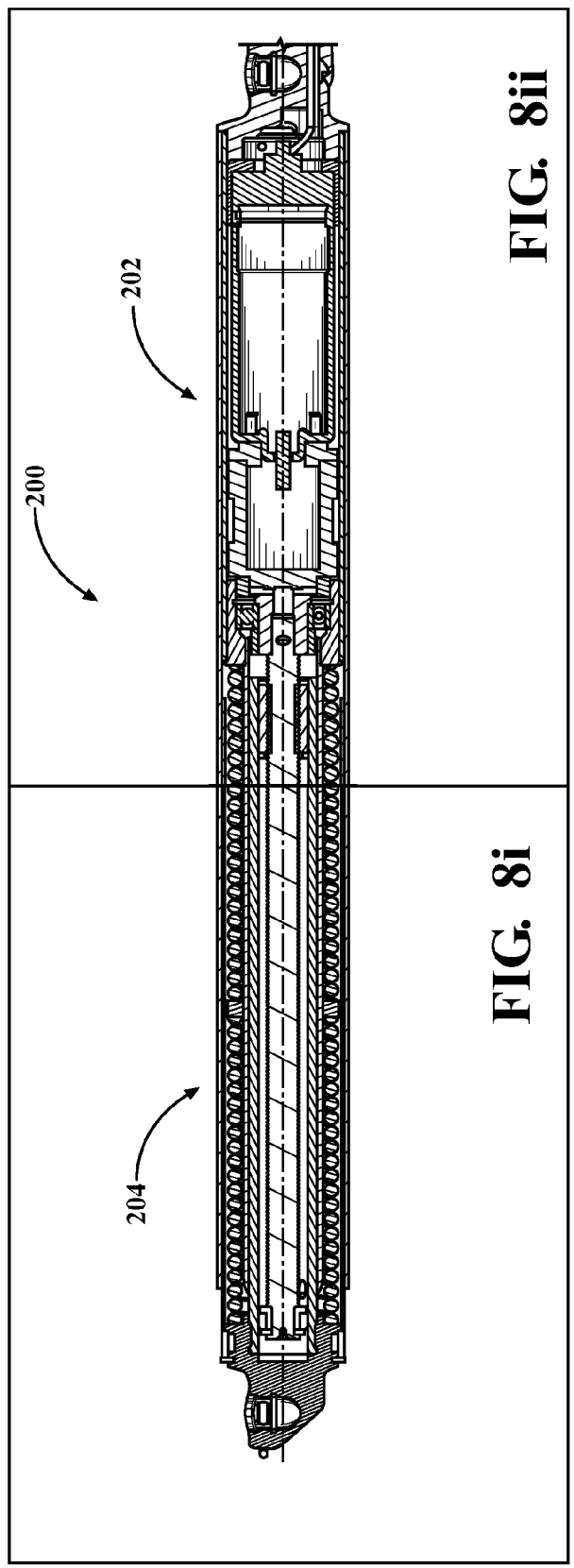

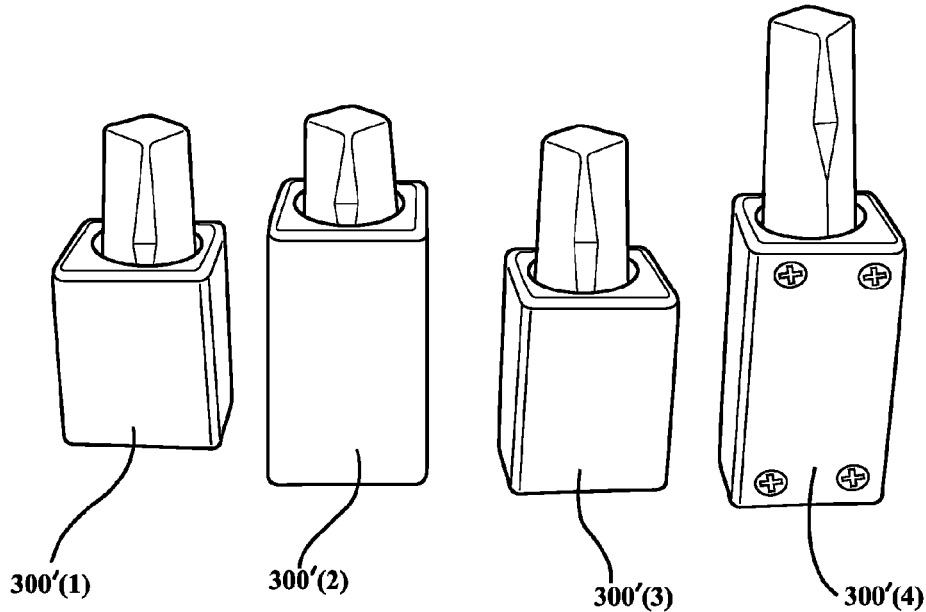

FIG. 18

| Sample #1 | Sample #2 | Sample #3 | Sample #4 |
|---|---|---|---|
| Outer Tube: | Outer Tube: | Outer Tube: | Outer Tube: |
| Polycarbonate | Polycarbonate | Steel | Steel |
| 25.5 mm outside | 25.5 mm outside | 25.4 mm outside | 25.4 mm outside |
| 21.2 mm inside | 21.2 mm inside | 22.4 mm inside | 22.4 mm inside |
| Inner Tube | Inner Tube | Inner Tube | Inner Tube |
| Delrin | Steel | Steel | Steel |
| 12.7 mm square | 12.7 mm square | 12.7 mm square | 12.7 mm square |
| 1.5 x 45* chamfer | 1.5 x 45* chamfer | 1.5 x 45* chamfer | 1.5 x 45* chamfer |
| Plugs (4X) | Plugs (4X) | Plugs (4X) | Plugs (4X) |
| 7.94 mm OD | 7.94 mm OD | 9.525 mm OD | 9.525 mm OD |
| ~20 mm long | ~30 mm long | ~20 mm long | ~30 mm long |
| Silicone rubber | Silicone rubber | Silicone rubber | Silicone rubber |
| Durometer: 70A | Durometer: 70A | Durometer: 70A | Durometer: 70A |
| | | | |
| Slip Data (Nm) | Slip Data (Nm) | Slip Data (Nm) | Slip Data (Nm) |
| (15 CW, 15 CCW) | (15 CW, 15 CCW) | (15 CW, 15 CCW) | (15 CW, 15 CCW) |
| +20°C: 1.848 +/-11.3% | +20°C: 2.375 +/-7.4% | +20°C: 2.789 +/-12.3% | +20°C: 3.475 +/-12.3% |
| -30°C: 1.779 +/-21.3% | -30°C: 2.327 +/-21.8% | -30°C: 2.354 +/-11.0% | -30°C: 3.439 +/-11.0% |
| -30°C Shift: -3.7% | -30°C Shift: -2.0% | -30°C Shift: -15.0% | -30°C Shift: -1.0% |

FIG. 18A

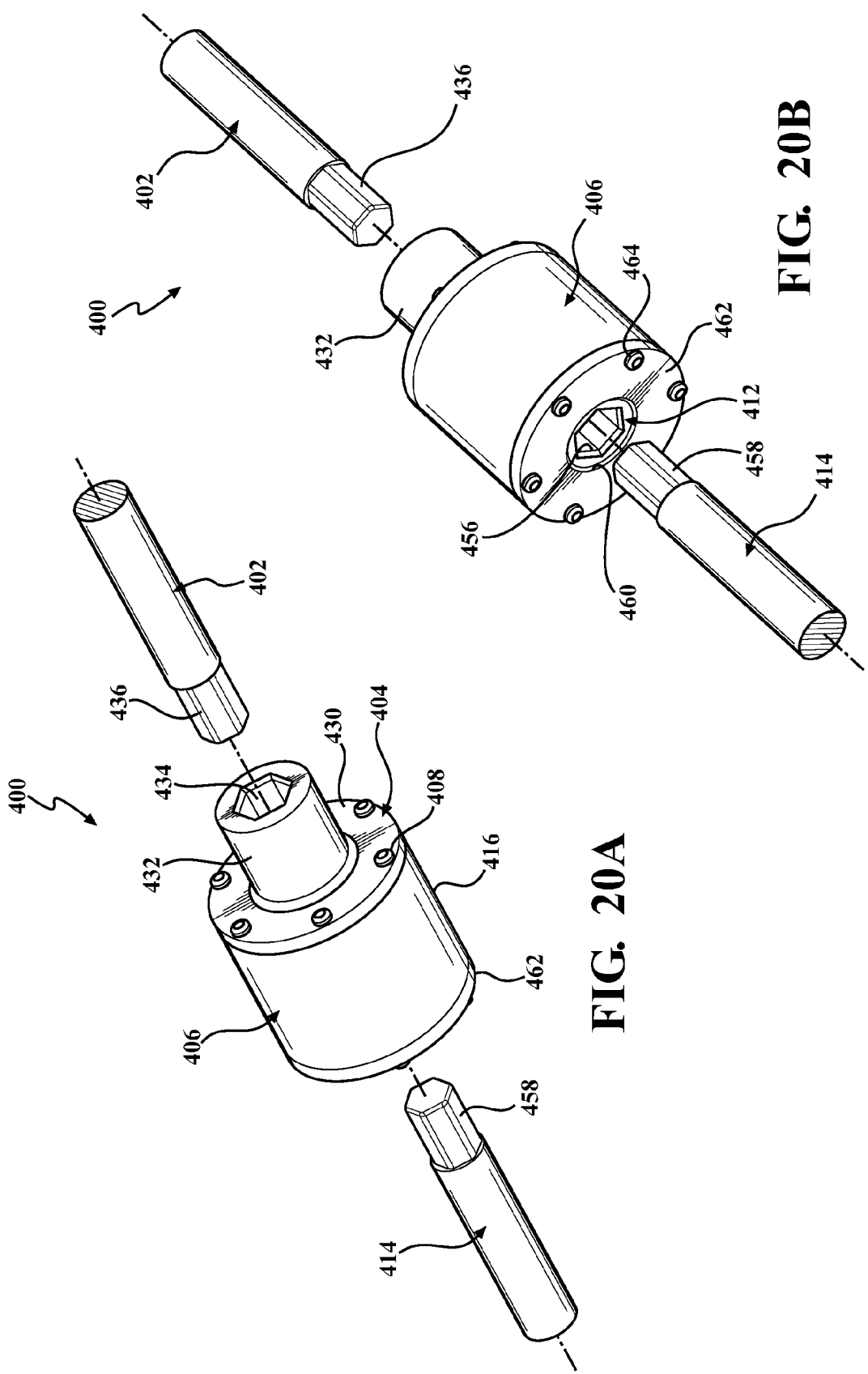

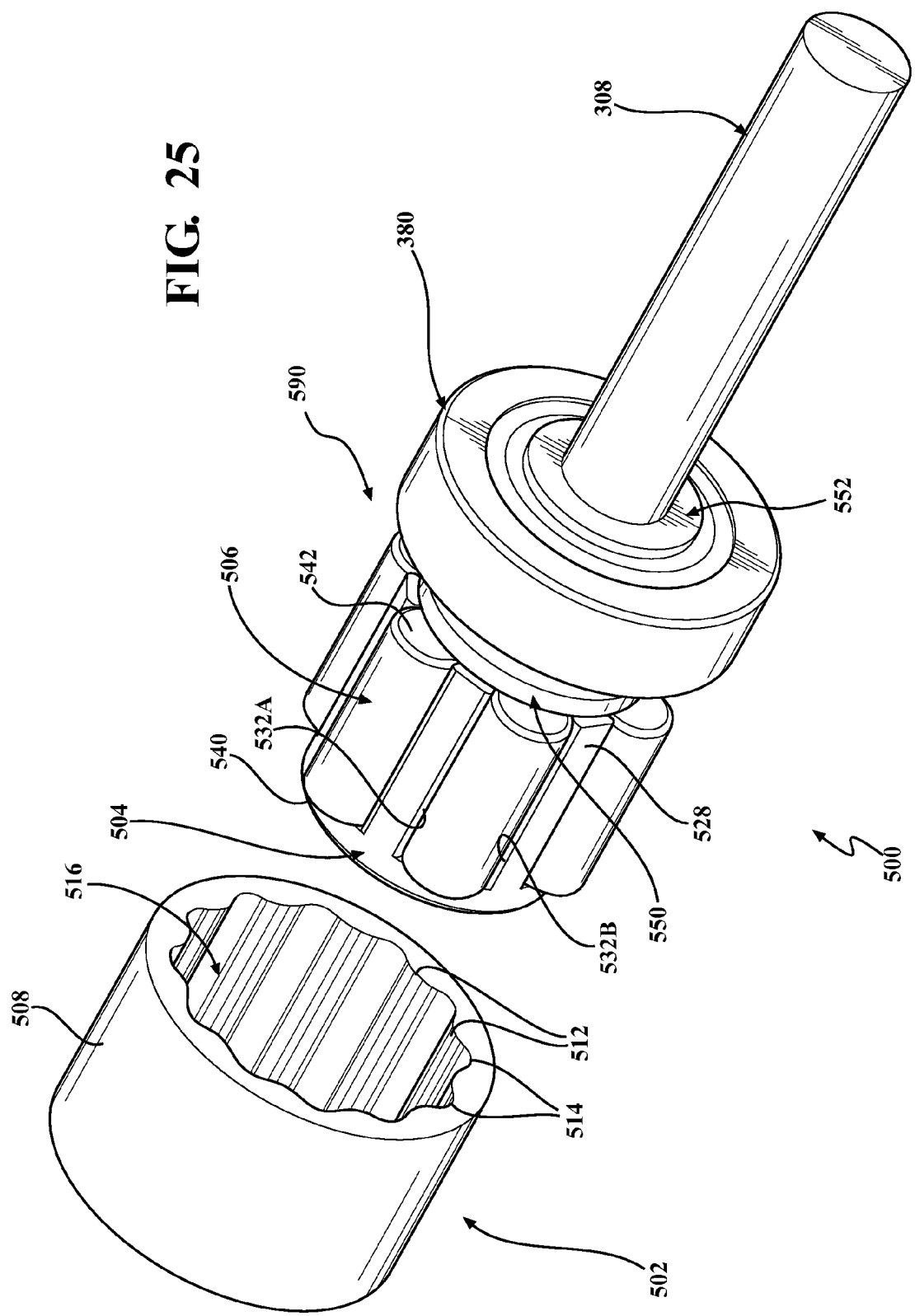

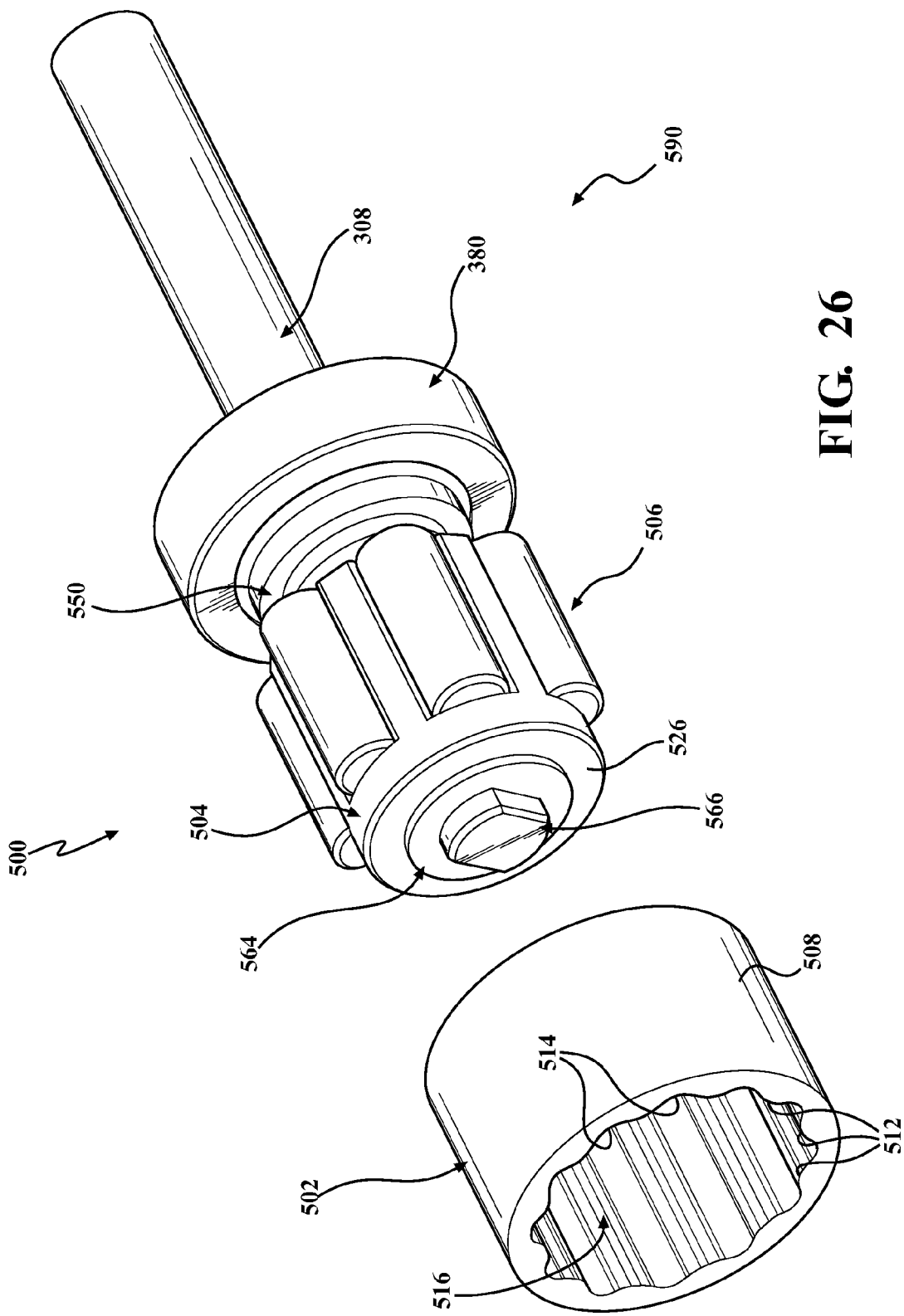

ELECTROMECHANICAL STRUT WITH INTEGRATED FLEX COUPLING AND SLIP DEVICE AND CLUTCH/COUPLING ASSEMBLY THEREFOR

CROSS-REFERENCE TO RELATED APPLICATIONS

This application claims the benefit of U.S. Provisional Application Ser. No. 62/018,102, filed Jun. 27, 2014, and the benefit of U.S. Provisional Application Ser. No. 62/024,736, filed Jul. 15, 2014, both of which are incorporated herein by reference in their entirety.

FIELD OF THE INVENTION

The present disclosure relates to an electrically-driven mechanical strut. More particularly, the present disclosure relates to an electromechanical strut used to raise or lower an automotive lift gate.

BACKGROUND OF THE INVENTION

This section provides background information which is not necessarily prior art to the inventive concepts associated with the present disclosure.

Lift gates provide a convenient access to the cargo areas of hatchbacks, wagons, and other utility vehicles. Typically, the lift gate is hand operated, requiring manual effort to move the lift gate between the open and the closed positions. Depending on the size and weight of the lift gate, this effort can be difficult for some users. Additionally, manually opening or closing a lift gate can b e inconvenient, particularly when the user's hands are full.

Attempts have been made to reduce the effort and inconvenience of opening or closing a lift gate. One solution is to pivotally mount gas struts to both the vehicle body and the lift gate, reducing the force required for opening the lift gate. However, the gas struts also hinder efforts to close the lift gate, as the struts re-pressurize upon closing, increasing the effort required. Additionally, the efficacy of the gas struts vary according to the ambient temperature. Furthermore, the use of gas struts still requires that the lift gate is manually opened and closed.

U.S. Pat. No. 6,516,567 to Stone et al. (hereafter referred to as the '567 patent) provides a power actuator that works in tandem with a gas strut. The '567 power actuator comprises a motor mounted within the vehicle body coupled to a flexible rotary cable by a clutch. The flexible rotary cable drives an extensible strut that is pivotally mounted to both the vehicle body and the lift gate. Thus, the motor can raise or lower the lift gate conveniently without manual effort. A controller to engage and disengage the motor can be connected to a remote key fob button or a button in the passenger compartment, providing additional convenience. However, the power actuator described in the '567 patent is not without its disadvantages. The power actuator is comprised of multiple parts, each of which needs to be assembled and mounted to the vehicle separately, increasing costs. The vehicle body must be specifically designed to provide a space to house the motor. Due to the limited space available, the motor is small and requires the assistance of the gas strut. Additionally, because the power actuator described in the '567 patent is designed to work in tandem with a gas strut, the gas strut can still vary in efficacy due to temperature. Thus, the motor provided must be balanced to provide the correct amount of power with varying degrees of mechanical assistance from the gas strut.

U.S. Publication No. US2004/0084265 to Muller (hereinafter referred to as the '265 publication) provides various examples of power actuators working in tandem with gas struts and several alternative examples of electromechanical power actuators. These electromechanical power actuators include an electric motor coupled via a flexible rotary cable to a gearset which, in turn, is coupled via a slip clutch to a rotatable piston rod. Rotation of the piston rod causes a spindle drive mechanism to translate an extensible strut that is adapted to be pivotally mounted to one of the vehicle body and the lift gate. The slip clutch functions to permit the piston rod to rotate relative to the gearset when a torque exceeding its preload is exerted on the lift gate so as to accommodate manual operation of the lift gate without damaging the electromechanical power actuator. More specifically, the slip clutch releasably couples the gearset to the piston rod whereby, during normal operation, powered opening and closing of the lift gate is provided. However, when a high level force is applied to the extensible strut which attempts to back drive the spindle drive mechanism in response to excessive or abusive manual operation of the lift gate, the slip clutch momentarily releases the drive connection between the piston rod and the gearset to avoid mechanical damage to the system. The '265 publication also illustrates use of a helical compression spring to provide a counter balancing force against the weight of the lift gate.

U.S. Publication No. US2012/0000304 to Hamming et al (hereinafter the '304 publication) discloses several embodiments of power drive mechanisms for moving trunk lids and lift gates between open and closed positions. The power drive mechanisms have an offset configuration employing an electric motor-driven worm gearset to rotate an externally-threaded jackscrew for translating an extensible strut. A slip clutch is shown to be disposed between an output gear of the worm gearset and the rotatable jackscrew. In addition, a coupler unit is provided between the motor output shaft and the worm of the worm gearset. The coupler unit includes a first coupler member fixed for rotation with the worm shaft, a second coupler member fixed for rotation with the motor output shaft, and a resilient spider interdigitated, between fingers extending from the first and second coupler members. The resilient coupler provides axial and circumferential isolation between the first and second coupler members and functions to absorb transient or torsional shock loads between the motor shaft and the worm shaft.

U.S. Publication No. US2008/0060273 to Bochen et. al (hereinafter the '273 publication) discloses a collinear or strut-type drive device configured to house the electric motor, the slip clutch and the rotary threaded spindle unit in a common housing from which an extensible strut is guided in a telescopic manner. The slip clutch permits limited axial movement between a pair of frictionally engaged clutch members to permit relative rotation between the motor shaft and the threaded spindle shaft when required to accommodate overload conditions.

In view of the above, it is evident that electromechanical drive mechanisms of the type used in trunk lid and lift gate powered closure systems are commonly equipped with a slip clutch to accommodate manual operation as well as a resilient coupler unit to accommodate misalignment and shock loads. However, these devices can increase the cost and complexity of powered actuators as well as impact the available packaging requirements.

It is therefore desired to provide a means for raising and lowering a vehicle trunk lid or lift gate that obviates or mitigates at least one of the above-identified disadvantages of the prior art.

SUMMARY OF THE INVENTION

This section provides a general summary of the disclosure and is not a comprehensive disclosure of its full scope or all of its features, aspects or objectives.

Accordingly, it is an aspect of the present disclosure to provide an electromechanical strut for use in a powered closure system in a motor vehicle for controlling movement of a closure member between an open position and a closed position.

It is a related aspect of the present disclosure to provide an electromechanical strut for use in a power lift gate system of a motor vehicle.

It is a further aspect of the present disclosure to provide an electromechanical strut equipped with a slip device and a flex coupling integrated into a common assembly.

As a further aspect of the present disclosure, an integrated flex coupling and slip clutch device, hereinafter referred to as a "clutch/coupling assembly", includes a first coupling member coupled for rotation with the output of the motor-gear assembly; a second coupling member coupled for rotation with the input of the rotary component; and a plurality of resilient flex members biased into engagement with at least one of the first and second coupling members allowing axial misalignment between the motor gear-assembly and the input, and a slip clutch device allowing relative rotation between the motor gear assembly and the input.

In accordance with a further aspect of the invention, the first coupling member can have a drive chamber defining a non-circular inner surface, the second coupling member can have a non-circular outer surface that is configured to be disposed within the drive chamber, and the flex member can have a plurality of resilient plugs configured to be preloaded into engagement with both of the inner and outer surfaces so as to normally transfer torque without slip between the first and second tubular members while accommodating axial, concentric and angular misalignment therebetween. When a torque overload condition occurs, the resilient plugs permit relative rotation between the first and second coupling members to provide a slip clutch functionality.

In accordance with these and other aspects of the present disclosure, an electromechanical strut is provided for moving a pivotal closure panel relative to a motor vehicle body between a closed position and an open position. The electromechanical strut comprises a housing operably connected to one of the motor vehicle body and pivotal closure panel; a motor disposed in the housing; a power screw; a motor gear-assembly operably connecting the motor to the power screw; an extensible member slidably moveable relative to the housing and the power screw, the extensible member being operably connected to the other of the pivotal closure panel and the motor vehicle body; a drive mechanism operable for converting rotary motion of said power screw into linear motion of said extensible member to move the extensible member between a retracted position relative to the housing and an extended position relative to the housing; and a clutch/coupling assembly operably coupling the motor-gear assembly to said power screw, wherein said clutch coupling assembly integrates a flex coupling device allowing axial misalignment between the motor gear-assembly and the power screw and a slip clutch device allowing relative rotation between the motor gear assembly and the power screw into a common assembly.

In accordance with a further aspect of the invention, the clutch/coupling assembly integrates a slip clutch device and a resilient coupling unit into a compact arrangement and provides a torque limiting function, a shock damping function, and a misalignment accommodating function.

The present disclosure provides an electromechanical strut using an inline motor coupled to an inline planetary gearset that are both mounted in a first housing. The motor-gear assembly drives a power screw and nut assembly in a second housing for extending and retracting the extensible shaft. Additionally, a power spring mounted coaxially around the power screw urges the extensible shaft to the extended position and provides a mechanical counterbalance to the weight of a lift gate. As the shaft extends, the power spring uncoils and assists the motor-gear assembly in raising the lift gate. Retracting the shaft recoils the spring for storing potential energy. Thus, a lower torque motor-gear assembly can be used, reducing the diameter of the housing. In addition, a clutch/coupling assembly is configured to be arranged inline between an output member of the planetary gear set and an input member of the power screw to define an electromechanical strut having a common longitudinal center line which acts as the rotary axis for the motor, the planetary gearset, the clutch/coupling assembly and the power screw while acting as the translational axis for bi-directional linear movement of the extensible shaft.

In another embodiment, an electromechanical strut is provided for moving a pivotal lift gate between an open position and a closed position relative to a motor vehicle body. The electromechanical strut includes a housing connected to one of the pivotal lift gate and the motor vehicle body. An extensible shaft is slidably mounted to the housing. The extensible shaft is connected to the other of the pivotal lift gate and the motor vehicle body. A drive mechanism includes an electric motor for driving a rotatable power screw. The drive mechanism converts rotary motion of the power screw into linear motion of the extensible shaft to move the extensible shaft between a retracted position corresponding to the closed position of the pivotal lift gate and an extended position corresponding to the open position of the pivotal lift gate. A power spring has one end engaging to the extensible shaft and another end engaging the housing for providing a mechanical counterbalance to the weight of the pivotal lift gate. An integrated flex coupling and slip clutch device is operably disposed between the electric motor and the rotatable power screw.

These and other alternative embodiments are directed to providing an electromechanical strut for use in a powered closure system of a motor vehicle and having a slip clutch device and a flexible drive coupling integrated into a common clutch/coupling assembly to provide multiple functions in a compact arrangement.

In accordance with the present disclosure, the clutch/coupling assembly includes a first coupling member adapted to be driven by the electric motor, a second coupling member adapted to drive the power screw, a plurality of resilient flex components disposed between a non-circular inner surface of the first coupling member and a non-circular outer surface of the second coupling member. The inner surface of the first coupling member and the outer surface of the second coupling member can be configured to permit the second coupling member to rotate relative to the first coupling and the flex components when a torque overload event occurs to facilitate slip between the motor and the power screw. As an alternative, the inner and outer non-circular surfaces can be configured to permit the first coupling member to rotate relative to the second coupling member and the flex components to permit slip between the power screw and the motor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The invention will now be described, by way of example only, with reference to the attached Figures, wherein:

FIG. 2 is a sectional view of the electromechanical struts shown in FIG. 1 constructed in accordance with the present disclosure and shown in an extended position;

FIG. 3 is a sectional view of a spring housing associated with the electromechanical strut shown in FIG. 2;

FIGS. 8, 8*i* and 8*ii* are sectional views of an electromechanical strut constructed according to a fourth embodiment of the present disclosure and shown in a retracted position;

FIGS. 18 and 18A illustrates a plurality of exemplary sample versions of an integrated flex coupling and slip clutch device constructed in accordance with the alternative configuration shown in FIG. 17;

FIGS. 20A and 20B are perspective views, similar to FIGS. 19A and 19B, of the stand-alone version of the integrated flex coupling and slip clutch device shown in a partially exploded arrangement;

FIGS. 25 and 26 are partially exploded views of the integrated flex coupling and slip clutch device shown in FIG. 24;

DETAILED DESCRIPTION

Vehicles, particularly passenger vehicles, are equipped with numerous moveable closure panels for providing openings and access within and through defined portions of the vehicle body. To enhance operator convenience, many vehicles are now equipped with power-operated closure systems to automatically control movement of all types of closure panels including, without limitation, hatch lift gates, trunk and hood deck lids, sliding and hinged doors, sun roofs and the like. The powered mechanical advantage is often provided by an electromechanical drive device including, without limitation, motor driven gear drives, cable drives, chain drives, belt drives and power screw drives. Current development focus is largely directed to improving these popular systems through weight and part count reduction, packaging efficiency, system noise, back drive effort, cost and ease of assembly and service repair. Accordingly, the present disclosure addresses all of these issues.

For purposes of descriptive clarity, the present disclosure is described herein in the context of one or more specific vehicular applications, namely powered lift gate and deck lid systems. However, upon reading the following detailed description in conjunction with the appended drawings, it will be clear that the inventive concepts of the present disclosure can be applied to numerous other systems and applications. In this regard, the present disclosure is generally directed to electromechanical struts having a power-operated drive mechanism comprised of an electric motor, a reduction gearset driven by the electric motor, a rotatable power screw of a threaded spindle assembly, and an integrated flex coupling and slip clutch device that is operably disposed between the gearset and the power screw. The integrated flex coupling and slip clutch device, referred to hereinafter as a "clutch/coupling assembly", combines the structure and function of these two devices into a compact arrangement.

Figure 1:
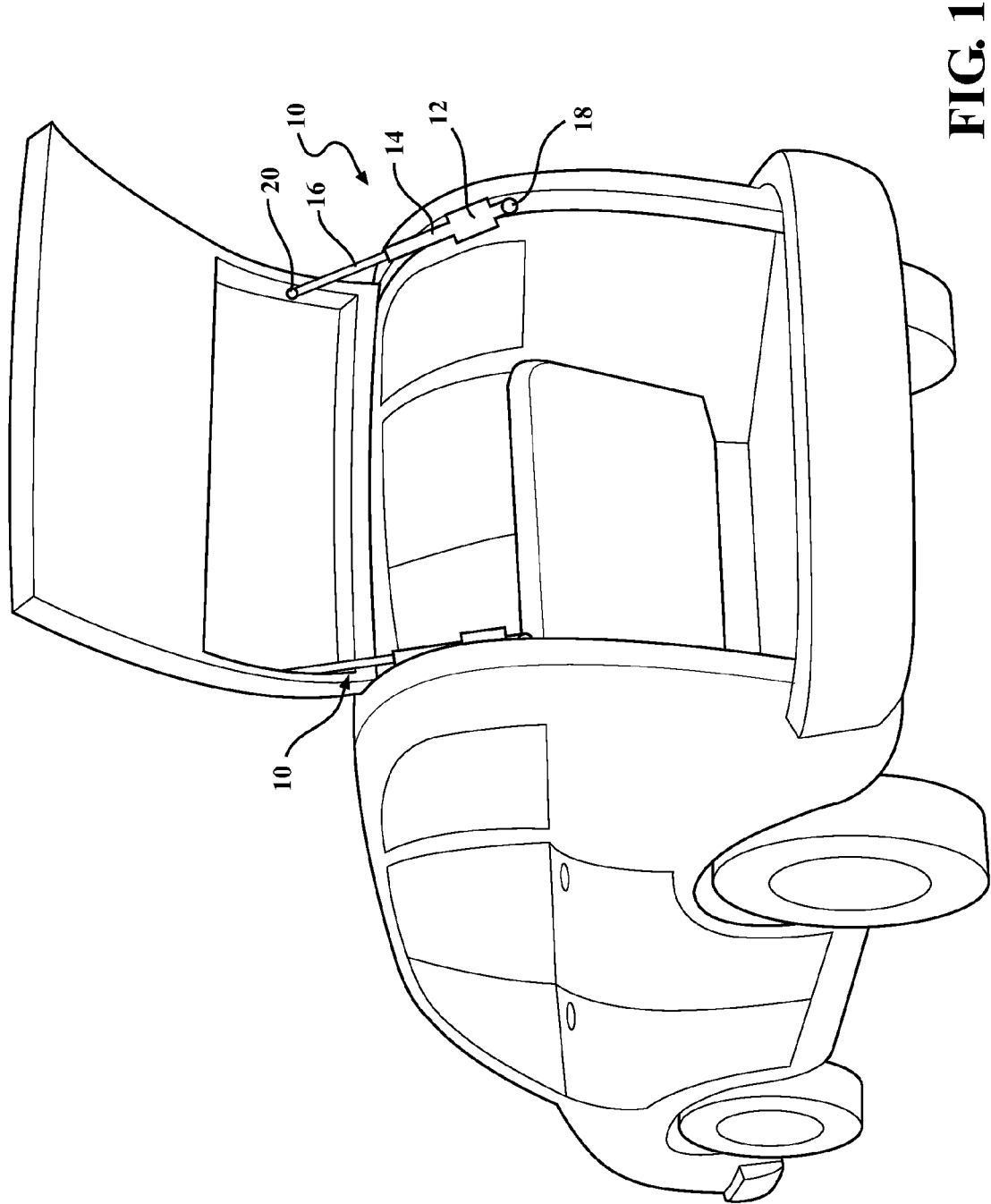
FIG. 1 is a perspective view of a motor vehicle having a powered lift gate system equipped with a pair of electromechanical struts at least one of which is constructed in accordance with the teachings of the present disclosure.

Referring now to FIGS. 1 and 2, an embodiment of an electromechanical strut 10 is shown mounted to a motor vehicle. Electromechanical strut 10 includes a lower housing 12, an upper housing 14, and an extensible shaft 16. A first pivot mount 18, located at an end of lower housing 12, is pivotally mounted to a portion of the vehicle body that defines an interior cargo area in the vehicle. A second pivot mount 20 is attached to the distal end of extensible shaft 16 and is pivotally mounted to a lift gate 21 of the vehicle.

Referring now to FIG. 2, the interior of lower housing 12 is shown in greater detail. Lower housing 12 provides a cylindrical sidewall 22 defining a chamber 24. Pivot mount 18 is attached to an end wall 26 of lower housing 12 proximal to the vehicle body (not shown). Upper housing 14 provides a cylindrical sidewall 32 defining a chamber 34 that is open at both ends. A distal end wall 28 of lower housing 12 includes an aperture 30 so that chamber 24 and chamber 34 communicate with each other. Upper housing 14 has a smaller diameter than lower housing 12. However, it is contemplated that lower housing 12 and upper housing 14 can also be formed as a single cylinder or frusto-cone. Other form factors for lower housing 12 and upper housing 14 will occur to those of skill in the art. Upper housing 14 can be integrally formed with lower housing 12, or it can be secured to lower housing 12 through conventional means (threaded couplings, weld joints, etc). A motor-gear assembly 36 is seated in chamber 24.

Motor-gear assembly 36 includes an electric motor 42, a slip clutch 44, a planetary reduction gearset 46, and a power screw 40. Motor 42 is mounted within chamber 24 near end wall 26. Motor 42 is secured to at least one of cylindrical sidewall 22 and end wall 26 to prevent undesired vibrations or rotation. Motor 42 may be a direct current bi-directional motor. Electrical power and directional control for motor 42 is provided via electrical cables that connect into the vehicle body through apertures (not shown) in end wall 26. Clutch 44 is connected to an output shaft of motor 42. Clutch 44 provides a selective engagement between the output shaft of motor 42 and an input component of planetary gearset 46. Clutch 44 may be an electromechanical clutch that engages planetary gearset 46 when motor 42 is activated. When clutch 44 is engaged, torque is transferred from motor 42 to planetary gearset 46. When clutch 44 is disengaged, torque is not transferred between motor 42 and planetary gearset 46 so that no back drive occurs if lift gate 21 is closed manually. Clutch 44 may also be a passive torque-limiting friction clutch configured to disconnect motor 42 from gearset 46 when manual operation of lift gate 21 occurs. As an optional arrangement, clutch 44 could be operably disposed between an output component of planetary gearset 46 and power screw 40.

Planetary gearset 46 provides speed reduction and torque multiplication for power screw 40. A ring gear 50 is driven by the output of clutch 44. In turn, a number of planetary gears 52 transfer power from ring gear 50 to power screw 40 via an output gear 51, which is centrally disposed within planetary gearset 46, for providing the desired gear ratio reduction to power screw 40. Output gear 51 acts as a sun gear in planetary gearset 46. In the present embodiment, planetary gearset 46 provides about a 47:1 gear ratio reduction. Other gear ratio reductions will occur to those of skill in the art. Power screw 40 extends into upper housing 14. A coupling unit 53 interconnects output gear 51 of planetary gearset 46 to an input segment of power screw 40. Coupling unit 53 may provide for and accommodate misalignment between output gear 51 and power screw 40 while providing a damping feature to minimize shock loading. As will be detailed hereinafter, coupling unit 53 and slip clutch 44 may be integrated into a common assembly to provide enhanced functionality and improved packaging efficiency.

Extensible shaft 16 has a cylindrical sidewall 54 defining a chamber 56 and is concentrically mounted between upper housing 14 and power screw 40. As described earlier, second pivot mount 20 is attached to the distal end of extensible shaft 16. The proximal end of extensible shaft 16 is open. A drive member, also referred to as drive nut 58 is mounted around the proximal end of extensible shaft 16 relative to lower housing 12 and is threadedly coupled with power screw 40 in order to convert the rotational movement of power screw 40 into the linear motion of the extensible shaft 16 along the axis of power screw 40. The combination of threaded power screw 40 and threaded drive nut 58 define a spindle drive assembly. More specifically, internal threads formed in drive nut 58 are in threaded engagement with external threads formed on power screw 40. Drive nut 58 includes two external splines 60 that extend into opposing coaxial slots 62 formed on the inside of upper housing 14 to prevent drive nut 58 from rotating. The length of slots 62 defines the retracted and the extended positions of extensible shaft 16. Alternatively, a ballscrew drive assembly could be used in lieu of the spindle drive assembly without departing from the scope of the invention. An integrally-formed outer lip 64 in upper housing 14 provides an environmental seal between chamber 34 and the outside.

A spring housing 38 is provided in lower housing 12 and is defined by cylindrical sidewall 22, distal end wall 28, and a flange 66. Within spring housing 38, a power spring 68 is coiled around power screw 40, providing a mechanical counterbalance to the weight of lift gate 21. Preferably formed from a strip of steel, power spring 68 assists in raising lift gate 21 both in its powered and un-powered modes. One end of power spring 68 is attached to power screw 40 and the other is secured to a portion of cylindrical sidewall 22. When extensible shaft 16 is in its retracted position, power spring 68 is tightly coiled around power screw 40. As power screw 40 rotates to extend extensible shaft 16, power spring 68 uncoils, releasing its stored energy and transmitting an axial force through extensible shaft 16 to help raise lift gate 21. When power screw 40 subsequently rotates to retract extensible shaft 16, power spring 68 recharges by recoiling around power screw 40.

Power spring 68 stores sufficient energy when coiled to drive power screw 40 to fully raise lift gate 21, even when motor-gear assembly 36 is not engaged (typically by unlatching lift gate 21 to raise it manually.) In addition to assisting to drive power screw 40, power spring 68 provides a preloading force that reduces starting resistance and wear for motor 42. Furthermore, power spring 68 provides dampening assistance when lift gate 21 is closed. Unlike a gas strut, power spring 68 is generally not affected by temperature variations, nor does it unduly resist manual efforts to close lift gate 21. Although the present embodiment describes power spring 68 that uncoils to assist in raising lift gate 21 and recoils to lower lift gate 21, it has been contemplated that a power spring 68 could be provided that uncoils when lowering the lift gate and recoils when raising the lift gate.

Figure 4:
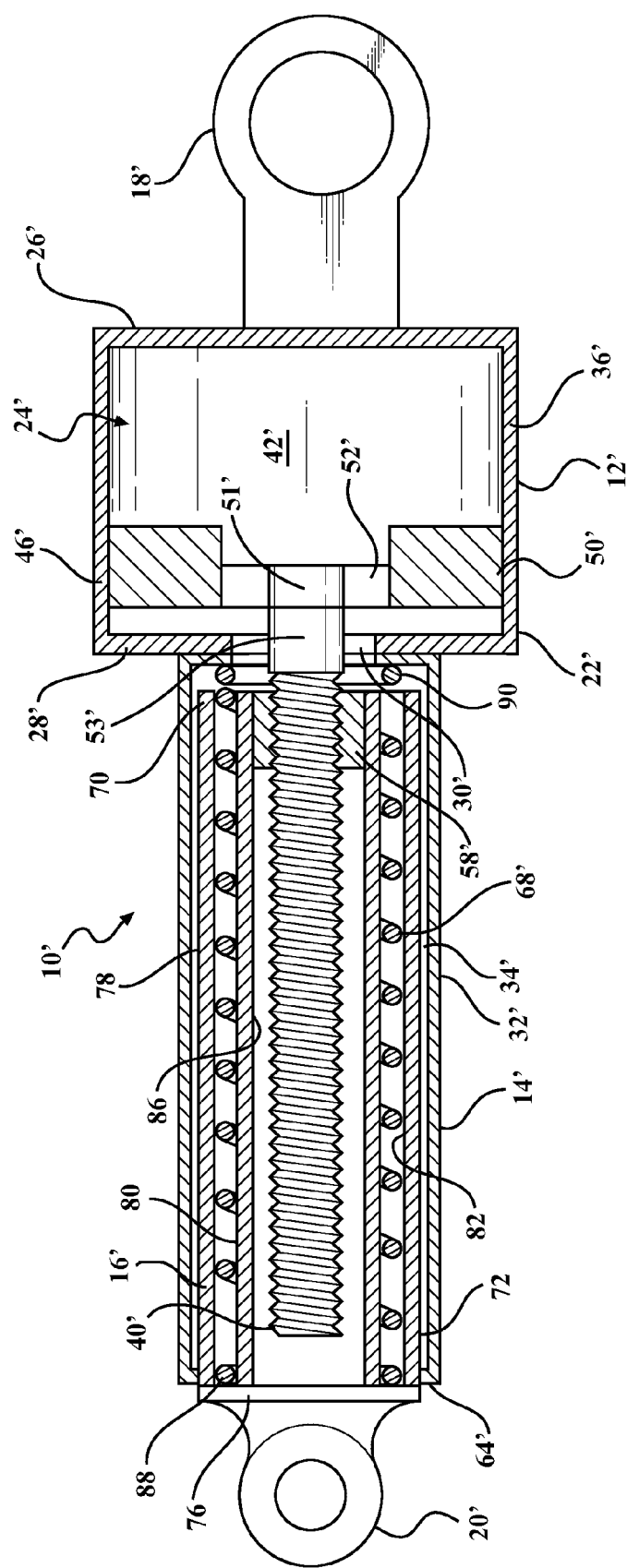
FIG. 4 is a sectional view of an electromechanical strut constructed according to a second embodiment of the present disclosure and shown in a retracted position.
Figure 5:
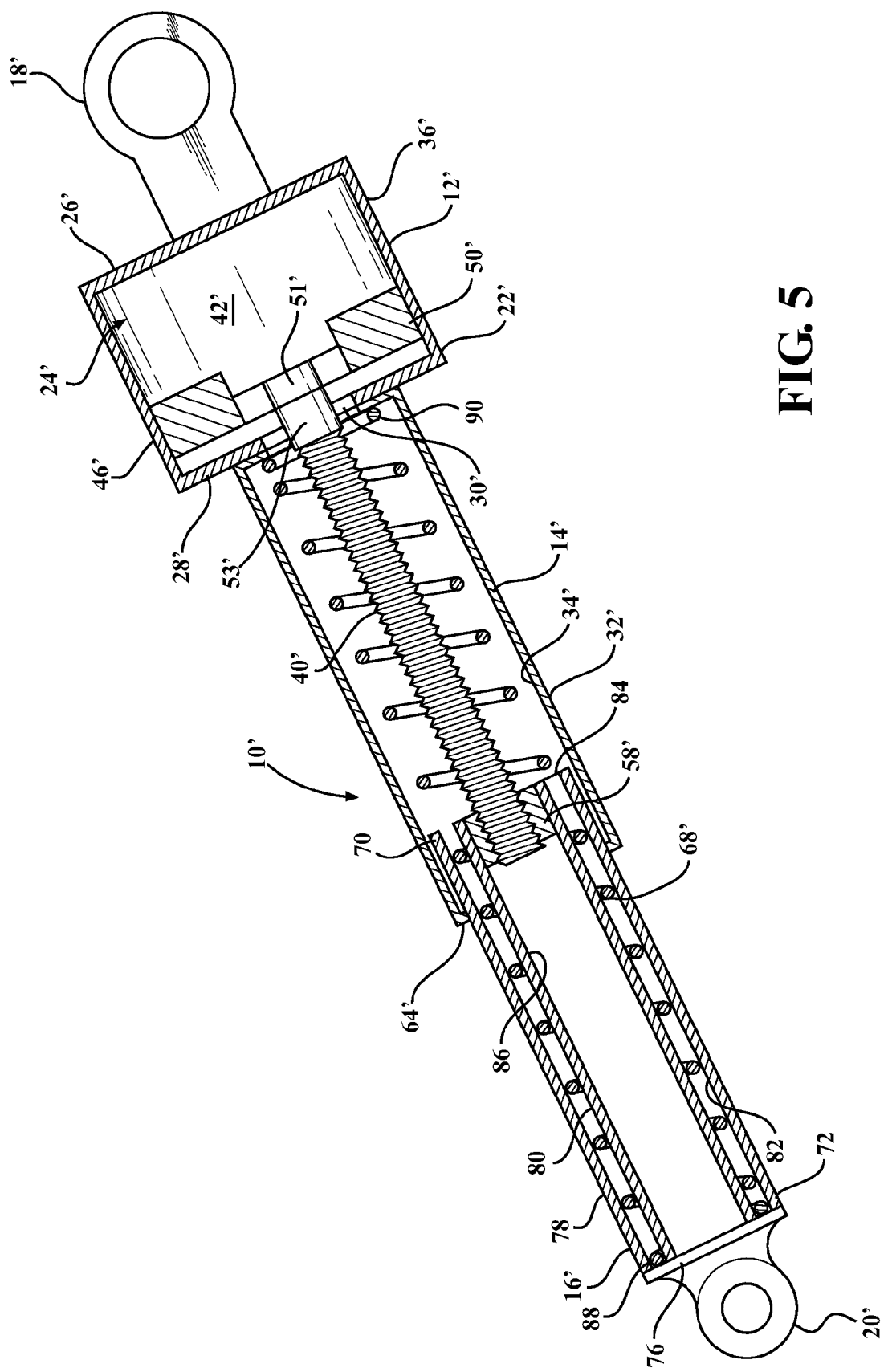
FIG. 5 is a sectional view of the electromechanical strut of FIG. 4 shown in an extended position.

Referring to FIGS. 4 and 5, wherein primed reference numerals represent similar elements as those set forth above, an electromechanical strut 10' constructed according to another embodiment is shown to include a lower housing 12' having a cylindrical sidewall 22' defining a chamber 24', and an upper housing 14' having cylindrical a sidewall 32' defining a chamber 34'. It is appreciated that lower 12' and upper 14' housings may be formed as a single housing.

Electromechanical strut 10' also includes an extensible shaft 16' movable between a retracted position, shown in FIG. 4, corresponding to a closed position of lift gate 21 and an extended position, shown in FIG. 5, corresponding to an open position of lift gate 21.

Motor-gear assembly 36' is seated within chamber 24'. Motor-gear assembly 36' includes electric motor 42', planetary reduction gearset 46', and power screw 40'. Planetary gearset 46' includes planet gears 52' that transfer power from ring gear 50' to central output gear 51' for driving power screw 40' via a coupling unit 53'. In the current embodiment, planetary gearset 46' provides a 20:1 gear ratio reduction. In this arrangement, coupling unit 53' may act as an integrated flex coupling and slip clutch device, as will be detailed hereinafter.

Extensible shaft 16' extends between opposing first 70 and second 72 ends. First end 70 of extensible shaft 16' is open and second end 72 of extensible shaft 16' is closed off by an end wall 76. Second end 72 of extensible shaft 16' is connected to pivot mount 20'.

Extensible shaft 16' includes an outer cylindrical wall 78 and an inner cylindrical wall 80 spaced apart inwardly from outer cylindrical wall 78. One end of inner cylindrical wall 80 is connected to end wall 76. Outer cylindrical wall 78 and inner cylindrical wall 80 define a toroidal chamber 82 therebetween. One end of toroidal chamber 82 is closed off by end wall 76 and an opposing end of toroidal chamber 82 defines an opening 84. Inner cylindrical wall 80 further defines a cylindrical chamber 86 inward of toroidal chamber 82. Cylindrical chamber 86 is separated from toroidal chamber 82 by inner cylindrical wall 80.

Drive nut 58' is rigidly mounted in cylindrical chamber 86 of extensible shaft 16'. Drive nut 58' is threadedly coupled with power screw 40' in order to convert the rotational movement of power screw 40' into linear motion of extensible shaft 16' along a longitudinal axis 88 of power screw 40'. Power screw 40' and drive nut 58' define a threaded spindle drive assembly.

Power spring 68' is seated within toroidal chamber 82. Power spring 68' includes one end 88 engaging the second end 72 of extensible shaft 16', and another end 90 engaging to upper housing 14' adjacent lower housing 12'. Power spring 68' is a coil spring that uncoils and recoils as extensible shaft 16' moves relative to upper 14' and lower 12' housings. It is, however, appreciated that the particular type of spring may vary.

In powered operation, torque provided by motor 42' is transferred via planetary gearset 46' to power screw 40' for causing linear motion of extensible shaft 16', as described above. For manual operation, motor 42' and planetary gearset 46' can be back driven and/or coupling 53' can releasably disconnect power screw 40' from gearbox 46'. The friction in the system due to the direct engagement of motor 42' and planetary gearset 46' with power screw 40' allows lift gate 21 to remain still in any intermediate position between the open and closed positions. Electromechanical strut 10' thus provides stable intermediate positions for the lift gate (useful, for example, for garages with low ceilings) without power consumption by using the internal friction of motor-gear assembly 36'.

Power spring 68' provides a mechanical counterbalance to the weight of lift gate 21. Power spring 68', which may be a coil spring, assists in raising lift gate 21 both in its powered and un-powered modes. When extensible shaft 16 is in the retracted position, power spring 68' is tightly compressed between extensible shaft 16' and lower housing 12'. As power screw 40' rotates to extend shaft 16', power spring 68' extends as well for releasing its stored energy and transmitting an axial force through shaft 16' to help raise lift gate 21. When power screw 40' rotates to retract extensible shaft 16', or when lift gate 21 is manually closed, power spring 68' is compressed between shaft 16' and lower housing 12' and thus recharges.

In addition to assisting in driving power screw 40', power spring 68' also provides a preloading force for reducing starting resistance and wear of motor 42'. Furthermore, power spring 68' provides dampening assistance when the lift gate 21 is closed. Unlike a gas strut, power spring 68' is generally not affected by temperature variations, nor does it unduly resist manual efforts to close the lift gate 21.

It is appreciated that a ball screw assembly, as known in the art, could be used in lieu of drive nut 58'. Also, although reference has been made specifically to lift gate 21, it is also appreciated that the invention may be applied to a variety of other closure panels such as trunks or deck lids.

Figure 6:
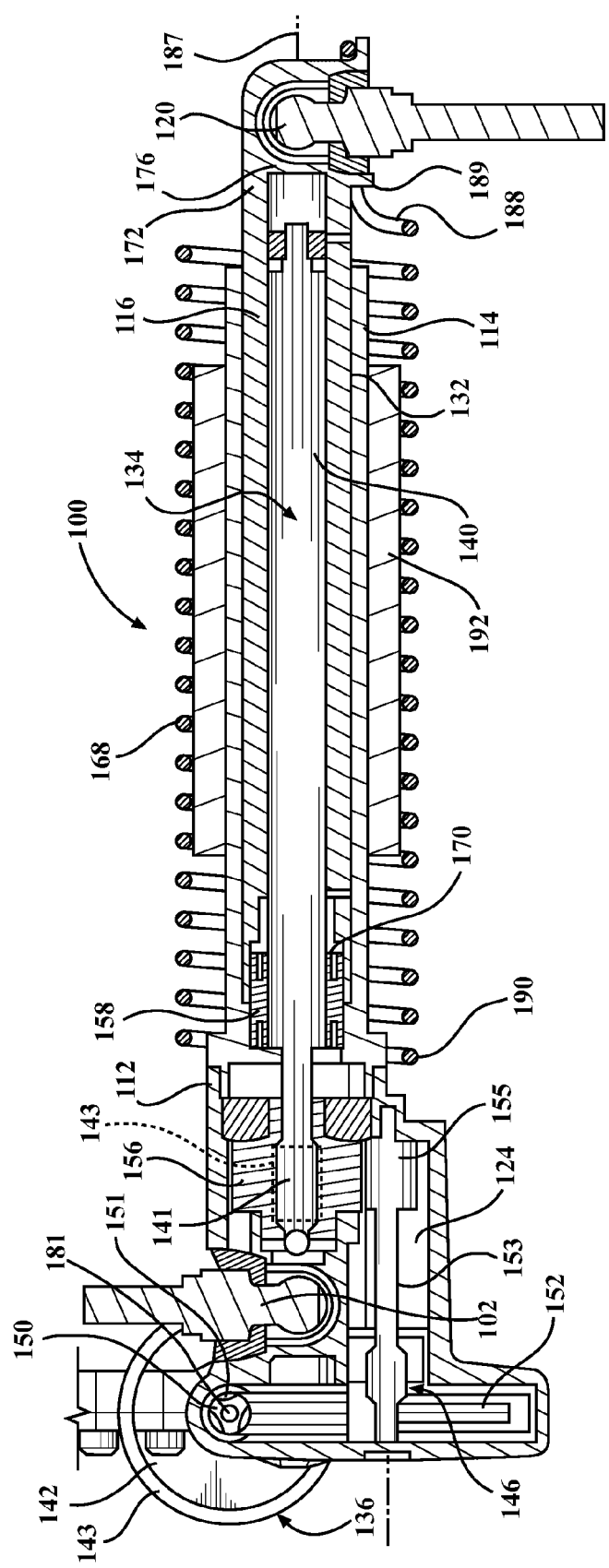
FIG. 6 is a sectional view of an electromechanical strut constructed according to a third embodiment of the present disclosure and shown in a retracted position.
Figure 7A:
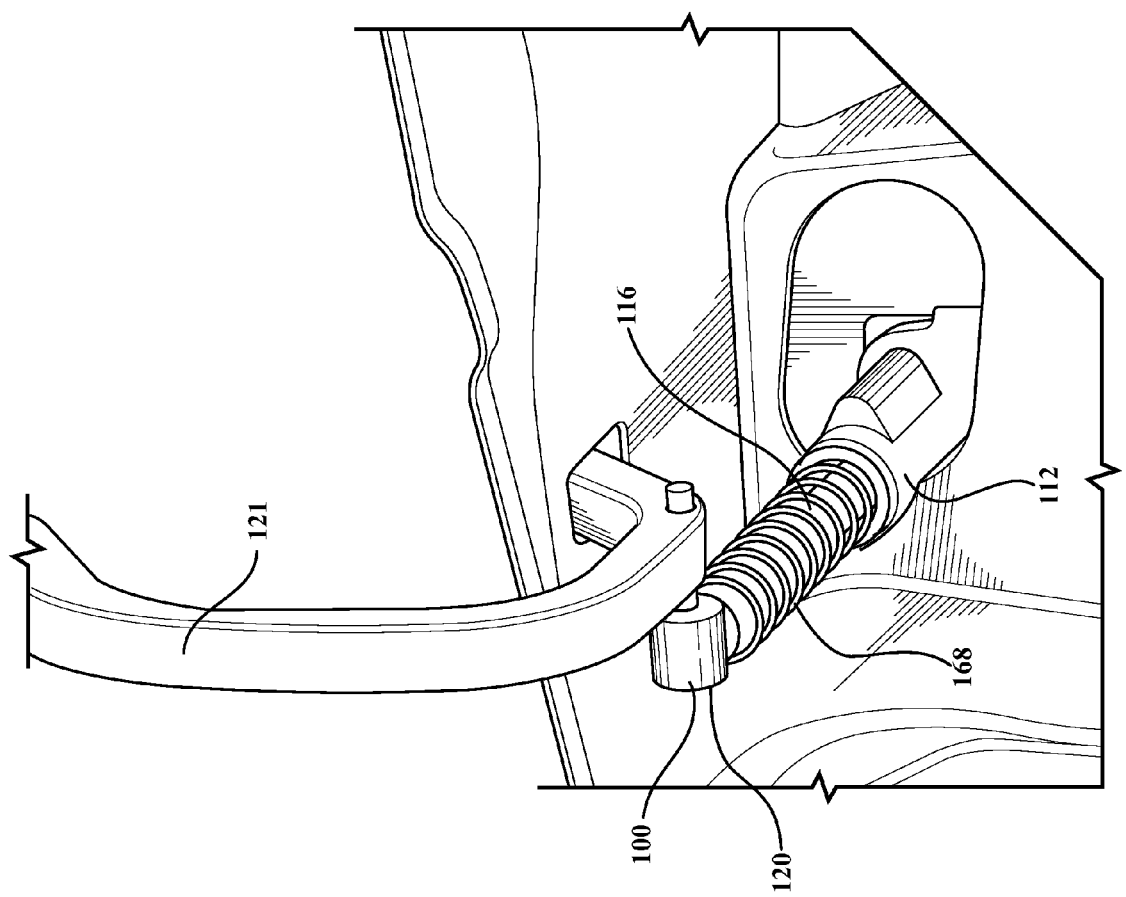
FIGS. 7A and 7B are perspective views of the electromechanical strut from FIG. 6 shown in different mounting positions for pivoting a vehicle trunk lid.

FIG. 6 shows another embodiment of an electromechanical strut 100, which is particularly suited for smaller closure panels such as a trunk deck lid as opposed to larger closure panels such as lift gates, because electromechanical strut 100 has a shorter overall length as compared to the previously discussed embodiments. Electromechanical strut 100 includes a lower housing 112 defining a gearbox housing or chamber 124, and an upper housing 114 having a cylindrical sidewall 132 defining a chamber 134. A mount 102 is connected to lower housing 112. The lower 112 and upper 114 housings may be formed as a single housing. Electromechanical strut 100 also includes an extensible shaft 116 movable between a retracted position, shown in FIG. 6 corresponding to a closed position of the deck lid, and an extended position, shown in FIG. 7A corresponding to an open position of the deck lid.

A motor-gear assembly 136, including a motor 142, a two-stage geartrain 146 and a power screw 140, drives extensible shaft 116 as discussed in greater detail below. In this particular embodiment, motor 142 is mounted in a housing 143 and is coupled to two-stage geartrain 146. More particularly, motor 142 features an output shaft 150 with a worm 151 fixedly mounted thereon that extends into gearbox chamber 124. Worm 151 drivingly engages a worm gear 152 mounted in gearbox chamber 124. Worm 151 and worm gear 152 define a worm gearset. Worm gear 152, in turn, includes an integral or rigidly mounted shaft 153 extending transversely from worm gear 152 along its rotational axis, thus providing a first stage torque reduction. Shaft 153 is journalled in gearbox housing 124 and features a pinion gear 155 that drivingly engages a drive gear 156, thus providing a second stage of torque reduction. In the present embodiment, geartrain 136 provides about a 38:1 gear ratio reduction, although this ratio will vary depending on the specific geometry of any particular application. Power screw 140 has a non-threaded butt 141 that extends into and is fixedly connected in a central aperture of drive gear 156, thus transferring rotary power from motor 142 to power screw 140. In the foregoing manner, motor 142 may be mounted with its longitudinal axis 181 which is centered along motor output shaft/worm 150, 151, transverse to a longitudinal axis 187 of upper housing 114, which is centered along power screw 140. Hence, the overall length of the electromechanical strut 100 may be reduced compared to the previously described embodiments 10, 10' of the strut.

Extensible shaft 116 extends between opposing first 170 and second 172 ends. First end 170 of extensible shaft 116 is open and second end 172 of extensible shaft 116 is closed off by an end wall 176. Second end 172 of extensible shaft 116 is connected to a mount 120. A drive nut 158 is rigidly mounted in extensible shaft 116 at first end 170 thereof. Drive nut 158 is threadedly coupled to power screw 140 in order to convert the rotational movement of power screw 140 into linear motion of the extensible shaft 116 along longitudinal axis 180 of power screw 40.

In the present embodiment, a power spring 168 is fitted over cylindrical sidewall 132. A first end 188 of spring 168 abuts or is otherwise connected to a lip 189 proximate second end 172 of extensible shaft 116. A second end 190 of spring 168 abuts or is otherwise connected to upper housing 114 adjacent lower housing 112. The spring 168 is a coil spring that uncoils and recoils as the extensible shaft 116 moves relative to upper 114 and lower 112 housings. In the mounting position shown in FIG. 7A, spring 168 is in compression and is biased to urge extensible shaft 116 toward the extended position corresponding to the open position of the deck lid. In this embodiment, mount 120 is connected to a goose neck hinge 121 that pivots the deck lid (not shown) with mount 102 being connected to the vehicle body. A foam dampener 192 is concentrically installed between the coils of spring 168 and cylindrical sidewall 132 to inhibit collapse of the coils and the minimize gear noise.

In powered operation, torque provided by motor 142 is transferred via geartrain 136 to power screw 140, causing linear motion of extensible shaft 116 as described above. For manual operation, because there is no clutch, the motor 142 and geartrain 136 must be back driven. As an alternative to the direct connection between drive gear 156 and butt portion 141 of power screw 140, a coupling unit 193, shown in phantom, can be installed there between to provide at least one of a torque-limiting (i.e. slip clutch) function and a torsional/axial damping (i.e. flex damper) function. In this regard, various embodiments of such an integrated coupling unit will be described hereinafter.

Power spring 168 provides a mechanical counterbalance to the weight of the deck lid. Spring 168, which may be a coil spring, assists in raising the deck lid both in its powered and un-powered modes. When extensible shaft 116 is in the retracted position, power spring 168 is tightly compressed between extensible shaft 116 and lower housing 112. As power screw 140 rotates to extend shaft 116, power spring 168 extends as well, releasing its stored energy and transmitting an axial force through shaft 116 to help raise the deck lid. When power screw 140 rotates to retract extensible shaft 116, or when the deck lid is manually closed, power spring 168 is compressed between shaft 116 and lower housing 112 and thus recharges.

Figure 7B:
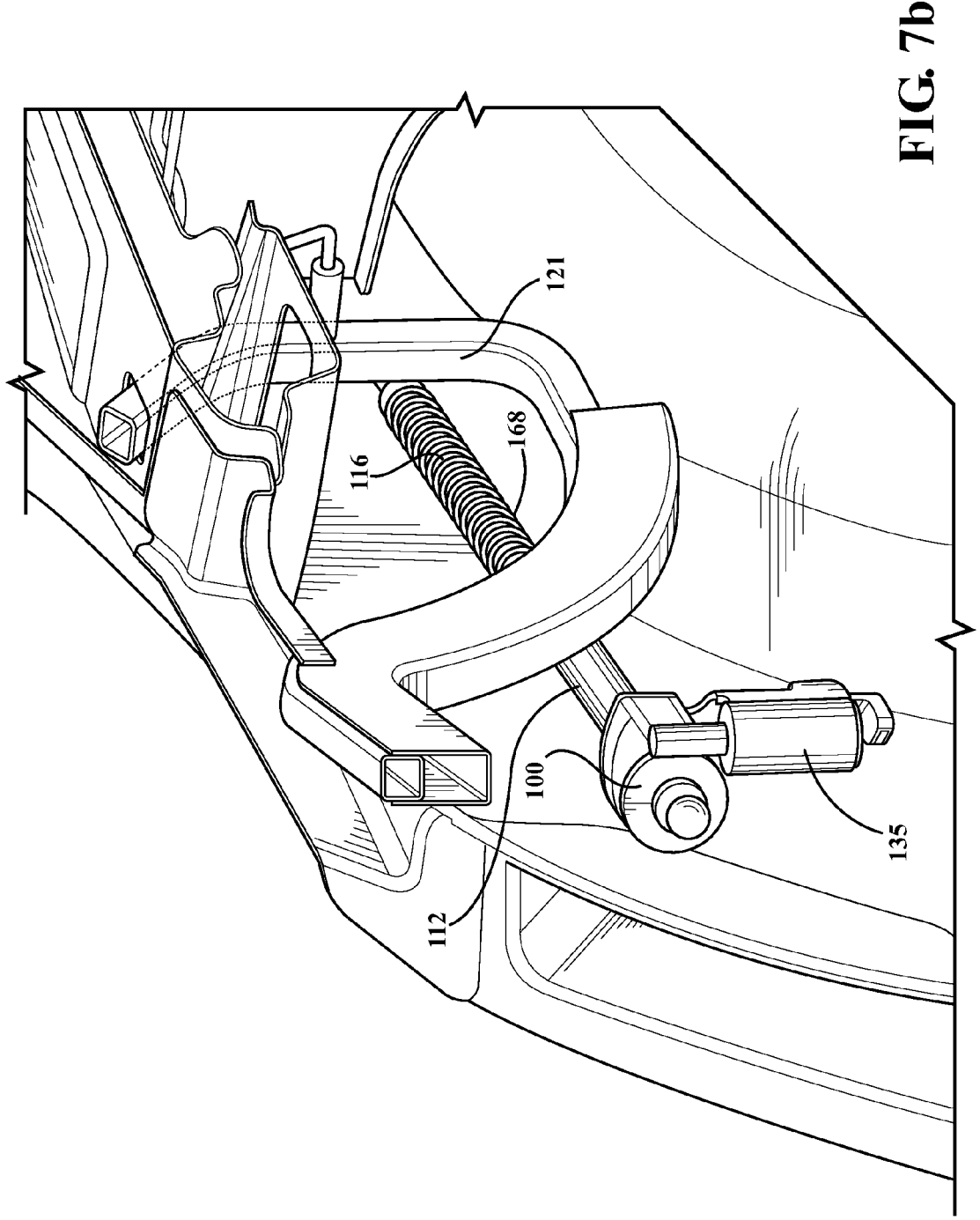

In FIG. 7B, spring 168 is in compression and is biased to urge extensible shaft 116 toward the extended position corresponding to the open position of the deck lid. In the mounting position shown in FIG. 7B, extensible shaft 116 is in its fully extended position when the deck lid is closed and extensible shaft 116 transitions to its fully retracted position when the deck lid is opened. In this mounting position, spring 168 is in tension and is biased to urge extensible shaft 116 toward the retracted position corresponding to the open position of the deck lid.

Figure 8I:
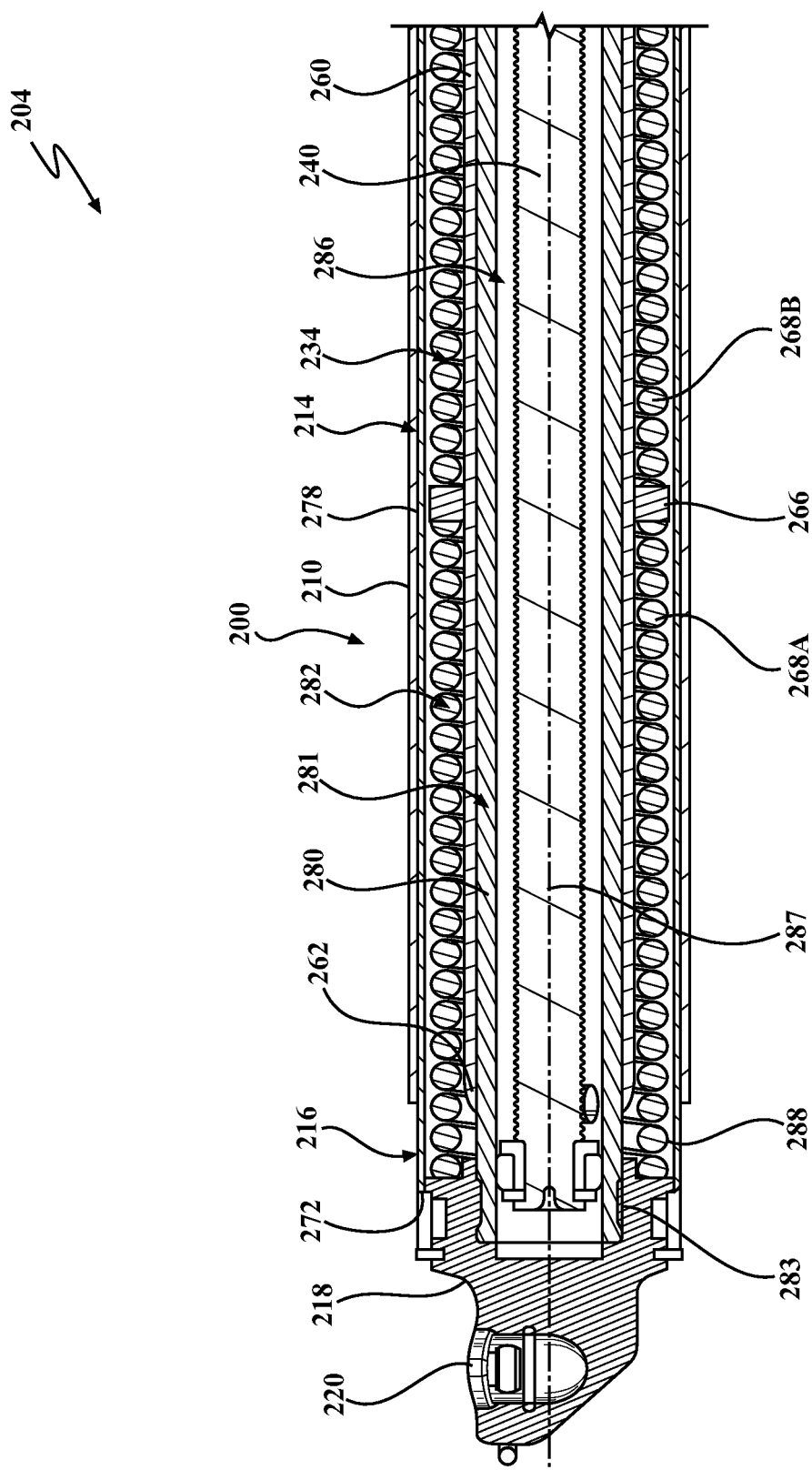
Figure 8I:
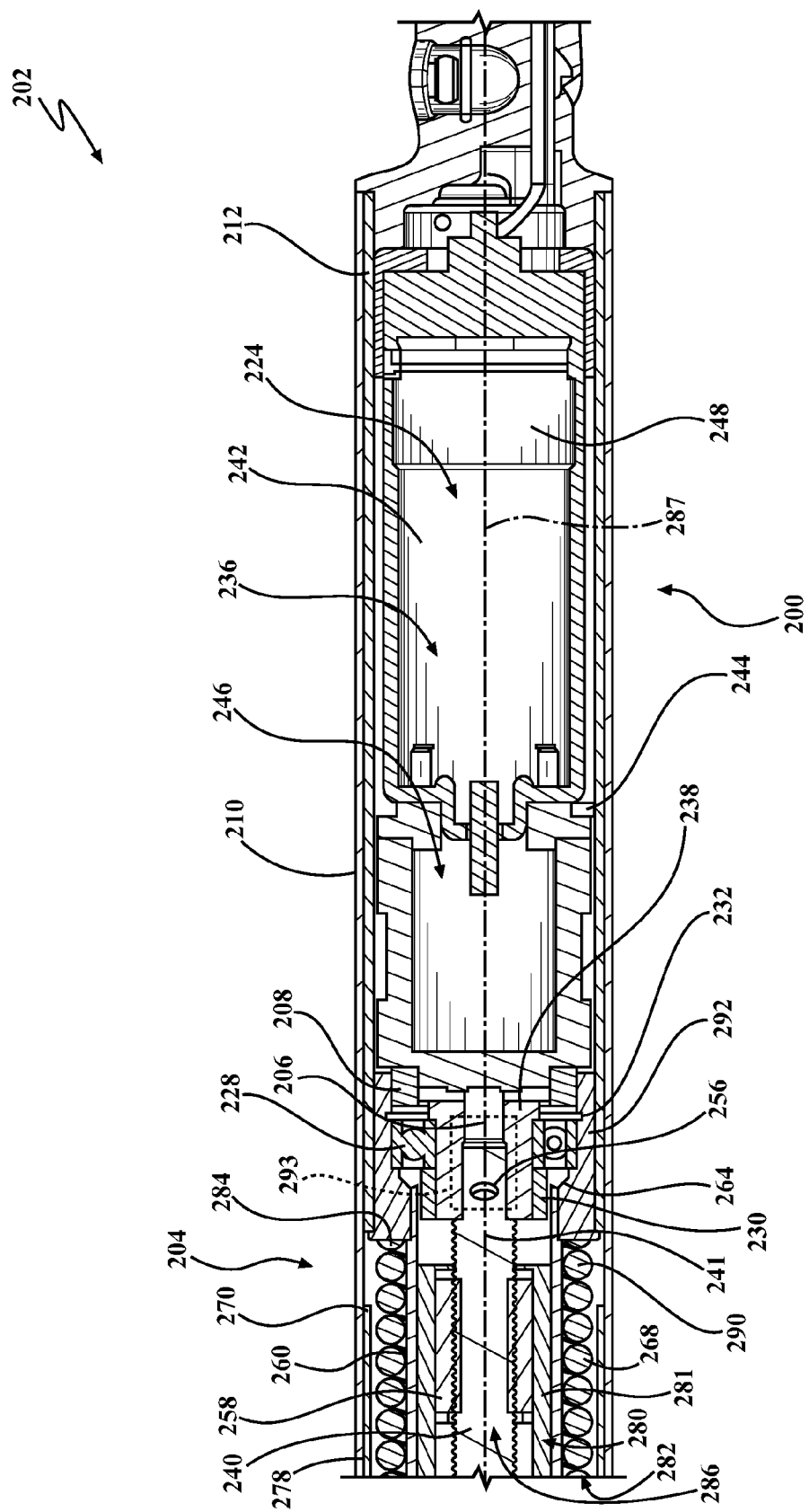
Figure 9:
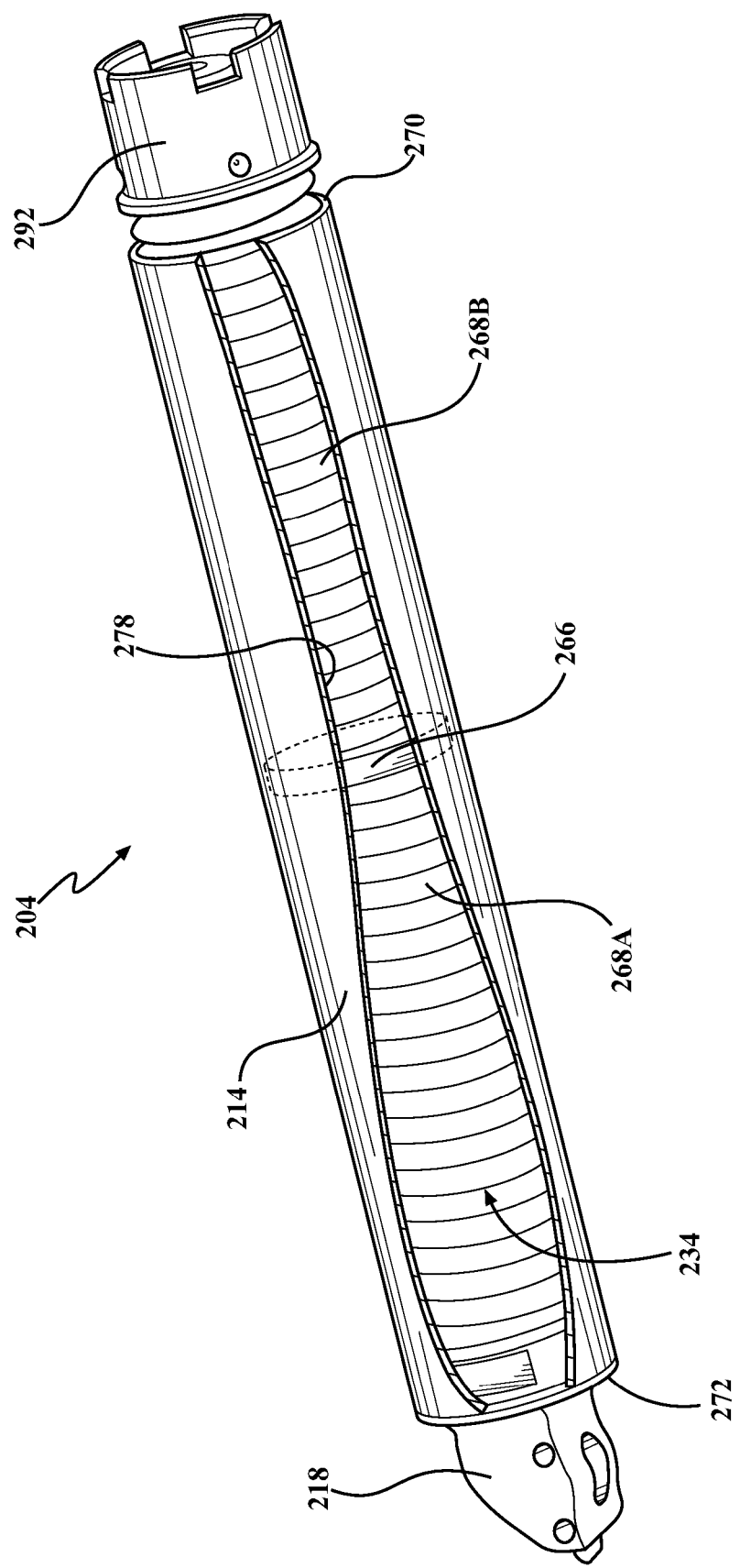
FIG. 9 is a perspective view of a telescoping unit associated with the electromechanical strut of FIG. 8, with an outer casing removed.

FIG. 8 shows a cross-sectional view of another embodiment of an electromechanical strut 200 that has a more modular design than the previously discussed embodiments 10, 10' of the strut. Electromechanical strut 200 comprises two main, separable, units: a power drive unit 202 and a telescoping unit 204, which are shown in isolation in the fragmentary axonometric views of FIG. 9 and FIG. 10 (with covering walls removed). Power drive unit 202 is sized and rated to function as a drive unit for a variety of closure panels associated with different vehicles. Telescoping unit 204 may be sized as required for each unique vehicle model to achieve a desired telescoping travel length. Power drive unit 202 features an output drive shaft 206 and an elastomeric coupling 208 that enable power unit 202 to be quickly and easily attached with telescoping unit 204 as discussed in greater detail below. As seen in FIG. 8, an elongate tubular cover 210 preferably manufactured from plastic is fitted over the power and telescoping units 202, 204 to cover the joint between the two units from the environment. Cover 210 also provides an aesthetically pleasing uniform appearance of the strut to the observer.

Power unit 202 has a tubular casing 212 defining a chamber 224. A portion of a motor-gear assembly 236 is seated within chamber 224. Motor-gear assembly 236 includes a motor 242, a planetary gearset 246 and a power screw 240. Motor 242 and planetary gearset 246 are seated within chamber 242. Power screw 240 is seated in telescoping unit 204 and couples to power unit output shaft 206, as discussed in greater detail below. In the illustrated embodiment, planetary gearset 246, which is known in the art per se, provides about a 20:1 gear ratio reduction.

Telescoping unit 204 has an extensible member 216 which comprises an outer guide tube or tubular casing 214 and a tubular nut-shaft 281, which are rigidly fixed to one another via an end cap 218. Extensible member 216 is movable between a retracted position, shown in FIG. 8 corresponding to a closed position of lift gate 21, and an extended position, not shown corresponding to an open position of the lift gate 21.

Outer tubular casing 214 includes a cylindrical wall 278 that extends between opposing first 270 and second 272 ends and defines a chamber 234. First end 270 of cylindrical wall 278 is open and the second end 272 of cylindrical wall 278 is closed off by end cap 218. Preferably, second end 272 of cylindrical wall 278 is secured to end cap 218 via a snap ring. End cap 218 includes a pivot mount 220.

Tubular nut-shaft 281 features a cylindrical wall 280 spaced apart inwardly from cylindrical wall 278 of outer tubular casing 214. One end of cylindrical wall 280 is rigidly connected to end cap 218. Cylindrical wall 278 of outer tubular casing 214 and cylindrical wall 280 of tubular nut-shaft 281 define a toroidal chamber 282 therebetween.

One end of toroidal chamber 282 is closed off by end cap 218 and an opposing end of toroidal chamber 282 defines an opening 284. Cylindrical wall 280 of tubular nut-shaft 281 further defines a cylindrical chamber 286 inward of toroidal chamber 282. Cylindrical chamber 286 is separated from toroidal chamber 282 by cylindrical wall 280.

Figure 11:
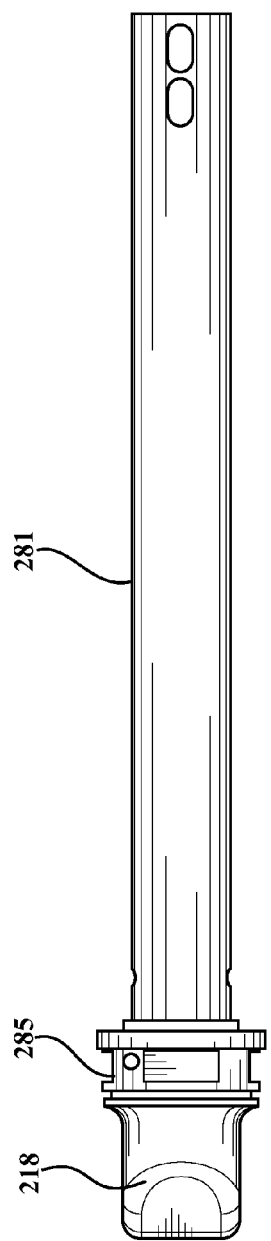
FIG. 11 is an isolated perspective view of a tubular nut-shaft utilized in the telescoping unit of the electromechanical strut shown in FIG. 8.

In the present embodiment, cylindrical wall 280 of tubular nut-shaft 281 and end cap 218 have mating helical threads 283 for interconnecting the parts. As seen best in the isolated view of FIG. 11, to prevent the loosening or unscrewing of tubular shaft 281 from end cap 218, a pin (not shown) is installed along a through hole 285 in end cap 218 that is aligned with cylindrical wall 280. In this manner the pin does not unduly pierce the cylindrical chamber 286, enabling the full volume of cylindrical chamber 286 to be used.

A drive nut 258 is rigidly mounted in cylindrical chamber 286 of tubular nut-shaft 281 proximate opening 284 thereof. In the preferred embodiment, drive nut 258 is riveted to cylindrical wall 280. Drive nut 258 is threadedly coupled with power screw 240 in order to convert the rotational movement of power screw 240 into linear motion of extensible member 216 along a longitudinal axis 287 of the power screw 240.

In the present embodiment, telescoping unit 204 includes an elongate, stationary inner guide tube 260 having an open end 262 distal to power unit 202 and an opposing end 264 proximate to and fixedly connected to power unit 202. Stationary guide tube 260 can be considered to form part of the housing connecting one end of the strut to the lift gate (or vehicle body), with the extensible member 216 connecting the other end of the strut the vehicle body (or lift gate). Stationary inner guide tube 260 is disposed in toroidal chamber 282 immediately adjacent to cylindrical wall 280 of tubular nut-shaft 281 and spaced apart inwardly from cylindrical wall 278 of outer guide tube/tubular casing 214. Stationary inner guide tube 260 fits closely over tubular nut-shaft 281 but does not extend or translate linearly with the extensible member 216.

A power spring 268 is seated within toroidal chamber 282, between stationary inner guide tube 260 and cylindrical wall 278 of outer guide tube/tubular casing 214. Power spring 268 is a coil spring that uncoils and recoils as extensible member 216 moves relative to stationary tube 260 and power unit 202. The annular spacing between stationary inner guide tube 260 and outer guide tube/tubular casing 214 is sized to closely fit the preferred toroidal form of power spring 268. One end 288 of spring 268 is connected to end cap 218 of extensible member 216 and another end 290 of spring 268 is connected to end 264 of stationary inner guide tube 260 proximate to, and ultimately supported by, power unit 202. It should be appreciated that in the present embodiment, power spring 268 is guided and supported against buckling along its entire length of travel by the combined action of stationary inner guide tube 260 which guides the inside edge of power spring 268, and outer guide tube/tubular casing 214 which guides the outer edge of power spring 268. In the preferred embodiment, when extensible member 216 is at its fully extended position, stationary inner guide tube 260 and outer guide tube/tubular casing 214 overlap or are co-extensive thus inhibiting the tendency of power spring 268 to buckle.

Power spring 268 may be composed of first and second coil segments 268A, 268B that are serially arranged in toroidal chamber 282. The first coil segment is wound a first direction, and the second coil segment is wound in the opposite direction. A thrust bearing, such as washer 266, is interposed between the first and second coil segments 268A, 268B. This arrangement is advantageous because it balances torsional loads that coil segments 268A, 268B encounter as extensible member 216 translates. In contrast, when only one spring is present, as the extensible member moves a torsional force develops at the ends of the spring that will typically cause the spring to rotate, resulting in a high frictional force due to the contact between the many coils in the spring and the outer and inner guide tubes 214, 260. Thus, the preferred embodiment decreases the friction between power spring 268 and outer and inner guide tubes 214, 260, increasing the efficiency of the system and reducing manual opening and closing efforts of the lift gate. It should be appreciated, however, that the particular type of spring may vary.

Figure 12:
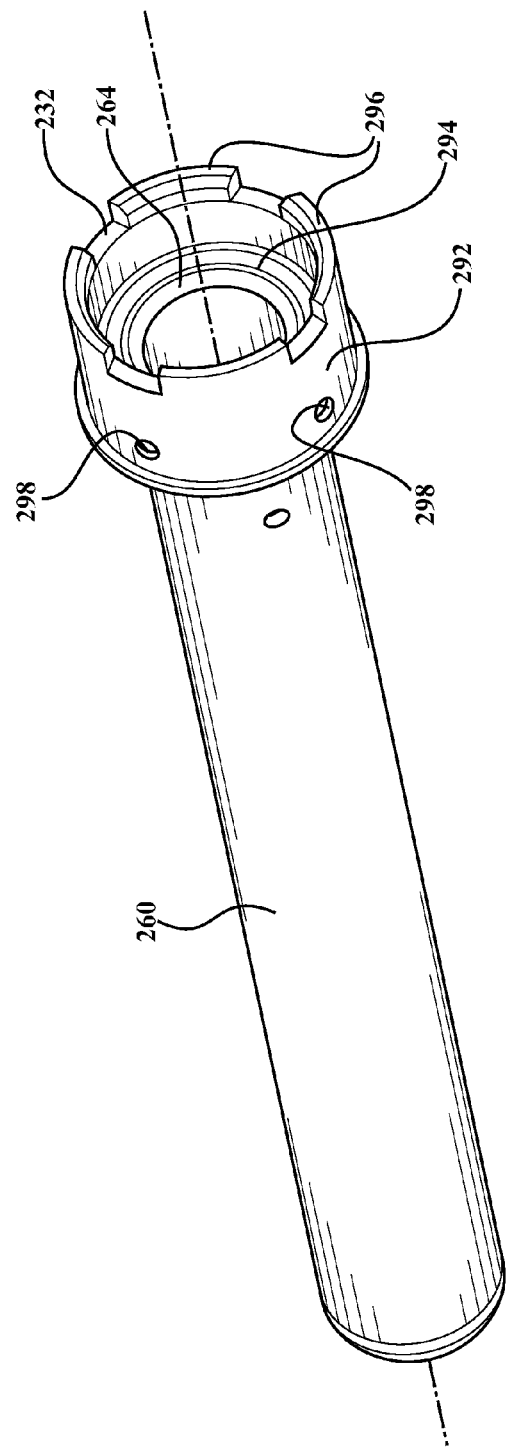
FIG. 12 is an isolated perspective view of an inner guide tube utilized in the telescoping unit of the electromechanical strut of FIG. 8.
Figure 13:
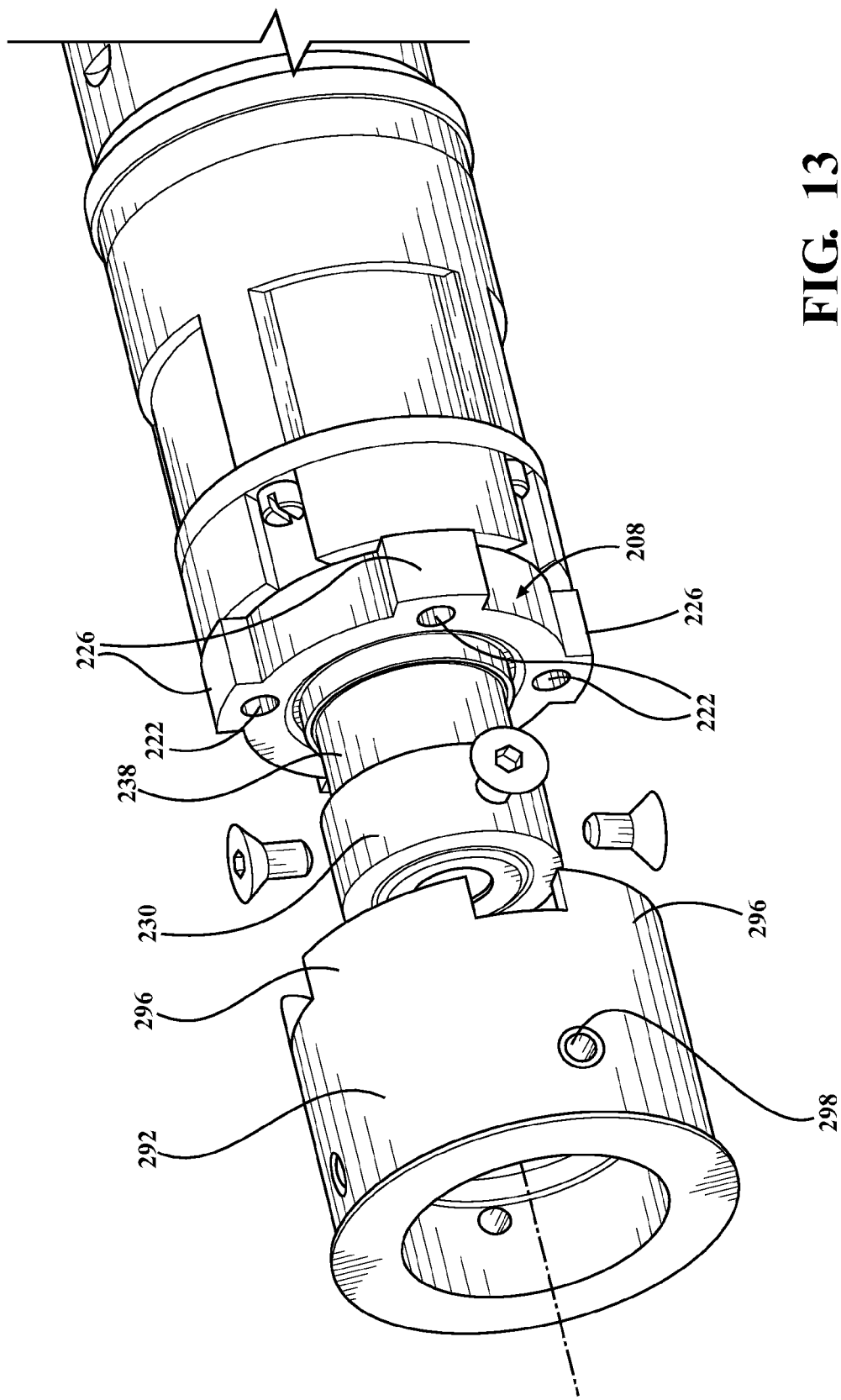
FIG. 13 is a partially exploded fragmentary view of the interface between the telescoping and power units of the electromechanical strut of FIG. 8.

Telescoping unit 204 mounts on the power unit as follows: Referring additionally to the fragmentary exploded views of FIGS. 12 and 13, elastomeric coupling 208 of power unit 202 is pre-bolted onto its tubular casing 212 via screw holes 222. Elastomeric coupling 208 features a plurality of elastomeric coupling lugs 226. Stationary inner guide tube 260 includes a tubular bearing housing 292. In the preferred embodiment, for ease of manufacture, tubular bearing housing 292 is a separate piece that is fixedly mounted to the end 264 of tube 260. More particularly, tube 260 (or portions thereof) is flared outwardly, as may be readily accomplished in a crimping or punching operation, to create a circlip 294 against the inner wall of the tubular bearing housing 292. Bearing housing 292 also features a plurality of lugs 296 that interdigitatingly mate with lugs 226 of elastomeric coupling 208. In alternative embodiments, stationary guide tube 260 and bearing housing 292 can be formed from one piece.

A tubular gearset coupler 238 is journalled within bearing housing 292 via ball bearings 228 (FIG. 8). A spacer sleeve 230 mounted over coupler 238 and an internal circlip 232 retain the ball bearings 228 within housing 292. Coupler 238 is elongated with one end of coupler 238 drivingly mating with a butt end 241 of power screw 240. Preferably, a pin 256 fixes spacer sleeve 230 and coupler 238 to the power screw 240. The other end of coupler 238 mates with the power unit output drive shaft 206. As an alternative to the direct connection between drive gear 256 and butt portion 241 of power screw 240, a coupling unit 293, shown in phantom, can be installed there between to provide at lease one of a torque-limiting (i.e. slip clutch) function and a torsional/axial damping (i.e. flex damper) function. In this regard, various embodiments of such an integrated coupling unit will be described hereinafter.

Thus, telescoping unit 204 may be quickly and easily attached to power unit 202 by simply slipping coupler 238 over power unit output drive shaft 206 whilst interdigitating lugs 296, 226 of bearing housing 292 and flexible coupling 208. Bearing housing 292 is then preferably fixedly mounted to tubular casing 212 of the power unit 202 via screw holes 298. It should be appreciated that flexible coupling 208 eliminates the need for very precise alignment of power screw 240 with the gearbox 246, reducing the need for high precision parts, whilst tolerating a rigid connection between the power screw 240 and gearbox 246.

Figure 10:
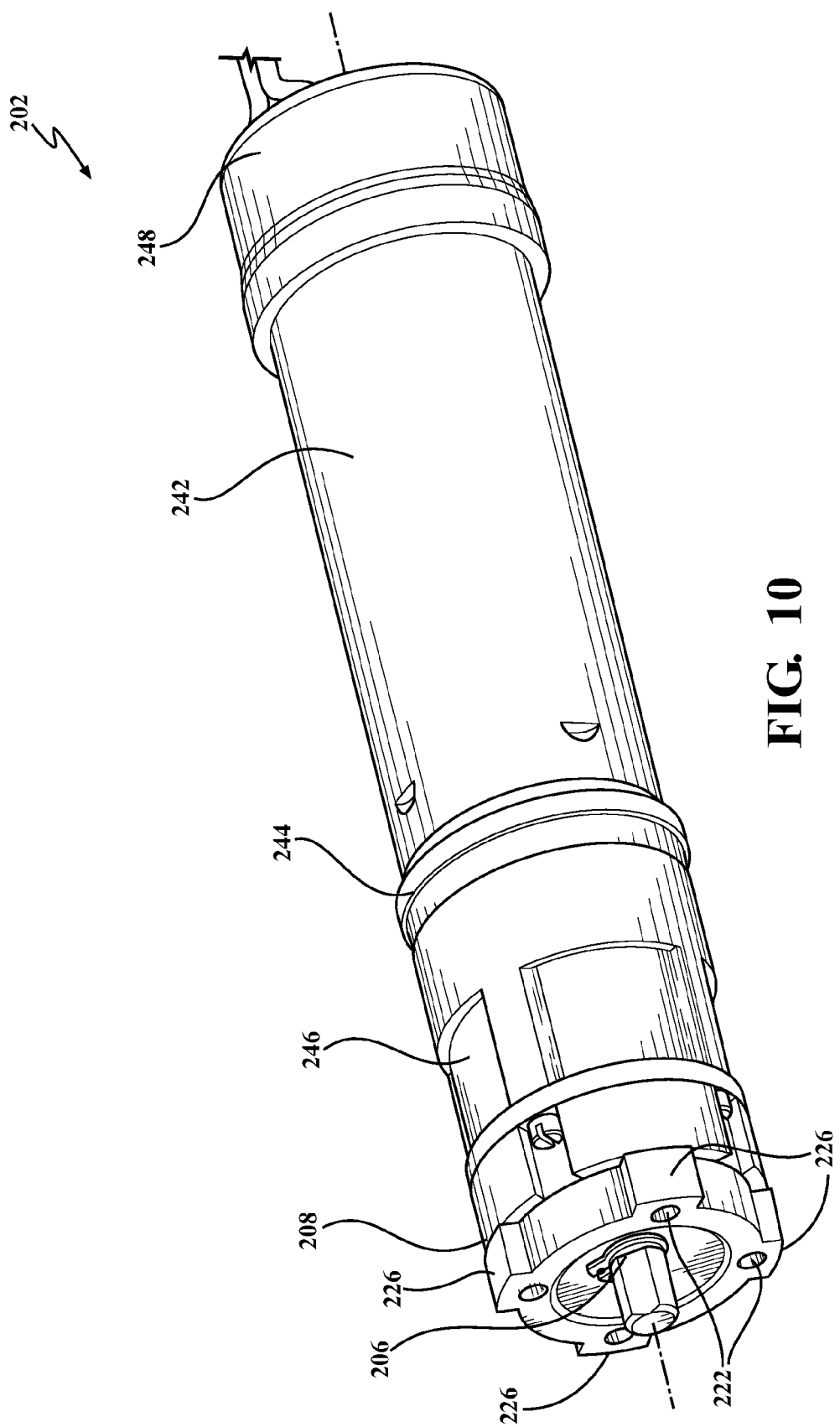
FIG. 10 is a perspective view of a power unit associated with the electromechanical strut of FIG. 8, with an outer casing removed from view.

Referring to FIGS. 8 and 10, power unit 202 includes additional elastomeric spacers or bumpers. More particularly, an elastomeric spacer 244 is installed within casing 212 between motor 242 and gearbox 246. Another bumper 248 is installed within casing 212 at the rear end of the motor 242. Elastomeric bumper 248, spacer 244, and coupler 208 preferably have respective hardnesses of 40, 60 and 80 Durometer Shore A. These elastomeric components isolate motor 242 and gearbox 246 from tubular casing 212, dampening the noise and vibration of the system, particularly if the hardness of each elastomeric component is selected to dampen the major harmonic vibrations of the system. In addition, the elastomeric components, particularly coupling 208, enable electromechanical strut 200 to have a "soft start" upon power up, which will tend to increase system durability. In particular, absent extra circuitry, when motor 242 starts up it will tend to have a high starting moment. As strut 200 is prohibited from rotating due to its connection with the vehicle body and lift gate, this high starting moment will be transferred from power unit 202 onto telescoping unit 204. However, elastomeric coupling 208 will reduce the initial impact on the components and hence reduce the wear and tear on the system. In alternative embodiments, elastomeric coupling 208 can be mounted to bearing housing 292 and/or the casing of the power unit 202 may have interdigitating lugs.

In powered operation, torque provided by motor 242 is transferred via gearset 246 to power screw 240 for causing linear motion of extensible member 216 as described above. For manual operation, motor 242 and planetary gearset 246 are back driven. The friction in the system due to the direct engagement of motor 242 and planetary gearset 246 with power screw 240 allows the lift gate 21 to remain still in any intermediate position between the open and closed positions. Electromechanical strut 200 thus provides stable intermediate positions for the lift gate (useful, for example, for garages with low ceilings) without power consumption by using the internal friction of motor-gear assembly 236.

Power spring 268 provides a mechanical counterbalance to the weight of lift gate 21. Power spring 268 may comprise two serially arranged coil spring segments which assist in raising the lift gate both in its powered and un-powered modes. When extensible member 216 is in the retracted position, power spring 268 is tightly compressed between end cap 218 of extensible member 216 and bearing housing 292 which is supported by tubular casing 212 of power unit 202. As power screw 240 rotates to extend extensible member 216, power spring 268 extends as well, releasing its stored energy and transmitting an axial force through extensible member 216 to help raise lift gate 21. When power screw 240 rotates to retract extensible member 216, or when lift gate 21 is manually closed, power spring 268 is compressed between end cap 218 and the bearing housing 292 and thus recharges.

It is appreciated that a ball screw assembly, as known in the art, could be used in lieu of drive nut 258. Also, although reference has been made specifically to a lift gate, it is also appreciated that the invention may be applied to a variety of other closure panels such as trunks or deck lids.

Figure 14:
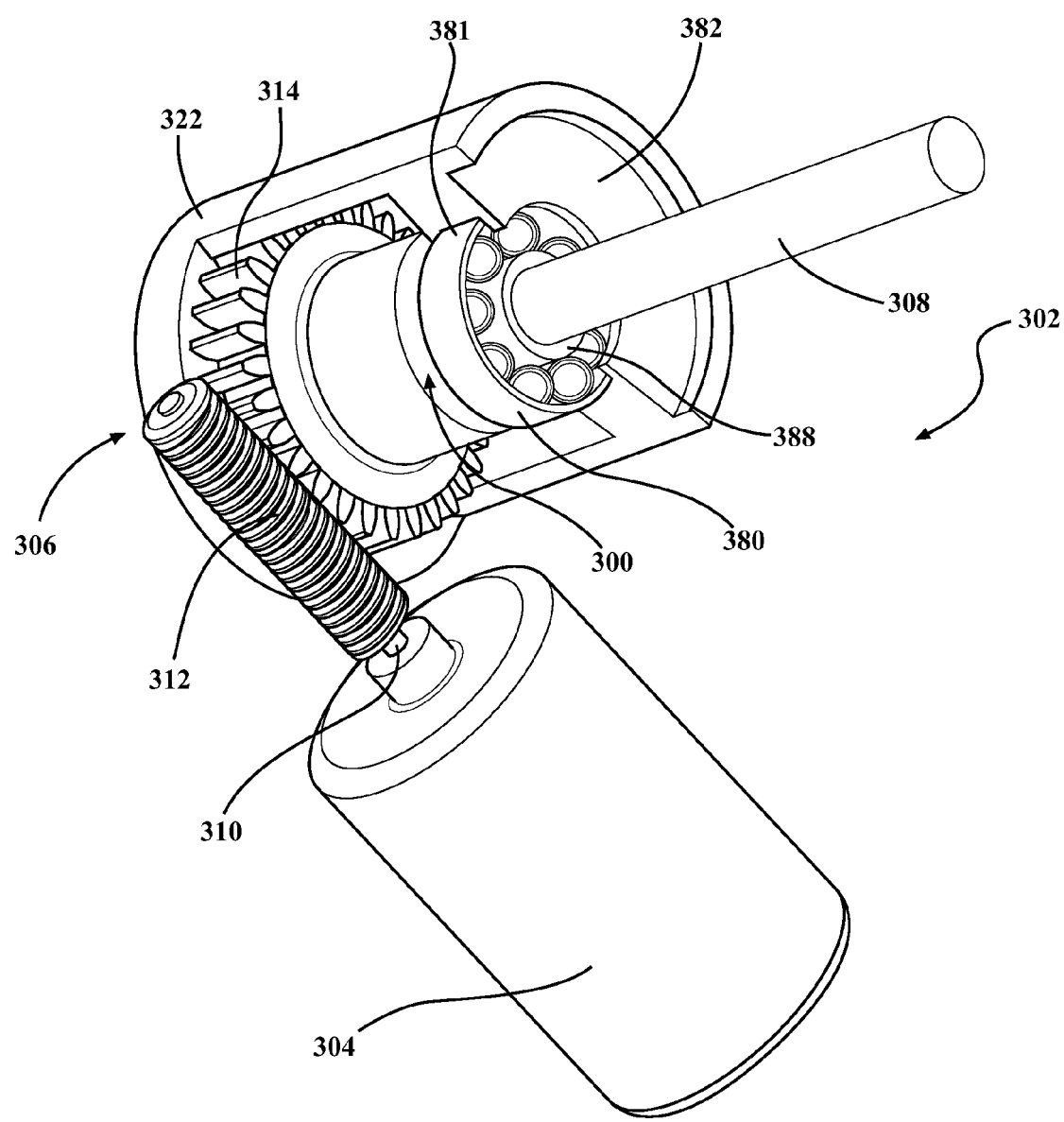
FIG. 14 is an assembled perspective view of an integrated flex coupling and slip clutch device configured for use with an electromechanical strut of the type generally shown in FIGS. 6 and 7 and which is shown operably positioned in a power unit between the motor-gear assembly and the power screw.
Figure 15:
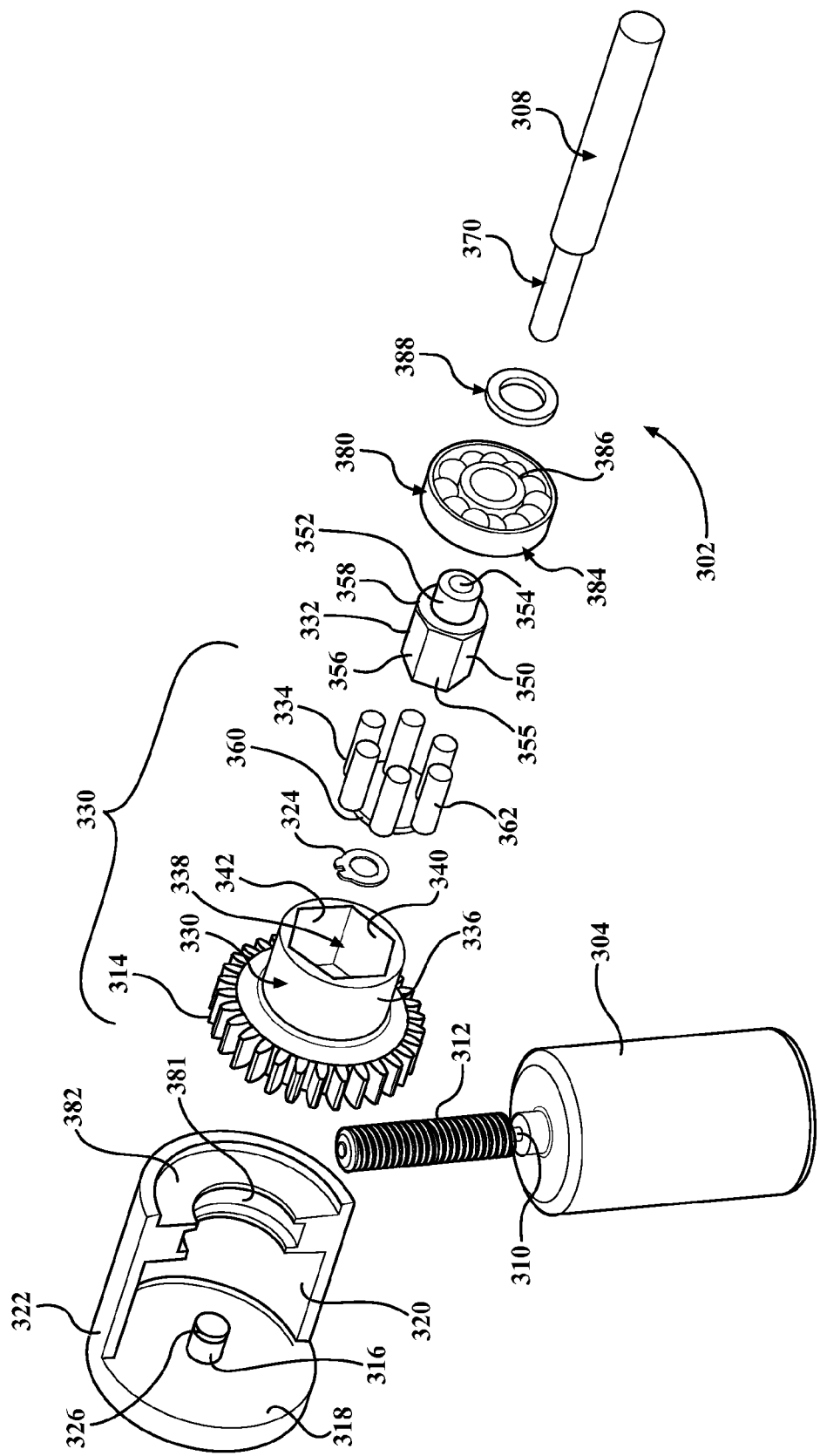
FIG. 15 is an exploded perspective view of the integrated flex coupling and slip clutch device shown in FIG. 14.

In accordance with the teachings of the present disclosure, an integrated flex coupling and slip clutch device, hereinafter referred to as "clutch/coupling assembly" 300 will now be described in detail. Clutch/coupling assembly 300 is shown in FIGS. 14 and 15 operably associated with a power unit 302 of the type well suited for use with electromechanical strut 100 shown and described previously with reference to FIGS. 6 and 7, by way of example and without limitation. Those skilled in the art will recognize that clutch/coupling assembly 300 can easily be adapted for use with the inline power units associated with the inline electromechanical struts, such as electromechanical struts 10 (FIG. 2), 10' (FIGS. 4-5) and 200 (FIG. 8).

Referring to FIGS. 14 and 15, power unit 302 is shown to generally include an electric motor 304, a worm gearset 306, and a power screw 308 in addition to clutch/coupling assembly 300. Electric motor 304 includes a rotary output shaft 310 to which a worm 312 of a worm gearset 306 is fixed for common rotation. A worm gearwheel 314 of worm gearset 306 is rotatably mounted on a journal post 316 extending from a planar end surface 318 of a cylindrical chamber 320 formed within a gearset housing 322. A central aperture (not shown) in worm gearwheel 314 is sized to receive journal post 316 therein. A clip retainer 324 is configured to be retained in a circumferential groove 326 formed in post 316 for axially locating and retaining worm gearwheel 314 within chamber 320 for rotation on post 316. Worm gearwheel 314 is in constant meshed engagement with worm 312.

Clutch/coupling assembly 300 generally includes a first or outer coupling member 330, a second or inner coupling member 332, and a flex coupling device, also referred to a flex member 334. First coupling member 330 is best shown in FIG. 15 to be defined by a first tubular component that is fixed to or formed integrally with worm gearwheel 314. As such, first coupling member 330 is coupled for common rotation with worm gearwheel 314. As noted, first coupling member 330 is tubular member which includes a circular outer surface 336 and a non-circular inner surface 338 defining a plurality of drive surfaces 340. In the particular embodiment shown, first coupling member 300 has a plurality of six drive surfaces 340 defining a six-sided polygon based on a regular hexagon configuration, by way of example and without limitation. Each of drive surfaces 340 intersects an adjacent drive surface to define an interior angle of 120°. A non-circular drive chamber 342 is defined inwardly of drive surfaces 340.

Second coupling member 332 is a second tubular component including a tubular driver section 350 and a tubular boss section 352, which together define a common central aperture 354. Driver section 350 includes a non-circular outer surface 355 defining a plurality of driven surfaces 356. In the particular embodiment shown, second coupling member 332 has a plurality of six driven surfaces 356 defining a six-sided polygon based on a regular hexagon configuration. Each of the driven surfaces 356 intersects an adjacent driven surface to define an exterior angle of 240°. A shoulder surface 358 is formed between driver section 350 and boss section 352 of second coupling member 332.

Flex member 334 is resilient component shown to include a ring section 360 and a plurality of deformable cylindrical plugs 362 extending axially from ring section 360. Ring section 360 preferably has a central aperture (not shown) sized to be seated on an end portion of post 316 such that flex member 334 is adapted to be received and seated within the drive chamber 342 of first coupling member 330. As will be detailed hereafter with greater specificity, resilient plugs 362 are arranged to engage and be preloaded against drive surface 340 of first coupling member 330 and against driven surfaces 356 of second coupling member 332.

With continued reference to FIGS. 14 and 15, an end section 370 of power screw 308 is disposed in central aperture 354 of second coupling member 332 and is configured such that power screw 308 is drivingly coupled and fixed for common rotation with second coupling member 332. This drive connection can be established by any mechanism including, for example, splines, lugs, threads, and/or weld joint. If splined, external splines formed on end section 370 of power screw 308 would mate with internal splines formed in central aperture 354 of second coupling member 332. Likewise, if a lugged drive connection is provided, end section 370 would have a non-circular male portion adapted to matingly engage a non-circular female portion of central aperture 354. Obviously, any other suitable method of directly coupling power screw 308 for rotation with second coupling member 332 is within the scope of this disclosure.

A bearing assembly 380 is provided for rotatably supporting power screw 308 within housing 322. An annular groove 381 formed in a flange section 382 of housing 322 is provided for retaining and locating an outer race 384 of bearing assembly 380 relative to housing 322. An inner race 386 of bearing assembly 380 can be press-fit onto boss section 352 of second coupling member 332 and/or to a portion of power screw 308. Inner race 386 is axially held between shoulder 358 on second coupling member 332 by a washer 388 and a retaining clip (not shown). As will be detailed, clutch/coupling assembly 300, when assembled (See FIG. 14), permits a predetermined degree of angular movement of second coupling member 332 and power screw 308 relative to worm gearwheel 314 and first coupling member 330 due to the resiliency of plugs 362 and their biased engagement with portions of the drive 340 and driven 356 surfaces. Likewise, clutch/coupling assembly 300 functions to dampen shock loads, both axially and torsionally, associated with power unit 302 as well as functions to provide both drive and slip (overload) torque transfer capabilities.

Figure 16A:
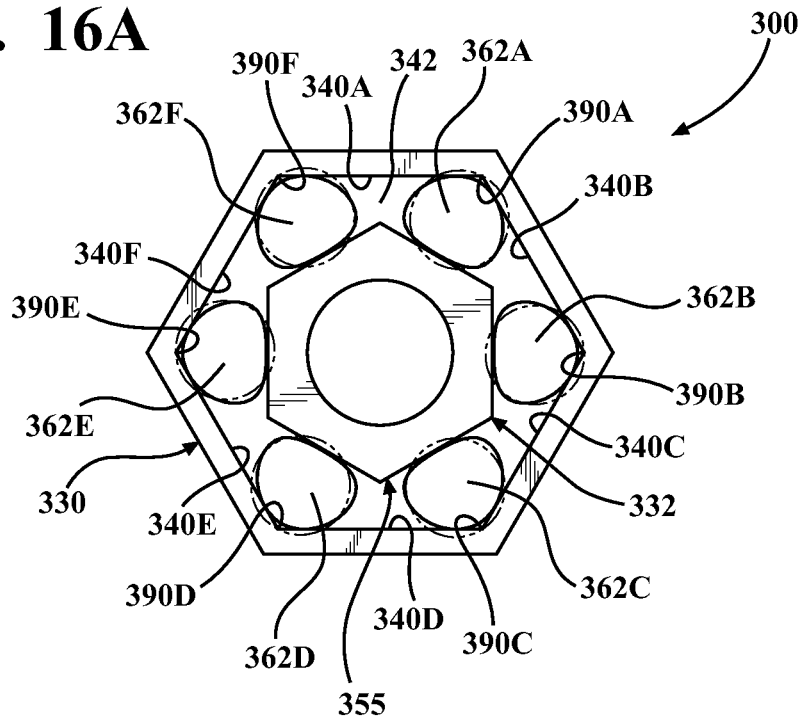
FIGS. 16A through 16C illustrate sectional views of the integrated flex coupling and slip clutch device in each of a neutral (unloaded) state, a drive (loaded) state, and a slip (overloaded) state.
Figure 16B:
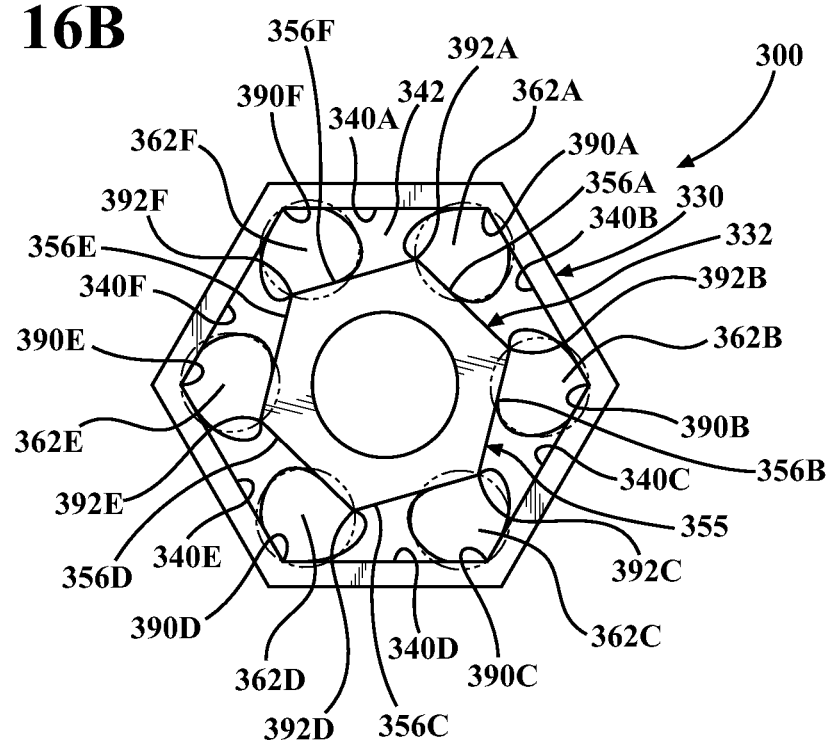
Figure 16C:
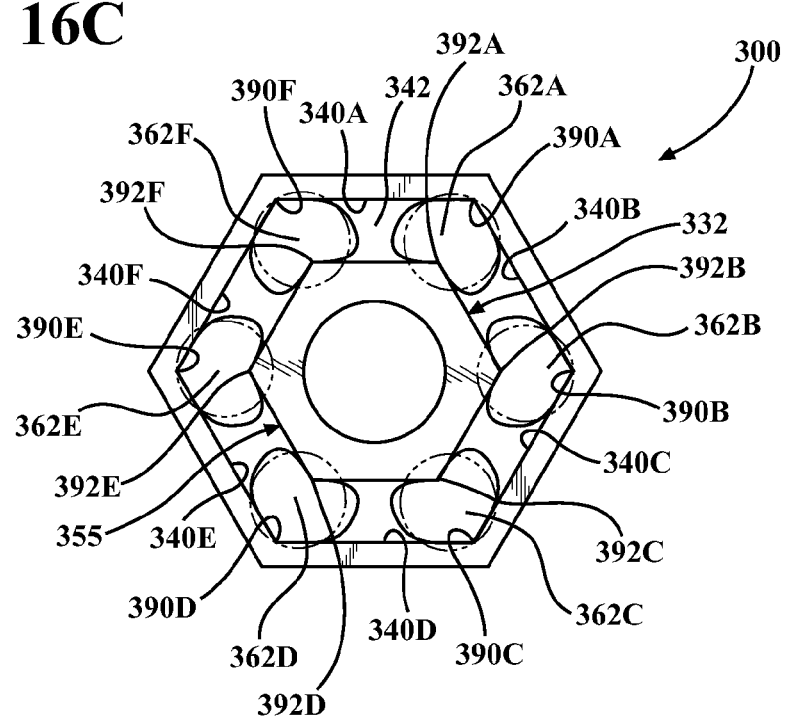

Referring now to FIGS. 16A through 16C, the positioning of plugs 362 of flex member 334 relative to drive surfaces 340 of first coupling member 330 and driven surfaces 356 of second coupling member 332 will be detailed for establishing at least three (3) distinct states of operation. Clutch/coupling assembly 300 is shown with first coupling member 330 having six drive surfaces 340A-340F; second coupling member 332 having six driven surfaces 356A-356F, and flex member 334 having six elongate, resilient plugs 362A-362F. In the example shown, driven surfaces 356A-356F are angularly offset or phased by about 60° with respect to drive surfaces 340A-340F. As seen, adjacent drive surfaces 340A-340F define corresponding internal angular interfaces 390A-390F while adjacent driven surfaces 356A-356F define corresponding external angular interfaces 392A-392F. Internal angular interfaces 390A-390F associated with first coupling member 330 are hereinafter referred to as retention joints 390A-390F while angular interfaces 392A-392F associated with second coupling member 332 are hereinafter referred to as corner points 392A-392F.

To provide one exemplary construction of clutch/coupling assembly 300, first coupling member 330 is a 1" hex tube having a 0.0625" wall thickness, second coupling member 332 is a 9/16" hex tube, and plugs 362 have a ¼" diameter and a durometer in the range of 50 A-70 A. Each plug 362 of flex member 334 is positioned to engage a corresponding one of retention joints 390 in first coupling member 330 while engaging outer surface 355 of second coupling member 332. Plugs 362 are preferably fabricated from rubber or other suitable resilient elastomeric materials and are sized to be elastically deformed upon assembly to establish a predefined preload force between first coupling member 330 and second coupling member 332. It should be noted that plugs 362 are shown with solid lines in FIGS. 16A-16C to illustrate their deformed configuration while phantom or dashed lines illustrate their non-deformed, pre-assembly configuration.

With initial reference to FIG. 16A, clutch/coupling assembly 300 is shown with its components positioned to define a Neutral or "Unloaded" state of operation. In this state, each plug 362 of flex member 334 engages one of driven surfaces 356 and no torsional load is applied to attempt to rotate either of first coupling member 330 and second coupling member relative to the other. In contrast, the relative positioning of the components of clutch/coupling 300 is shown in FIG. 16B to define a Drive or "Loaded" state of operation in which a torque-transferring drive connection is established by plugs 362 between the first 330 and second 332 coupling members. In this loaded state, driven rotation of worm gearwheel 314 via electric motor 304 will result in driven rotation of power screw 308 through clutch/coupling assembly 300 without slip. Likewise, clutch/coupling assembly 300 will also permit back-driving the loaded operating state. However, if a condition occurs where an excessive load above a predetermined value is applied to the lift gate, then a Slip or "Over-Loaded" state is established to permit relative rotation between the first 330 and second 332 coupling members. The position of the components of clutch/coupling assembly 300 in its Over-Loaded state is clearly shown in FIG. 16C where corner points 392 on second coupling member 332 have rotated past plugs 362, thereby passing from one side of the plugs 362 to an opposite side of the plugs 362 in ratcheting-type fashion. Such a ratcheting action will continue to allow a slip condition until the load applied to assembly 300 is reduced below its predetermined slip torque value, which can be precisely controlled by controlling the physical properties, i.e. material, configuration, and dimensions, of the components 330, 332, 334.

Figure 17A:
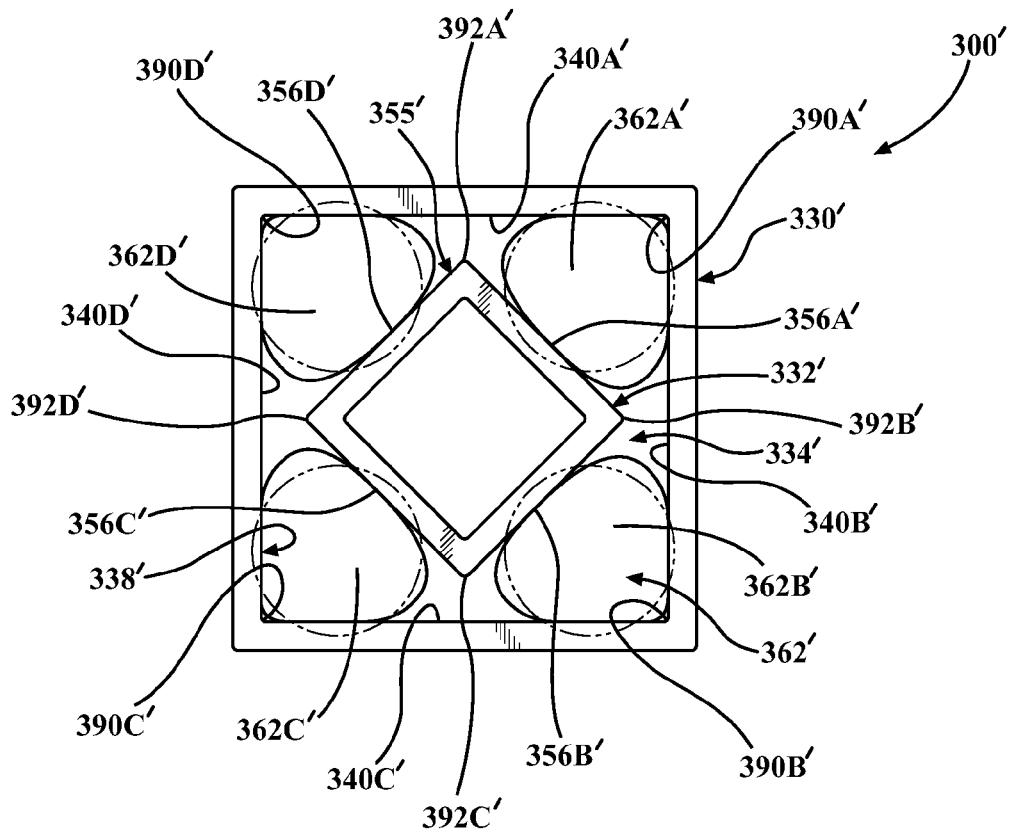
FIGS. 17A through 17C illustrate sectional views of an alternative configuration for the integrated flex coupling and slip clutch device of the present disclosure.
Figure 17B:
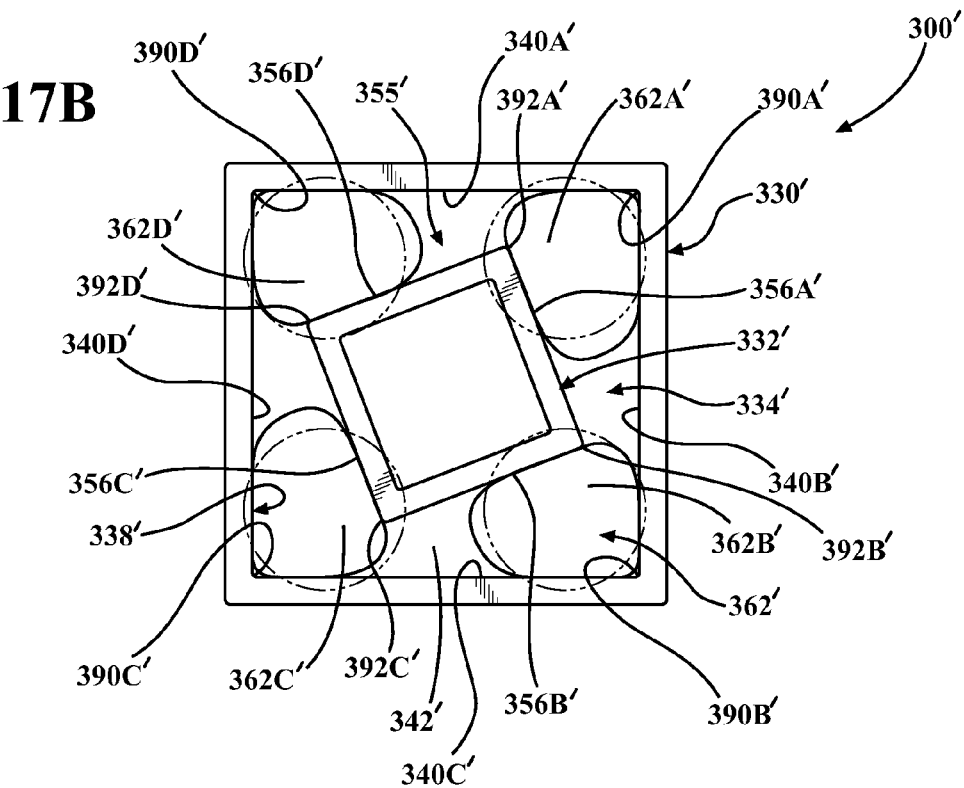
Figure 17C:
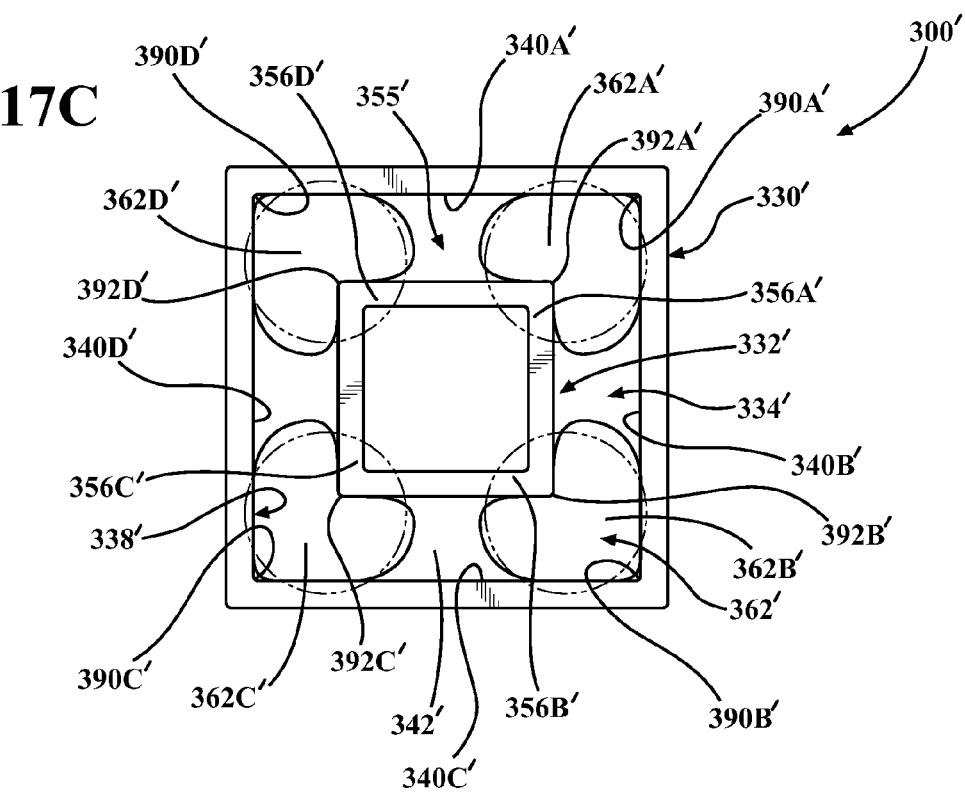
Figure 19A:
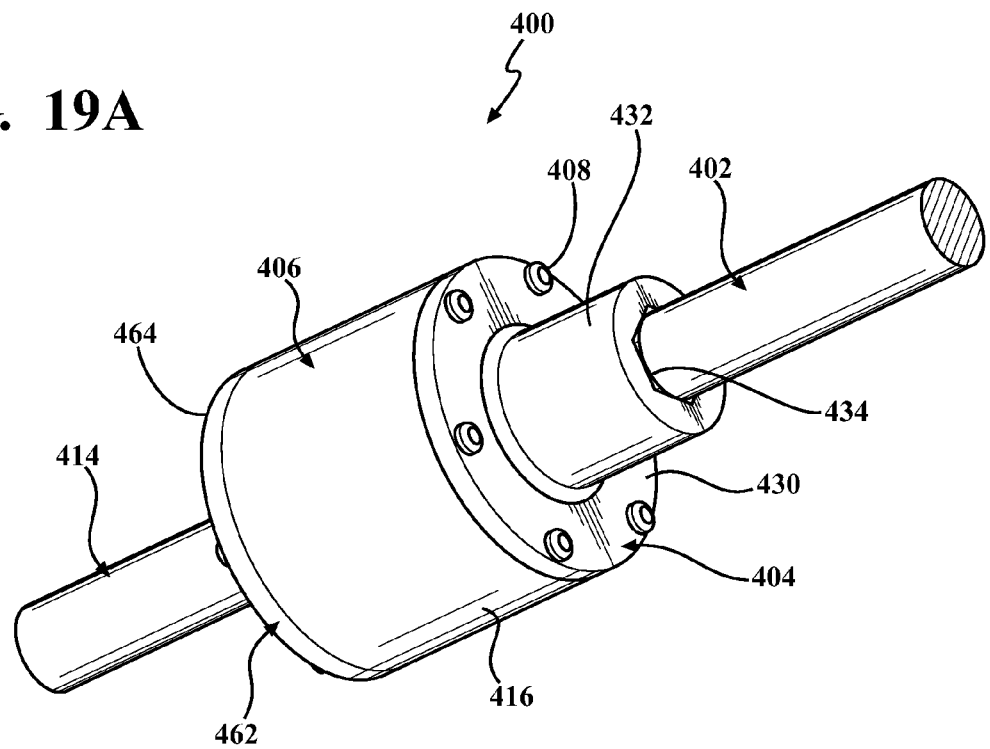
FIGS. 19A and 19B are perspective views of a "stand-alone" plug-in type version of an integrated flex coupling and slip clutch device adapted for use in electromechanical struts and constructed in accordance with the present disclosure.
Figure 19B:
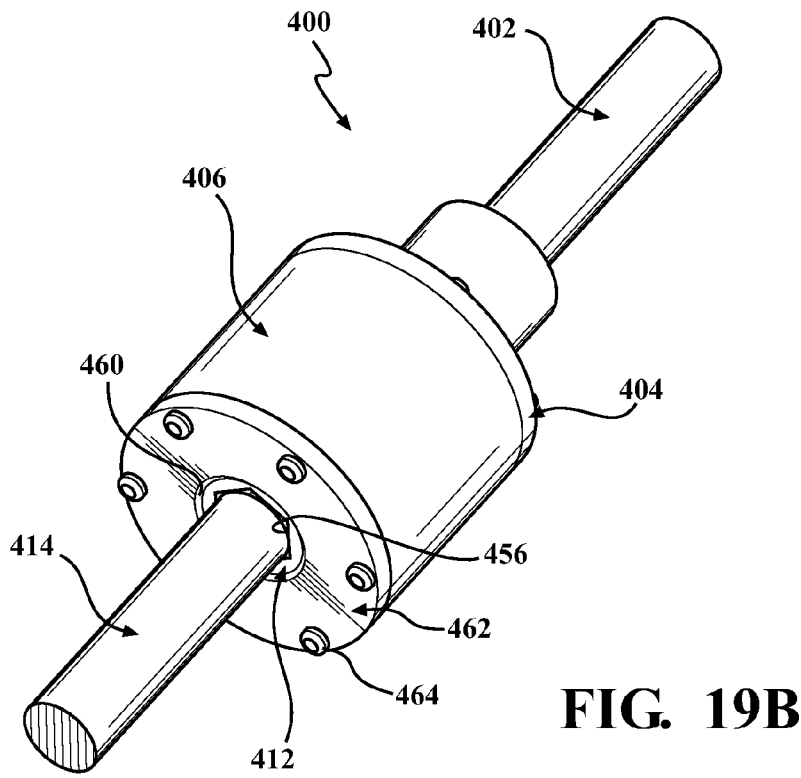

Referring now to FIGS. 17A-17C, a clutch/coupling assembly 300' is illustrated which is generally constructed to be an alternative configuration of clutch/coupling 300 shown in FIGS. 16A-16C. As such, clutch/coupling assembly 300' is likewise applicable for use in all of the electromechanical struts disclosed herein, by way of example and without limitation. In general, clutch/coupling assembly 300' includes a first coupling member 330', a second coupling member 332', and a flex member 334'. First coupling member 330' is a first tubular component adapted to be fixed to or formed integrally with worm gearwheel 314 and includes a non-circular inner surface 338' defining a plurality of four (4) drive surfaces 340' defining a regular square configuration. Each drive surface 340' intersects an adjacent drive surface to define a retention joint 390' having a 90° interior angle. The four drive surfaces 340' are identified as surfaces 340A'-340D' while the four retention joints 390' are identified as joints 390A'-390D'.

Similarly, second coupling member 332' is a second tubular component adapted to be drivingly coupled to power screw 308. Second coupling member 332' includes a non-circular outer surface 355' defining a plurality of four (4) driven surfaces 356' defining a regular square configuration. Each driven surface 356' intersects an adjacent driven surface to define a corner point 392' having a 270° exterior angle. The four driven surfaces 356' are identified as driven surfaces 356A'-356D' while corner points 392' are identified as points 392A'-392D'. Flex member 334' includes a ring section (not shown) and a plurality of four (4) resilient plugs 362'. Plugs 362' are identified as plugs 362A'-362D'. As discussed above with regard to clutch/coupling assembly 300, FIG. 17A shows a Neutral or "Unloaded" state of operation; FIG. 17B shows a Drive or "Loaded" state of operation in which a torque-transferring drive connection is established by plugs 362' between the first 330' and second 332' coupling members, and FIG. 17C shows a Slip or "Over-Loaded" state is established to permit relative rotation between the first 330' and second 332' coupling members.

Referring now to FIGS. 18 and 18A, a plurality of four (4) different exemplary samples of clutch/coupling assemblies constructed similarly to that shown in FIGS. 17A-17C are illustrated. FIG. 18A is a table listing the size and material for the first coupling member (i.e. outer coupling member), the second coupling member (i.e. inner coupling member), and the plugs of the flex member. In addition, slip data for a predetermined range of angular relative movement (15° clockwise CW-15° counter-clockwise CCW) at different temperatures is shown to verify the applicability of such clutch/coupling assemblies in electromechanical struts. Sample #1 is clutch/coupling assembly 300' (1), Sample #2 is clutch/coupling assembly 300' (2), Sample #3 is clutch/coupling assembly 300' (3), and Sample #4 is clutch/coupling assembly 300' (4).

In operation, clutch/coupling assembly 300, 300' is configured to permit electric motor 304 to rotate worm wheel 314, via driving rotation of worm 312, and drive power screw 308 through the clutch/coupling assembly. If the slip load is exceeded, second coupling member 332, 332' is permitted to turn relative to worm wheel 314 by elastically compressing plugs 362, 362' enough to index or ratchet to the next drive position, which continues until the load is reduced below the slip load force. Plugs 362, 362' allow for angular and radial misalignment and/or non-concentricity between power screw 308 and worm wheel 314. As noted, flex member 334, 334' is made from a flexible, elastically compressible and thermally-stable material (i.e. rubber, elastomer, etc.) to provide consistent driving and slipping performance across the required operating temperatures. To this end, increased softness or flexibility and/or shorter plugs will allow for greater misalignment and provide a lower slip torque between the first and second coupling members 330, 332, 330', 332'. In contrast, less flexible, harder and/or longer plugs will allow for less misalignment and provide a higher torque slip value between the first and second coupling members.

Referring now to FIGS. 19 through 23, a plug-in or "stand-alone" version of a clutch/coupling assembly 400 is generally shown to include an input shaft 402, an input coupling 404 adapted to be secured to a cylindrical housing 406 via first fasteners 408, a plurality of resilient flex components 410 (FIGS. 21-23), an output coupling 412, and an output shaft 414. As best seen from the exploded views, housing 406 includes a circular outer surface 416 and a non-circular inner surface 418 defining a plurality of drive surfaces 420. Inner surface 418 is configured to have six drive surfaces 420 so as to define a regular hexagon with adjacent drive surfaces 420 intersecting at 120° to define a plurality of internal retention joints 422. Housing 406 includes a first open end defining a planar first end surface 424 having a plurality of mounting apertures 426 formed therein. A non-circular drive chamber 428, shown as being hexagonal, is formed inside of housing 406.

Input coupling 404 includes a plate segment 430 and a tubular boss segment 432. Boss segment 432 includes an aperture 434 configured to receive a drive segment 436 of input shaft 402 therein. As shown, aperture 434 has a non-circular inner surface configured to drivingly engage a non-circular outer surface on drive segment 436 of input shaft 402 to prevent relative rotation therebetween. As an option to the "lugged" drive connection shown, a splined drive connection could also be utilized to couple input shaft 402 for conjoint rotation with input coupling 404. In addition, first fasteners 408 pass through mounting bores 440 in plate segment 430 and mounting apertures 426 in housing 406 to rigidly secure input coupling 404 to first end surface 224 of housing 406. As such, input shaft 402 is adapted to be drivingly coupled to housing 406 via input coupling 404, such that the input shaft 402 and housing 406 are fixed against relative rotation with one another. Those skilled in the art will appreciate that the male/female connection between input shaft 402 and input coupling 404 could be reversed if the application warranted such an alternative drive connector.

Output coupling 412 is best shown in the exploded views to have a non-circular outer surface 450 defining a plurality of driven surfaces 452. Outer surface 450 is configured to include six (6) driven surfaces 452 so as to define a regular hexagon with adjacent driven surfaces 452 intersecting at 240° to define a plurality of corner points 454. Output coupling 412 further includes an aperture 456 configured to receive a drive segment 458 of output shaft 414 therein. As shown, aperture 456 has a non-circular inner surface configured to drivingly engage a non-circular outer surface formed on drive segment 458 of output shaft 414. As an option to this lug-type male/female drive connection, a splined-type male/female drive connection could be used to couple output coupling 412 for common rotation with output shaft 414.

As shown, drive segment 458 of output shaft 414 is introduced through a central aperture 460 of a cover plate 462 that is secured to housing 406. In particular, a set of second fasteners 464 pass through mounting bores 466 in cover plate 462 and are retained in mounting apertures 468 formed in a second planar end surface 470 at a second open end of housing 406. Central aperture 460 in cover plate 462 is sized to permit output shaft 414 to rotate (i.e. angularly index) relative to housing 406.

A plurality of six flex components 410 are shown associated with clutch/coupling assembly 400. Each flex component 410 is a resilient and deformable member fabricated into a right cylindrical configuration. As an alternative to individual flex components 410, a unitary flex unit having a base segment from which the flex components 410 extend axially in a circumferential arrangement can also be used, such as discussed above with regard to flex member 334. The ring-like base segment could be disposed within drive chamber 428. As detailed previously, each deformable member or plug 410 is disposed within drive chamber 428 and is biased into engagement with a corresponding one of retention joints 422 and a corresponding one of driven surfaces 452.

Figure 21:
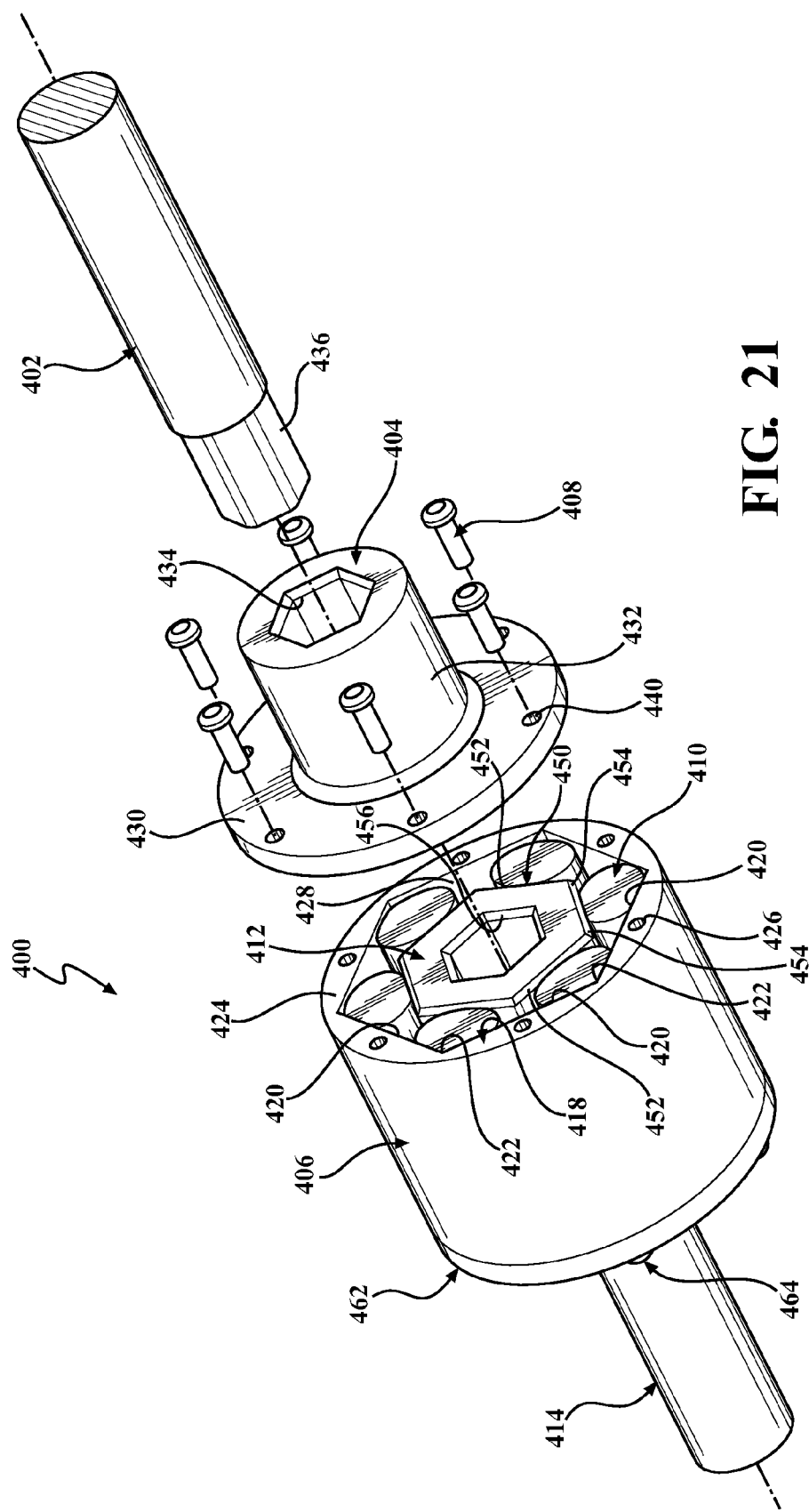
FIG. 21 is a partially exploded perspective view of the stand-alone version of the integrated flex coupling and slip clutch device shown in FIGS. 19 and 20.
Figure 22:
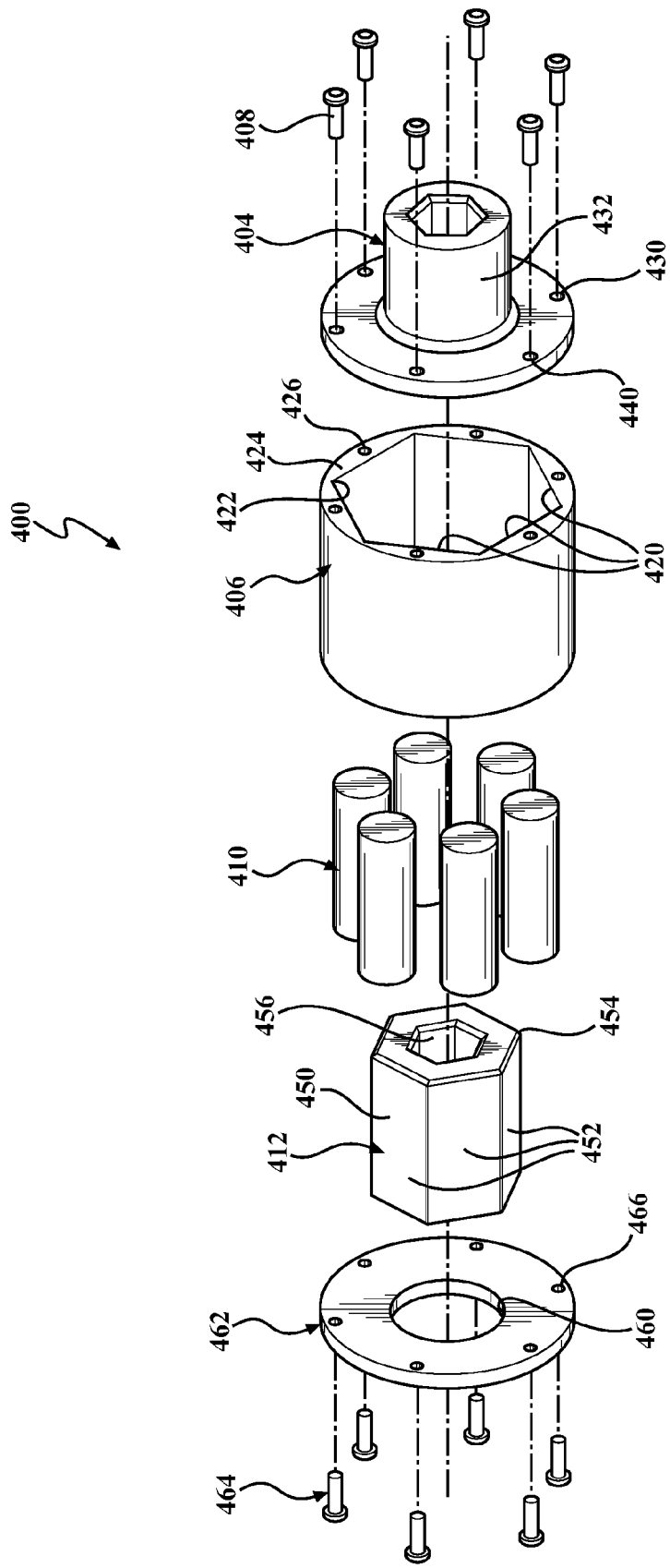
FIG. 22 is a fully exploded perspective view of the stand-alone version of the integrated flex coupling and slip clutch device shown in FIGS. 19-21.
Figure 23A:
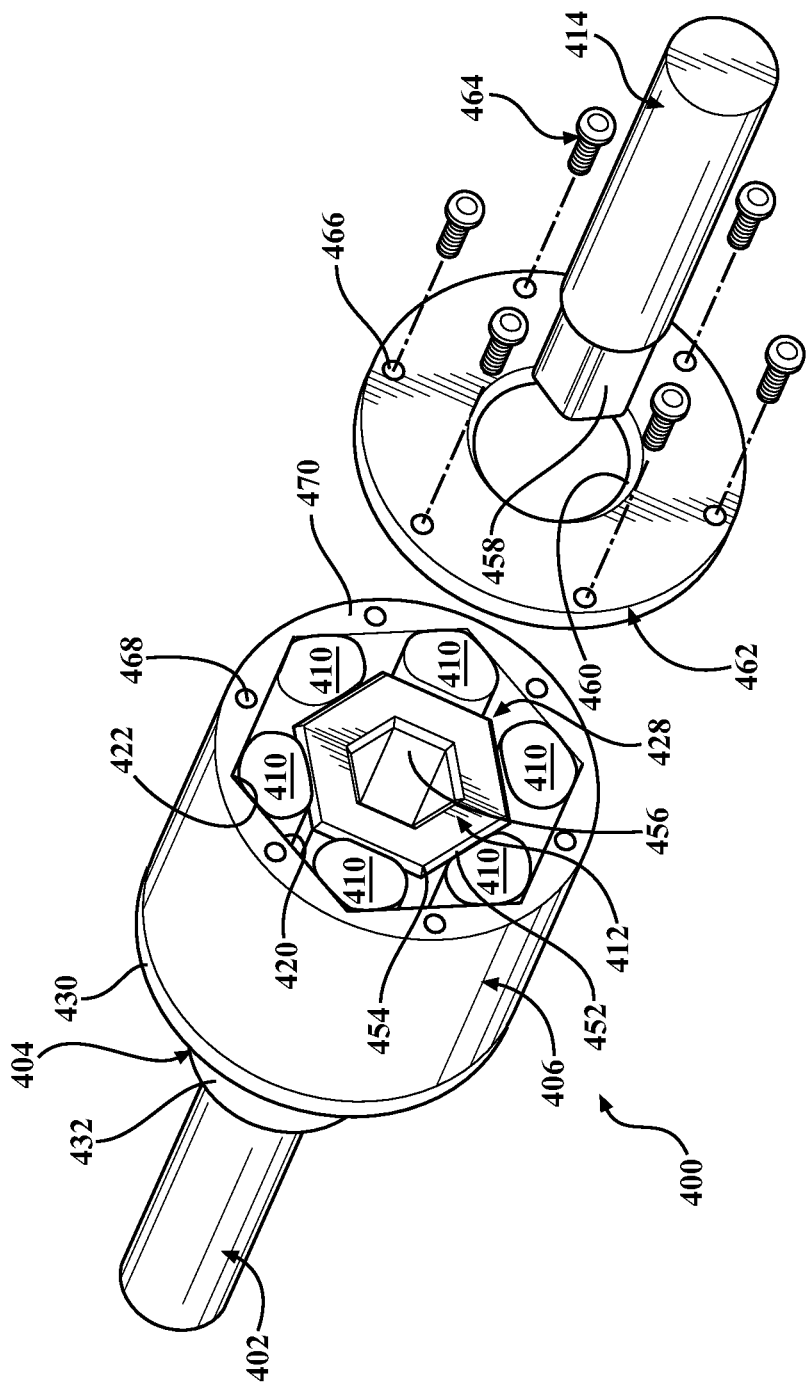
FIGS. 23A through 23C are partially exploded perspective views illustrating the components of the stand-alone integrated flex coupling and slip clutch device in each of the operating states.
Figure 23B:
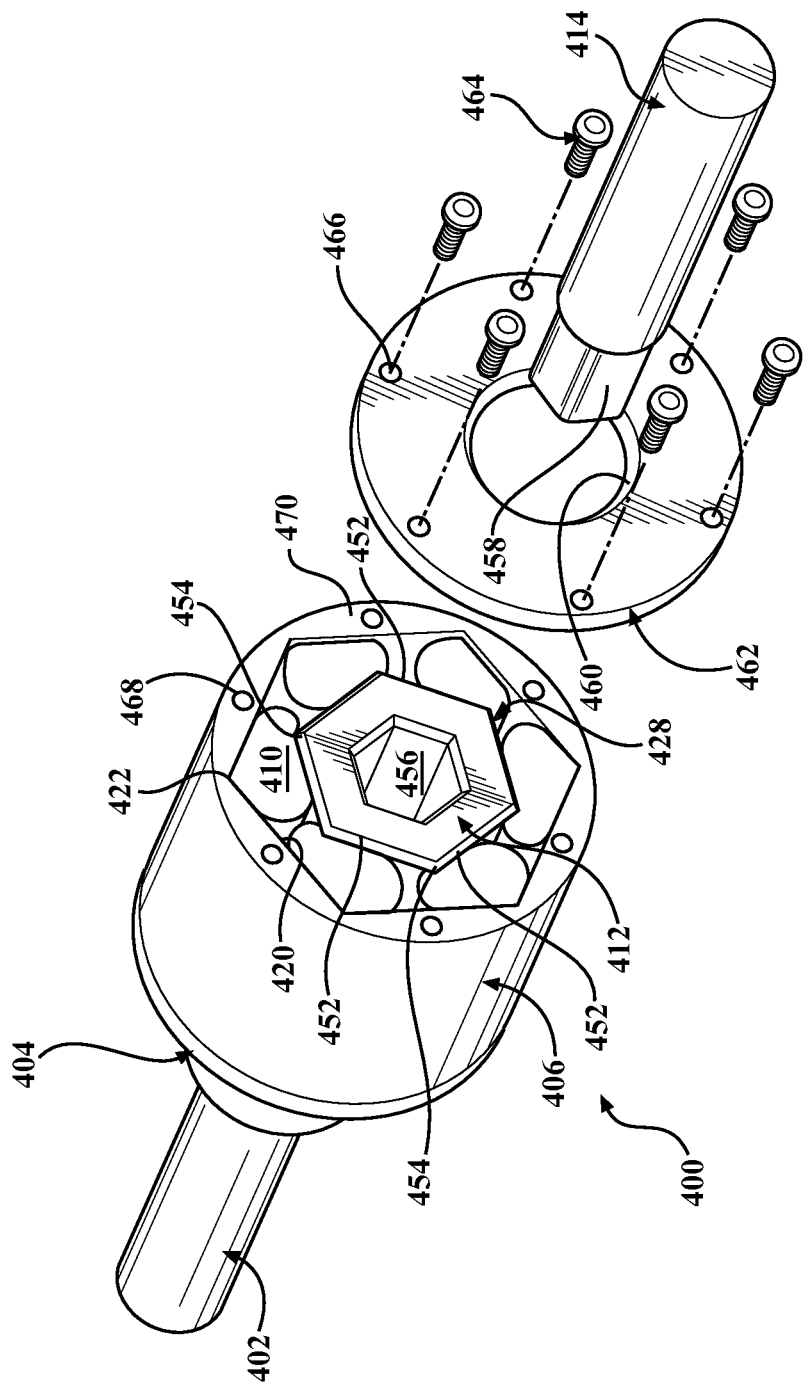
Figure 23C:
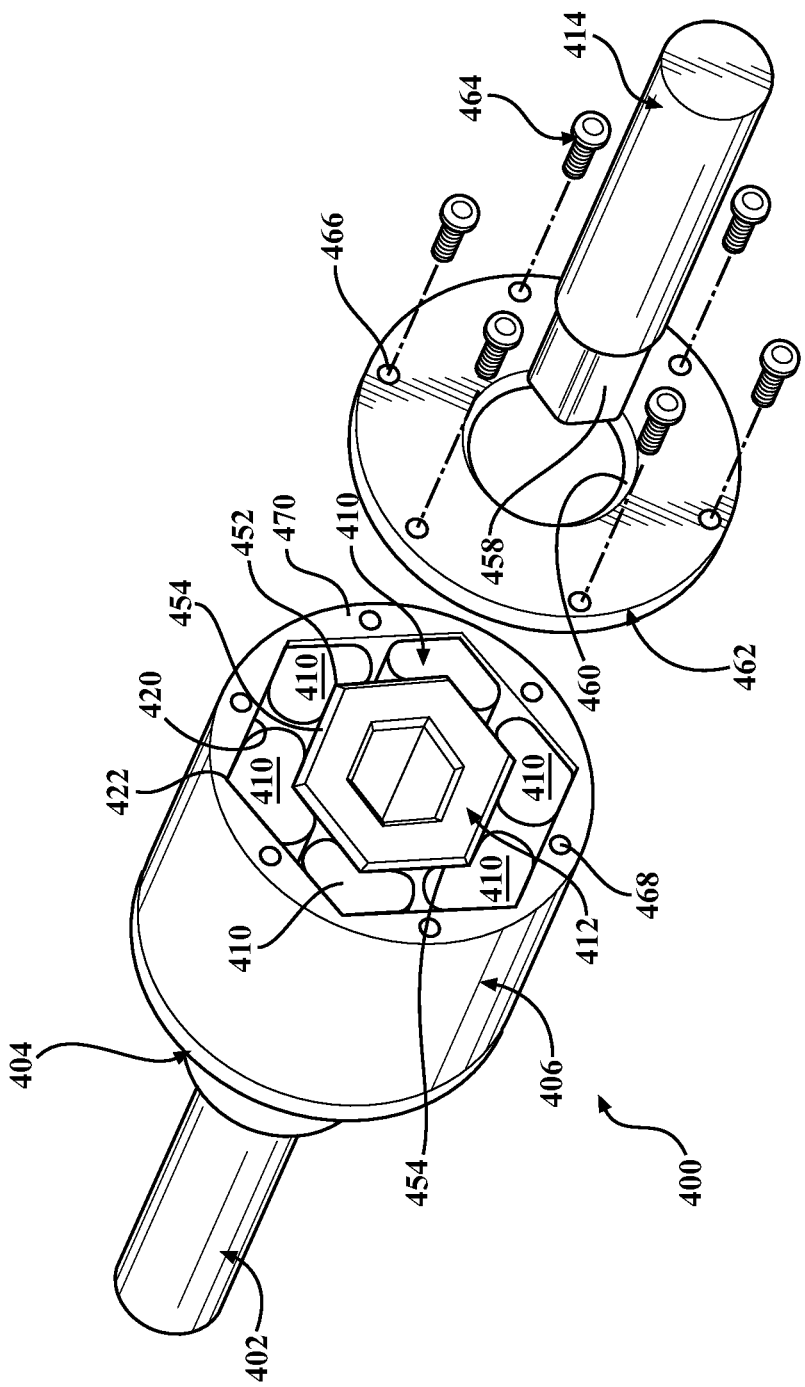

Clutch/coupling assembly 400 is configured to establish three distinct operating modes or states including a Neutral (Assembled) state, a Torque Transfer (Drive) state, and a Slip (Overload) state. FIGS. 21 and 23A illustrate the location of plugs 410 within drive chamber 428 to establish the unloaded Neutral state. In contrast, FIG. 23B illustrates the location of plugs 410 within chamber 428 when torque is transferred without slip between input shaft 402 and output shaft 414. In this state, drive surfaces 420 have indexed slightly relative to driven surfaces 452 to deform plugs 410 and provide an indirect torque transfer path between input shaft 402 and output shaft 414. Finally, FIG. 23C illustrates the location of plugs 410 within chamber 428 when the slip torque value of assembly 400 has been exceeded and output coupling 412 has completely indexed (i.e. ratcheted) to facilitate rotational slip between input shaft 402 and output shaft 414, such that the input shaft 402 rotates in its drive direction, while the output shaft 414 lags.

While plugs 410 are shown to be independent components, it is contemplated that plugs 410 could be permanently bonded to drive surfaces 420 within drive chamber 428 of housing 406 or, in the alternative, could be permanently bonded to driven surface 452 on output coupling 412. In addition, clutch/coupling 400 is configured to permit output coupling 412 to rotate relative to plugs 410 and housing 406. However, those skilled in the art will recognize that clutch/coupling assembly 400 could alternatively be configured to permit output coupling 412 and plugs 410 to rotate together relative to housing 406. While clutch/coupling assembly 400 is configured to drivingly couple input shaft 402 to an output member of the electric motor and drivingly couple output shaft 414 to an input portion of the power screw, those skilled in the art will appreciate that these connections can be reversed.

Referring now to FIGS. 24 through 27, another version of a clutch/coupling assembly 500 is shown and which is generally configured to be easily substituted for clutch/coupling assembly 300 within power unit 302, as previously shown and described in reference to FIGS. 14 and 15. As such, clutch/coupling assembly 500 is well suited for use with the power unit associated with electromechanical strut 100 (FIGS. 6, 7), as well as being readily adaptable for use with the power units associated with in-line electromechanical struts 10 (FIG. 2), 10' (FIGS. 4-5) and 200 (FIG. 8).

Clutch/coupling assembly 500 generally includes a first or outer coupling member 502, a second or inner coupling member 504, and a plurality of resilient flex members 506. First coupling member 502 is a first tubular component adapted to be fixed to gearwheel 314 of worm gearset 306. As previously disclosed, gearwheel 314 is rotatably mounted on journal post 316 within chamber 320 of gearset housing 322. Since gearwheel 314 is in constant mesh with worm 312, first coupling member 502 is rotatably driven by electric motor 304 at a reduced speed and increased torque amplification associated with worm gearset 306. First, coupling member 502 includes a circular outer surface 508 and a non-circular inner surface 510. Non-circular inner surface 510 is configured in a sinusoidal or uniformly "scalloped" pattern to define a plurality of radially-inwardly extending lobes 512 interconnected by a plurality of valleys or recesses 514, which all extend longitudinally along the entire length of first coupling member 502. In the particular embodiment shown, inner surface 510 is formed to include a plurality of twelve (12) lobes 512 interconnected by a plurality of twelve (12) recesses 514. Inner surface 510 defines a non-circular or scalloped internal drive chamber 516.

Second coupling member 504 is a second tubular component defining a driver section 520 and boss section 522 which together define a common central aperture 524. Driver section 520 includes a ring portion 526 and a plurality of axially-extending elongated lugs 528 extending between ring portion 526 and boss section 522. In the embodiment shown, a plurality of six (6) lugs 528 are equally-spaced circumferentially from one another and cooperate to define a plurality of six (6) retention slots 530 therebetween. Each retention slot 530 has a pair of facing arcuately-shaped sidewalls 532A, 532B associated with adjacent lugs 528 which are sized to locate and retain a corresponding one of the plurality of six (6) flex components 506 therein. Each flex component 506 is configured as a resilient, deformable cylindrical plug having a cylindrical outer surface 538 bounded endwise by a planar first end surface 540 and a planar second end surface 542. First end surface 540 of each resilient plug 506 rests against, or is in close proximity to, a corresponding stop surface 544 within retention slot 530 and associated with ring portion 526. Second end surface 542 of each resilient plug 506 rests against, or is in close proximity to, a face surface of a spacer ring 550 configured to be mounted on cylindrical boss section 522. As such, resilient plugs 506 are axially located and retained within retention slots 530. As will be detailed hereinafter with greater specificity, resilient plugs 506 are arranged to engage and be preloaded in compression against lobes 512 of first coupling member 502 and sidewalls 532A, 532B of lugs 528 of second coupling member 504.

Figure 24:
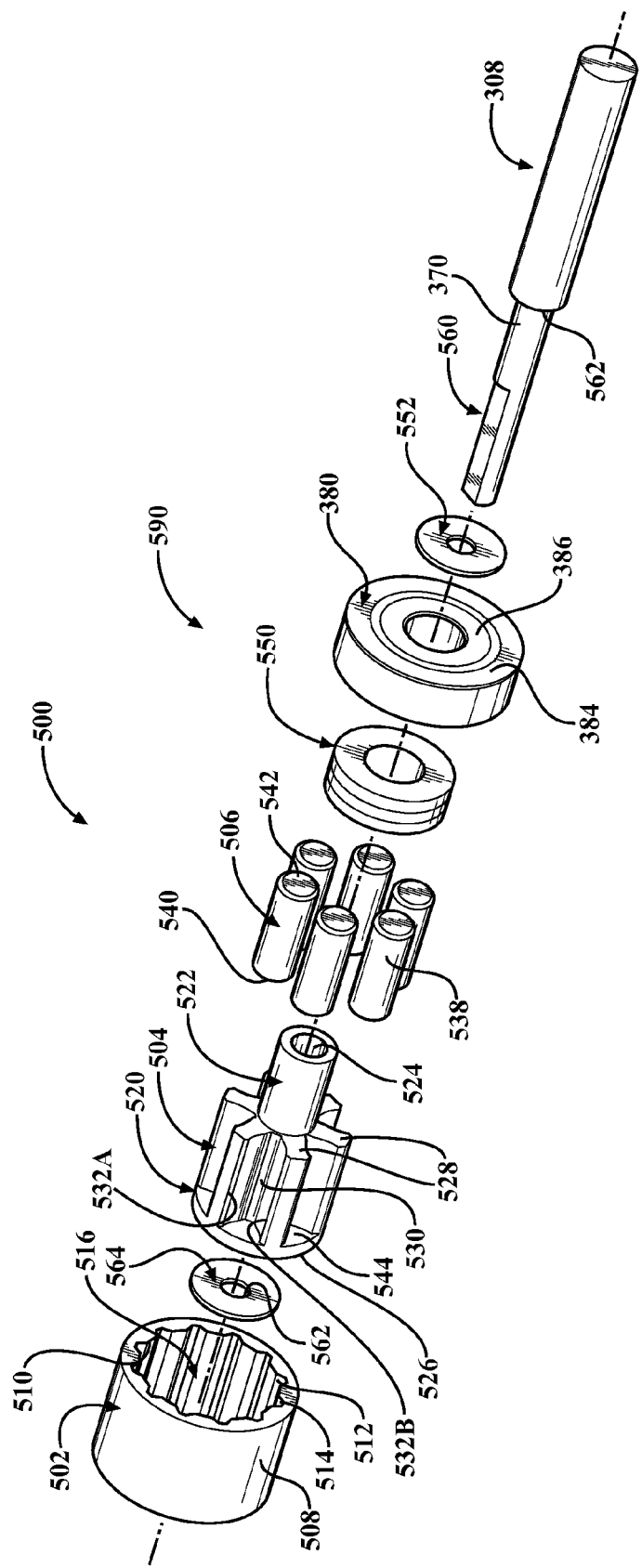
FIG. 24 is a fully exploded perspective view of an integrated flex coupling and slip clutch device constructed in accordance with an alternative embodiment and which is adapted for use with the power unit shown in FIG. 14.

As best seen from FIG. 24, end section 370 of power screw 308 is adapted to be disposed within central aperture 524 and configured to drivingly couple power screw 308 for common rotation with second coupling member 504. In the particular embodiment shown, a non-round, "shaped" male portion 560 formed on end section 370 is adapted to be retained in a similarly-shaped female portion (not shown) of central aperture 524 as well as a similarly "shaped" aperture 562 of a washer ring 564. A rivet 566 (FIG. 26), or other suitable fastener, is used to constrain axial movement of power screw 308 relative to second coupling member 504. As an option to the "lugged" male/female connection, a splined connection is likewise applicable to fix power screw 308 for conjoint rotation with second coupling member 504.

Bearing assembly 380 is again provided for rotatably supporting power screw 308 within housing 322. Inner race 386 is press-fit onto boss section 522 of second coupling member 504 and/or a portion of end section 370 of power screw 308. Inner race 386 is held axially between spacer ring 550 and a washer ring 552 against shoulder surface 562 on power screw 308. Outer race 384 of bearing assembly 380 is retained in annular groove 381 in flange section 382 of housing 322 so as to locate and retain bearing assembly 380 relative to housing 322. Based on the components illustrated, a "pre-assembled" power screw assembly 590 would include power screw 308, spacer ring 550, resilient plugs 506, second coupling member 504, washer ring 564 and rivet 566. Upon assembly of power screw assembly 590 with first coupling member 502, clutch/coupling assembly 500 permits limited, slight angular movement of second coupling member 504 relative to first coupling member 502 due to the resiliency of plugs 506. Likewise, clutch/coupling assembly 500 functions to dampen shock loads, both axially and torgionally, associated with the power unit as well as function to provide both (loaded) and slip (overloaded) torque transfer capabilities.

Figure 27A:
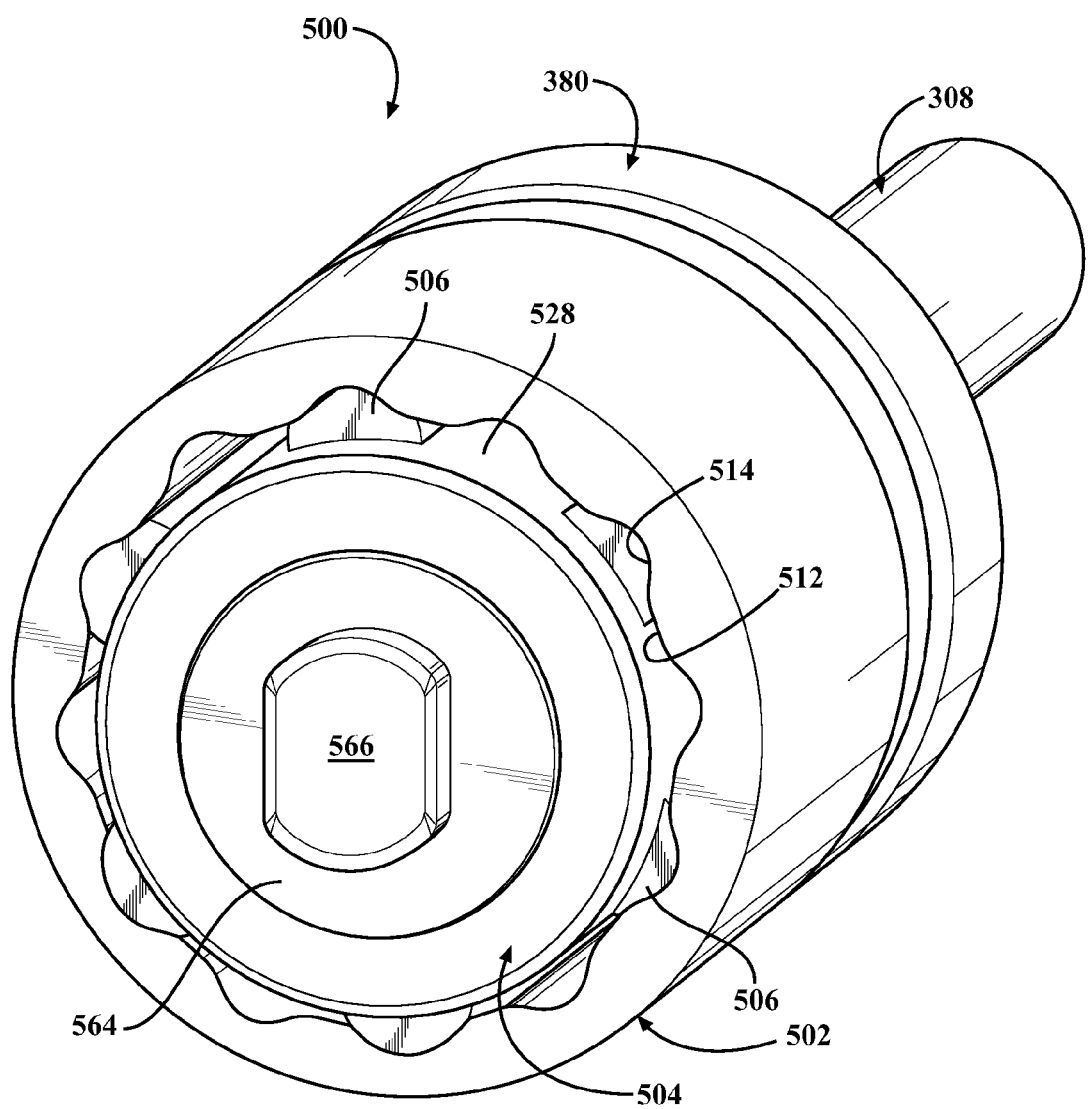
FIGS. 27A-27C illustrate assembled perspective views of the integrated flex coupling and slip clutch device shown in FIGS. 24-26 in each of a neutral (unloaded) state, a drive (loaded) state, and a slip (over-loaded) state.
Figure 27B:
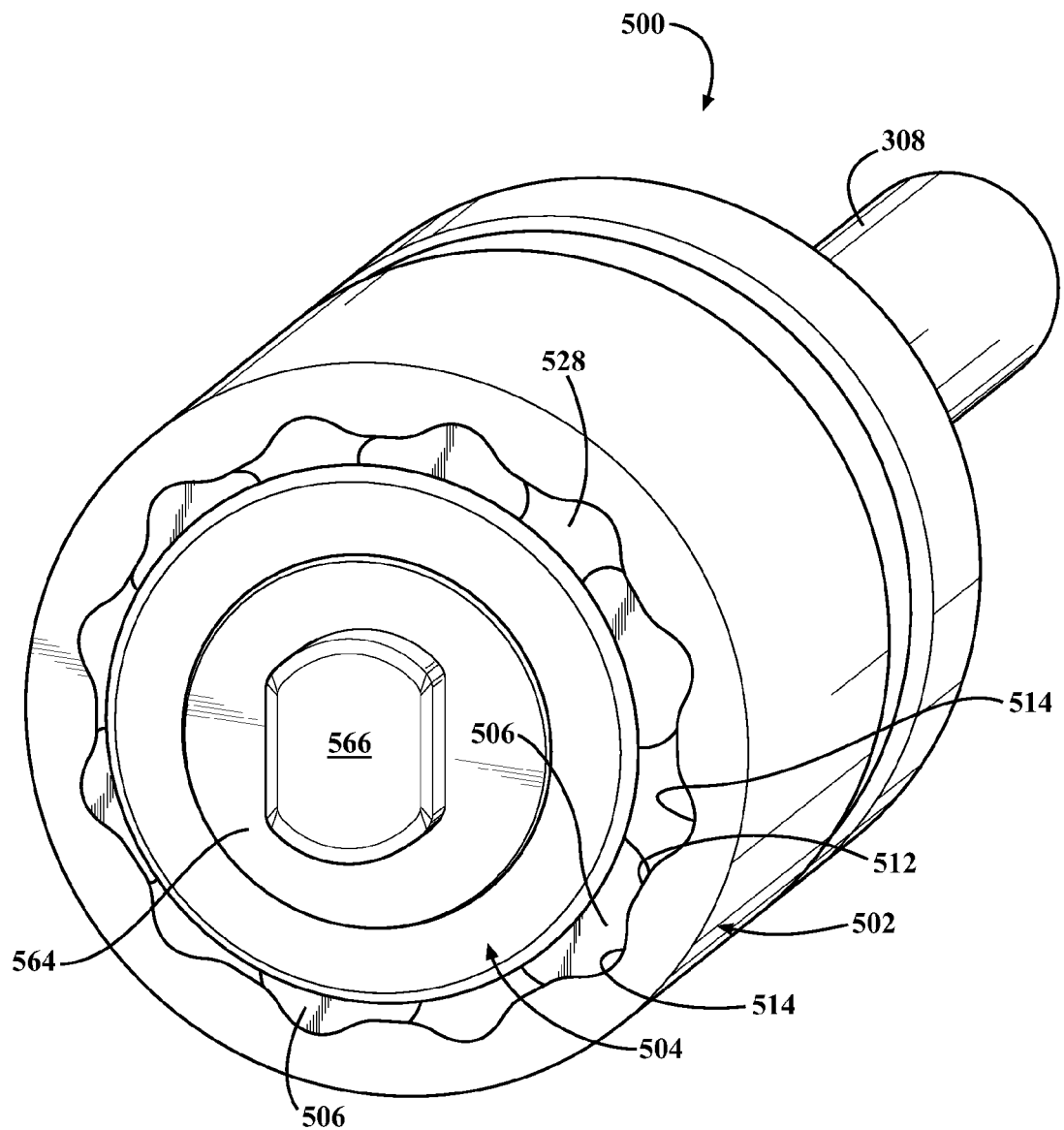
Figure 27C:
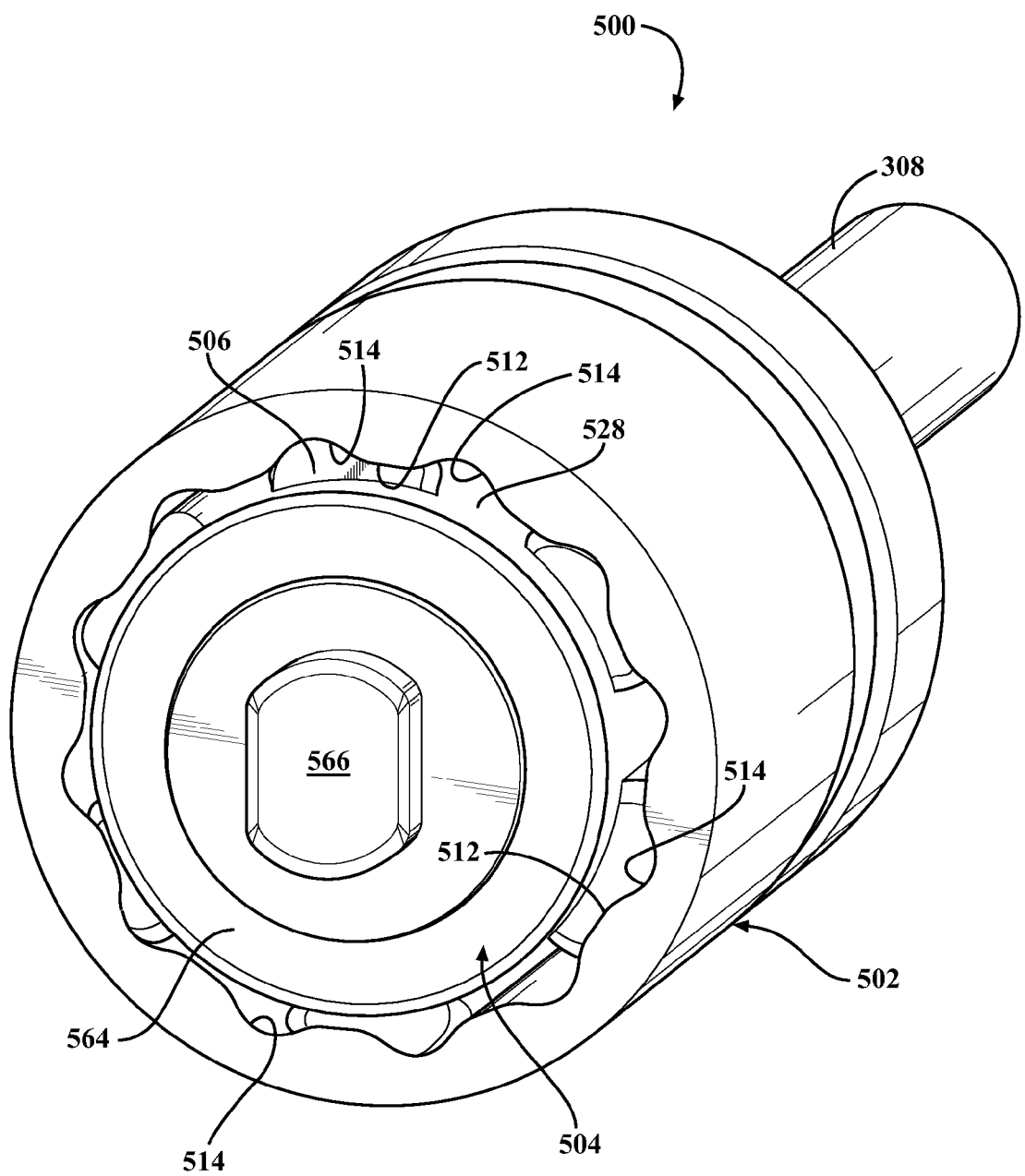
Figure 28:
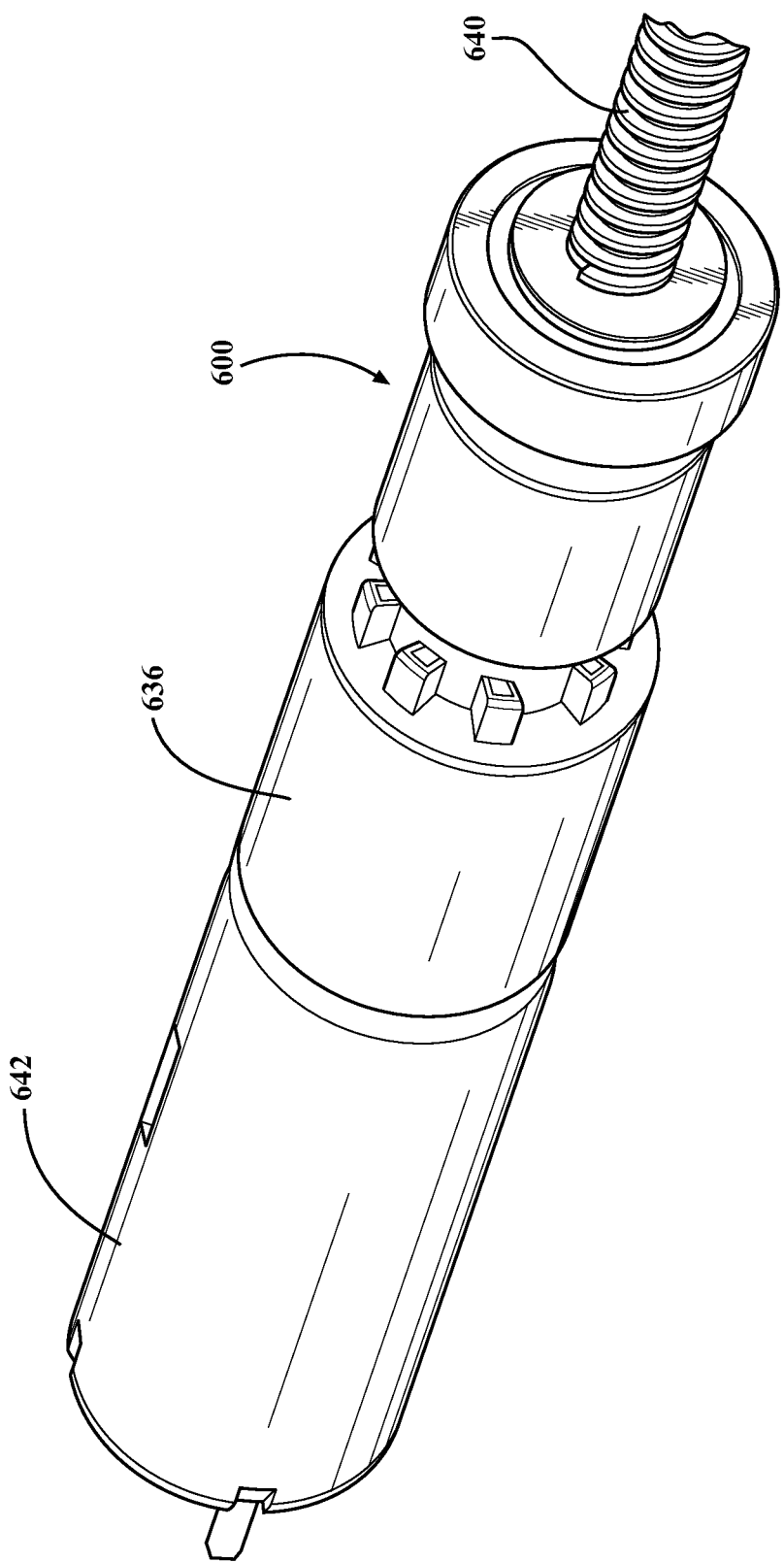
FIG. 28 is an assembled perspective view of an integrated flex coupling and slip clutch device in accordance with another aspect of the invention configured for use with an electromechanical strut, shown operably positioned in a power unit between the motor-gear assembly and a power screw.
Figure 29:
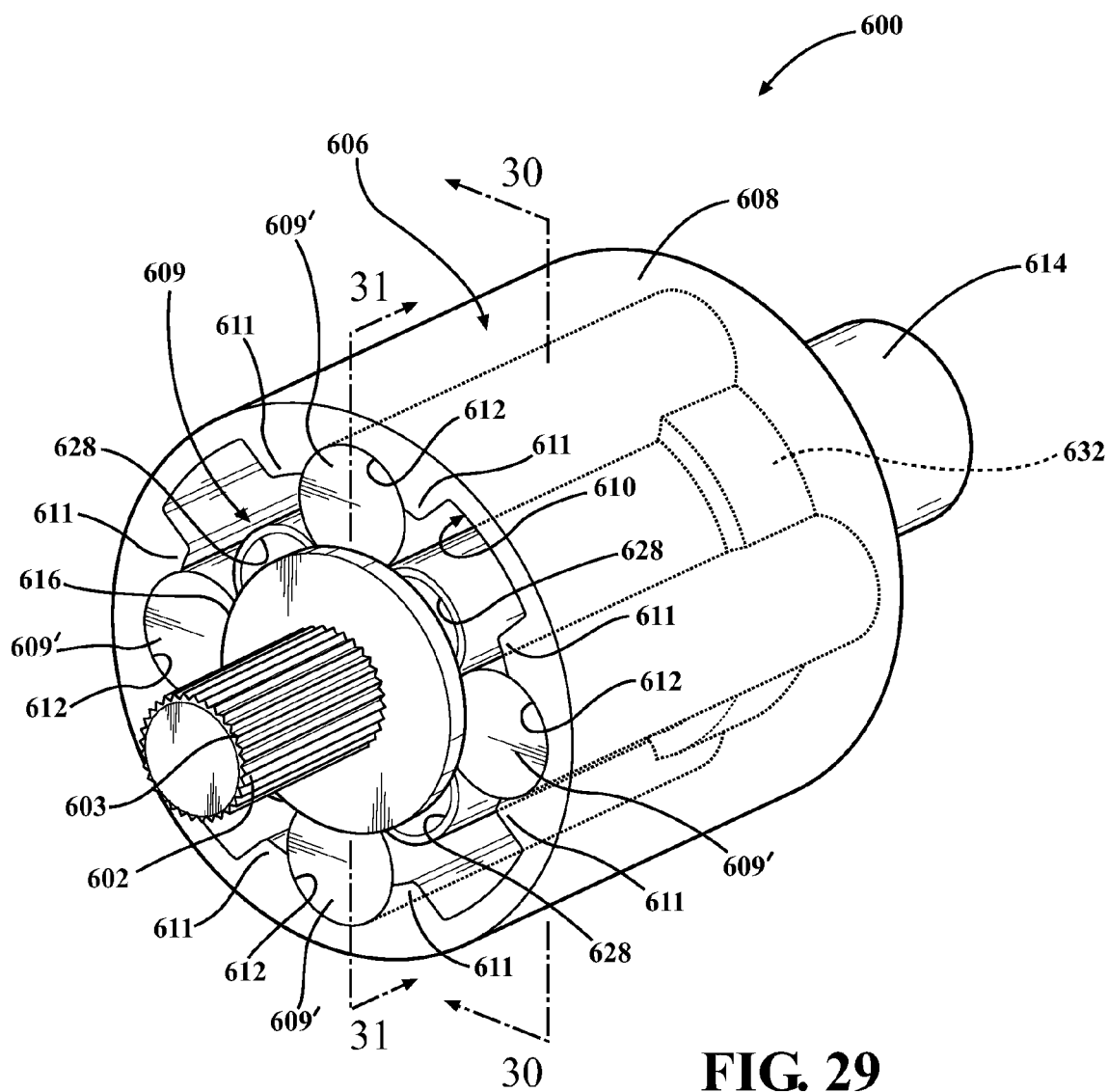
FIG. 29 is a perspective view of the integrated flex coupling and slip clutch device; of FIG. 28.
Figure 30:
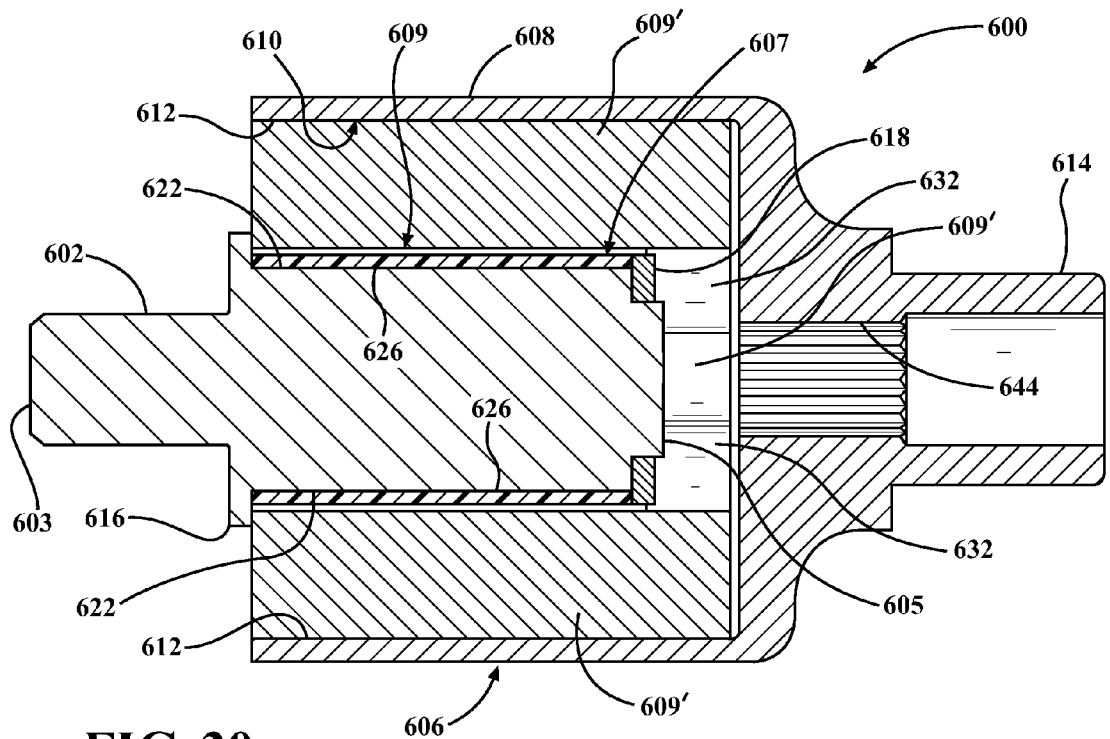
FIG. 30 is a cross-sectional view taken generally along the line 30-30 of FIG. 29.

Referring now to FIGS. 27A through 27C, the positioning of resilient plugs 506 relative to lobes 512 and recesses 514 within drive chamber 516 of first coupling member 502 will be detailed for establishing three (3) distinct states of operation. Clutch/coupling assembly 500 is shown with plugs 506 aligned within every other recess 514 in the Assembled or "unloaded" state of FIG. 27A. In this position, each plug 506 is retained in a generally cylindrical aperture defined by radially aligned slots 530 and recesses 514, and no torsional load is applied to attempt to rotate either of first and second coupling members relative to the other. In contrast, the relative positioning of the components of clutch/coupling assembly 500 is shown in FIG. 27B to define the drive or "LOADED" state of operation in which a torque transferring drive connection is established by plugs 506 between the first and second coupling members. Specifically, FIG. 27B shows first coupling member 502 is slightly indexed in a counterclockwise direction relative to plugs 506 and second coupling member 504. In this LOADED state, driven rotation of worm gearwheel 314 via electric motor 304 will result in driven rotation of power screw 308 through clutch/coupling assembly 500 without slip. However, if a condition occurs where an excessive torsional load is applied to the lift gate, then the slip or "OVERLOADED" state of operation is established to permit first coupling member 502 to angularly index or "ratchet" relative to plugs 506 and second coupling member

504. The position of the components of clutch/coupling assembly 500 in this state is clearly shown in FIG. 27C where lobes 512 have compressed plugs 506 sufficiently to permit first coupling member 502 to "ratchet" relative to and over the plugs 506 and relative to the second coupling member 504. This ratcheting action will continue to allow first coupling member 502 to slip unto the torsional load applied to assembly 500 is reduced below its slip torque value.

Clutch/coupling assembly 500 was identified to be applicable for use with power unit 302 associated with the offset electromechanical strut 100 of FIGS. 6 and 7. However, those skilled in this technological art will appreciate that the configuration of clutch/coupling assembly 500 allows its implementation into all types of electromechanical struts, especially all of the different variation disclosed herein, by way of example and without limitation. In addition, clutch/coupling assembly 500 could easily be revised in construction by one possessing ordinary skill in the art, upon viewing this disclosure, to provide a stand-alone version similar to that shown in FIGS. 19 through 23. While a particular number of lobes 512, retention slots 530 and resilient plugs 506 are shown, it is understood that any combination thereof facilitating both drive and slip states between first component 502 and second component 504 is within the scope of this disclosure.

Referring now to FIGS. 28 through 31, another plug-in or "stand-alone" version of a clutch/coupling assembly 600 is generally shown to include an input shaft 602 forming an first input coupling member, a resilient tubular slip component or member 609, a plurality of resilient flex components or members 609', a cylindrical housing 606 forming a second output coupling member in combination with an output shaft 614. The housing 606 includes a circular outer surface 608 and a non-circular inner surface 610. Non-circular inner surface 610 is configured in a sinusoidal or uniformly "scalloped" pattern to define a plurality of radially-inwardly extending lobes 611 interconnected by a plurality of valleys or recesses 612, which all extend longitudinally along the entire length of housing 606. In the particular embodiment shown, inner surface 610 is formed to include a plurality of eight (8) lobes 611 interconnected by a plurality of eight (8) recesses 612.

Input shaft 602 has a splined end 603 for operable connection to an output of a motor-gear assembly 636, which in turn is driven by an upstream motor 642, with the input shaft 602 having an opposite end 605 having an outer surface 607 defining a plurality of drive surfaces 620. Outer surface 607 is configured to include four (4) drive surfaces 620 so as to generally define a square with adjacent drive surfaces 620 intersecting at 270° to define a plurality of radiused or rounded corners 654 transitioning the adjacent drive surfaces 620 with one another. The drive surfaces 620 include recessed elongate pockets or scallops 622 extending lengthwise along the entirety of the drive surface between a radially outwardly extending flange 616 and a retention washer 618. The retention washer 618 can be fixed to the end 605 via any suitable mechanism, such as a rivet (not shown), by way of example and without limitation.

The resilient slip component 609 is preferably formed of spring grade steel, such as from 301 stainless steel, by way of example and without limitation. The slip component 609 is tubular, and is generally clover-shaped in lateral cross-section, thereby having a plurality of radially inwardly extending spring lobes 626 corresponding in number to the number of drive surfaces 620 on the input shaft 602. As such, a plurality of four (4) spring lobes 626 are provided equidistantly spaced circumferentially from one another about the inner periphery of the slip component 610. Each spring lobe 626 is spaced from an adjacent spring lobe 626 by a radially outwardly extending elongate pocket 628, thereby providing the clover-like shape. As such, an outer periphery of the slip component 609 has four (4) radially outwardly facing elongate channels 630 extending along the entire length of the slip component 609. The slip component 609 can be made from the desired thickness of steel and having a suitable length to provide the desire spring force. The thicker the spring material, the greater the spring force, and the long the spring material, the greater the spring force.

The resilient slip component 609 is disposed on the input shaft 602 with the spring lobes 626 being brought into interference against the drive surfaces 620 to provide a predetermined static friction between the abutting surfaces 626, 620. With the drive surfaces 620 being slightly scalloped periodically about the outer surface of the input shaft 602, the torque required to create a slip condition (relative indexing rotation of the spring lobes 626 over adjacent drive surfaces 620) is non-uniform, with an increase in torque being required to causes the spring lobes 626 to pass over the radiused corners 654. It should be recognized that a purely cylindrical drive surface is contemplated herein, wherein the torque required to create a slip condition would be generally constant or uniform. The slip torque required for the input shaft 602 to slip and rotate relative to the slip component 609 is calculated by the formula (Slip Torque=4*F*μ), where 4 represents the number of spring lobes 626, F represents the spring force exerted by the spring lobes 626 against the input shaft 602, and μ represents the coefficient of friction between the two abutting surfaces 626, 620. Accordingly, one skilled in the art will readily recognized how to manipulate the various variables to achieve the desired slip torque.

A plurality of four (4) flex components 609', also referred to as plugs, are shown associated with clutch/coupling assembly 600, with each of the flex components 609' being received and maintained in a separate one of the elongate channels 630 of the slip component 609 such that the plugs 609' are contained between, and in abutment with, the slip component 609 and the second coupling member housing 606. Each flex component 609' is a resilient and constitutes a deformable member fabricated into a right cylindrical configuration. The flex components 609' are shown as being a unitary flex unit having a base segment 632 from which the flex components 609' extend axially in a circumferentially, equidistantly spaced arrangement from one another. It should be recognized that the flex components 609' could be provided as separate components from one another, thereby doing away with the base segment 632, if desired. As mentioned, each plug 609' is disposed and maintained within a separate channel 630, and further, is disposed within a corresponding recess 612 of the second coupling member housing 606. Unlike the flex components discussed in prior embodiments, the flex components 609' do not provide for rotational slip, but rather, only provide for slight axial misalignment between the input shaft 602, the housing 606 and output shaft 614. The longer the plugs 609', the less freedom of axial misalignment, and thus, the assembly 600 takes on a stiffer axial rigidity, and vice versa.

The output shaft 614 is configured for fixed coupling to a lead screw 640 of a linear actuator, such as discussed above. In the embodiment shown, the output shaft 614 has a female splined through bore 644 for receipt of a male splined end (not shown) of the lead screw 640. Of course, other fixation mechanisms are contemplated herein.

Figure 31A:
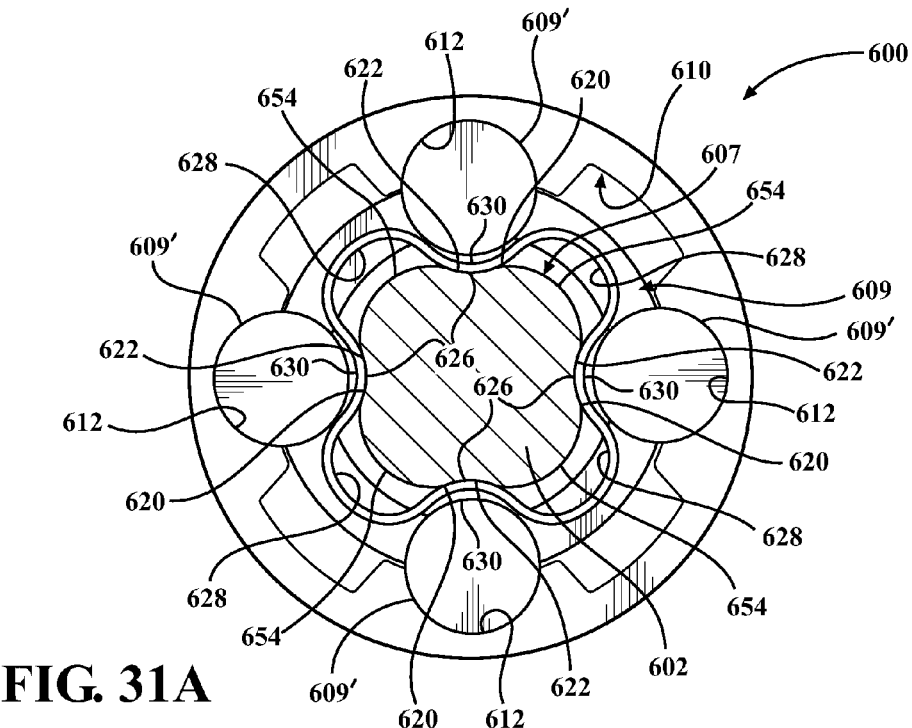
FIGS. 31A-31C illustrate assembled cross-sectional views taken generally along the line 31-31 of FIG. 29 showing the integrated flex coupling and slip clutch device in each of a neutral (unloaded) state (FIG. 31A), a drive (loaded) state (FIG. 31B), and a slip (over-loaded) state (FIG. 31C.
Figure 31B:
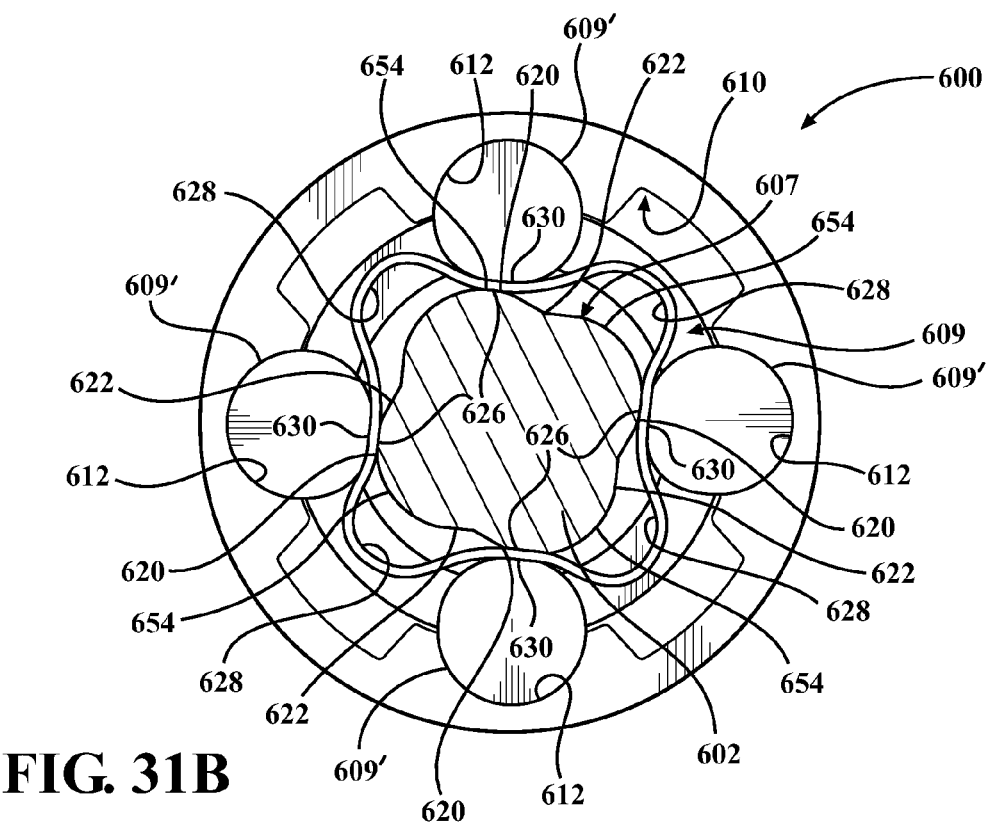
Figure 31C:
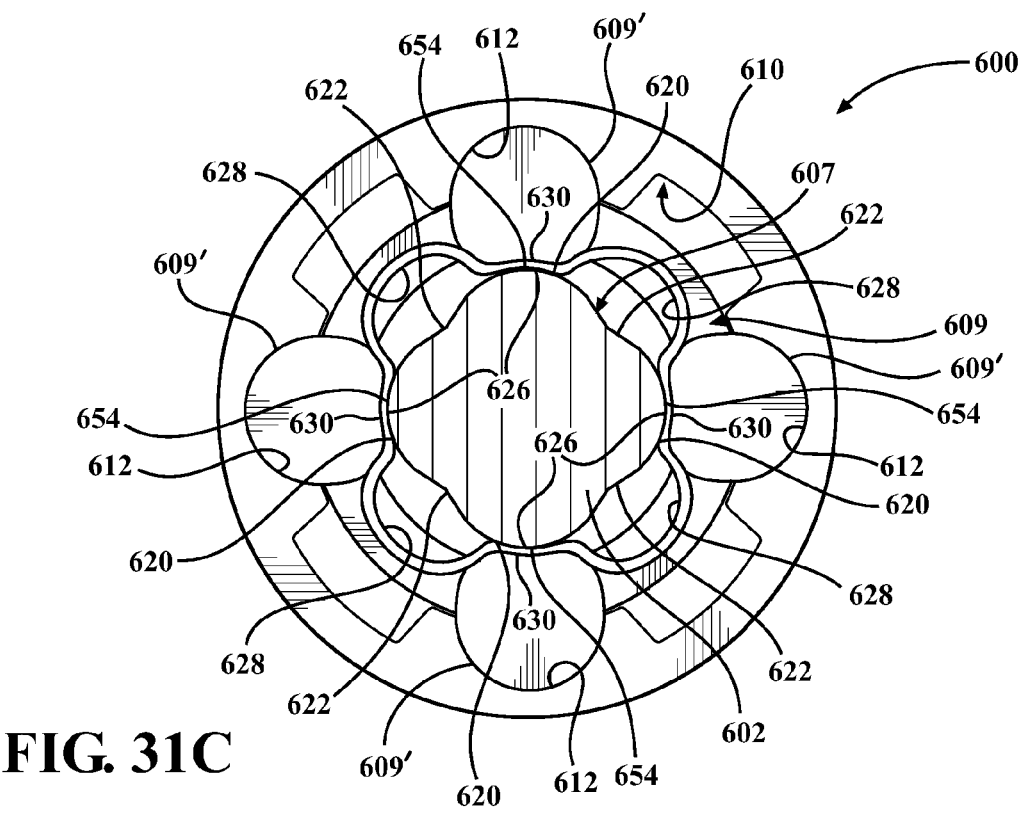

Clutch/coupling assembly 600 is configured to establish three distinct operating modes or states including a Neutral (Assembled) state, a Torque Transfer (Drive) state, and a Slip (Overload) state, as discussed above for the previous embodiments. Referring to FIGS. 31A through 31C, the positioning of lobes 626 of resilient slip component 609 relative to scallops 622 and corners 654 of input shaft, also referred to as first or input coupling member 602, will be detailed for establishing three (3) distinct states of operation. Clutch/coupling assembly 600 is shown with spring lobes 626 radially aligned within the first coupling member scallops 622 in the Assembled or "unloaded" state of FIG. 31A. In this position, each plug spring lobe 626 is retained in generally centered relation within the scallops 622, and no torsional load is applied to attempt to rotate either of first and second coupling members 602, 606 relative to the other. In contrast, the relative positioning of the components of clutch/coupling assembly 600 is shown in FIG. 31B to define the drive or "LOADED" state of operation in which a torque transferring drive connection is established by lobes 626 between the first and second coupling members. Specifically, FIG. 27B shows the corners 654 of the first coupling member 602 being slightly indexed in a counter-clockwise direction relative to spring lobes 626 and second coupling member 606. In this LOADED state, driven rotation of worm gearwheel 314 via electric motor 304 will result in driven rotation of power screw 308 through clutch/coupling assembly 600 without slip. However, if a condition occurs where an excessive torsional load is applied to the lift gate, then the slip or "OVERLOADED" state of operation is established to permit first coupling member 602 to angularly index or "ratchet" relative to spring lobes 626 and second coupling member 606. The position of the components of clutch/coupling assembly 600 in this state is clearly shown in FIG. 31C where corners 654 have compressed lobes 626 sufficiently to permit first coupling member 602 to "ratchet" relative to and over the spring lobes 626 and relative to the second coupling member 606. This ratcheting action will continue to allow first coupling member 602 to slip unto the torsional load applied to assembly 600 is reduced below its slip torque value.

Those skilled in the art will appreciate that clutch/coupling 300 (FIGS. 14-16), clutch/coupling assembly 300' (FIGS. 17-18), clutch/coupling 500 (FIGS. 24-27) and stand-alone clutch/coupling assembly 400 (FIGS. 14-23), stand-alone clutch/coupling assembly 600 (FIGS. 28-31) can be readily adapted for use as coupler 53 in FIG. 2, as coupler 53' in FIG. 4, as coupler 193 in FIG. 6, and as coupler 293 in FIG. 8. Thus, the clutch/coupling assemblies of the present disclosure are applicable for use in any type of power drive unit to interconnect an output of a motor-gear assembly and an input to a rotary component (i.e. power screw) and provide a plethora of functional characteristics including angular misalignment, radial misalignment, shock and load damping and slip torque therebetween. The connectors used between the first and second coupling can be male/female or any other arrangement facilitating use of flexible plugs to transfer torque and provide the damping and misalignment accommodating functions.

The above-described embodiments of the invention are intended to be examples of the present invention and alterations and modifications may be effected thereto, by those of skill in the art, without departing from the spirit of the invention.

What is claimed:

1. An electromechanical strut for moving a pivotal closure member between an open position and a closed position relative to a motor vehicle body, the electromechanical strut comprising:
   a housing operably connected to one of the pivotal closure member and motor vehicle body;
   a motor disposed in said housing;
   a power screw;
   a motor gear-assembly operably connecting said motor to said power screw;
   an extensible member slidably moveable relative to the housing and the power screw, said extensible member being operably connected to the other of the pivotal closure member and the motor vehicle body;
   a drive mechanism operable for converting rotary motion of said power screw into linear motion of said extensible member to move the extensible member between a retracted position relative to the housing and an extended position relative to the housing; and
   a clutch/coupling assembly operably coupling the motor-gear assembly to said power screw, wherein said clutch/coupling assembly includes a flex coupling device allowing axial misalignment between said motor gear-assembly and said power screw and a slip component allowing relative rotation between said motor gear assembly and said power screw into a common assembly.

2. The electromechanical strut of claim 1 wherein the clutch/coupling assembly includes a first coupling member, a second coupling member, and a plurality of flex members in biased engagement with portions of both of the first and second coupling members.

3. The electromechanical strut of claim 2 wherein the first coupling member is operably coupled to an output member of the motor-gear assembly, wherein the second coupling member is operably coupled to the power screw, and wherein the flex members are configured to establish a drive state and a slip state between the first and second coupling members that is dependent on the torque transmitted from one of the first and second coupling members to the other of the first and second coupling members.

4. The electromechanical strut of claim 2 wherein the first coupling member has a drive chamber defining a scalloped inner surface providing a plurality of lobes, wherein the second coupling member is disposed within the drive chamber and has a plurality of elongated lugs, adjacent lugs having sidewall portions spaced from one another by a retention slot, and wherein the flex members are resilient plugs preloaded in engagement with lobes and said sidewall portions so as to normally transfer torque without slip between the first and second coupling members while accommodating axial, concentric and angular misalignment there between.

5. The electromechanical strut of claim 4 wherein the resilient plugs deform to permit relative rotation between the first and second coupling members when a torque exceeding a predefined slip torque is exerted on one of the first and second coupling members.

6. The electromechanical strut of claim 4 wherein said lobes pass over said resilient plugs when a torque exceeds a predetermined slip torque.

7. The electromechanical strut of claim 1 wherein the clutch/coupling assembly includes a first coupling member, a second coupling member, and wherein said slip component is provided as a resilient tubular slip member having radially inwardly extending lobes spaced from one another by radially outwardly extending pockets; and a plurality of flex members, said flex members being in biased engagement with portions of said slip member and one of said first and second coupling members.

8. The electromechanical strut of claim 7 wherein said resilient tubular slip member is spring steel.

9. The electromechanical strut of claim 7 wherein the first coupling member is operably coupled to an output member of the motor-gear assembly, wherein the second coupling member is operably coupled to the power screw, and wherein the resilient tubular slip member is configured to establish a drive state and a slip state between the first and second coupling members that is dependent on the torque transmitted from one of the first and second coupling members to the other of the first and second coupling members, and wherein the flex members are configured to allow misalignment between the motor gear-assembly and said power screw.

10. The electromechanical strut of claim 9 wherein said first coupling member provides a plurality of drive surfaces, wherein said resilient tubular slip member engages said drive surfaces to prevent slip between said first coupling member and said second coupling member.

11. The electromechanical strut of claim 9 wherein said flex members are contained between said tubular slip member and said second coupling member.

12. The electromechanical strut of claim 11 wherein said tubular slip member has a plurality of radially outwardly facing elongate channels, wherein said flex members are maintained in said channels.

13. The electromechanical strut of claim 12 wherein said second coupling member has a non-circular inner surface providing plurality of radially inwardly extending lobes spaced from one another by recesses, each of said flex members being maintained in a separate one of said recesses.

14. An electromechanical strut for moving a pivotal lift gate between an open position and closed position relative to a motor vehicle body, the electromechanical strut comprising:
    a housing operably connected to one of the pivotal lift gate and the motor vehicle body;
    an extensible member operably and slidably mounted to the housing, the extensible member operably connected to the other of the pivotal lift gate and the motor vehicle body;
    a drive mechanism including a power screw driven by a motor-gear assembly for converting rotary motion of the power screw into linear motion of the extensible member to move the extensible member between a retracted position corresponding to the closed position of the pivotal lift gate and an extended position corresponding to the open position of the pivotal lift gate; and
    a clutch/coupling assembly operably disposed between an output member of the motor-gear assembly and the power screw, wherein the clutch/coupling assembly integrates a slip component and a resilient flex coupling device into a common assembly and provides a torque limiting function, a shock damping function, and a misalignment accommodating function.

15. The electromechanical strut of claim 14 further including a drive nut fixedly secured to the extensible member and threadedly engaging the power screw.

16. The electromechanical strut of claim 14 wherein the clutch/coupling assembly includes a first coupling member, a second coupling member, and a plurality of flex members in biased engagement with portions of both of the first and second coupling members.

17. The electromechanical strut of claim 16 wherein the first coupling member is coupled to an output member of the motor-gear assembly, wherein the second coupling member is coupled to the power screw, and wherein the flex members are configured to establish a drive state and a slip state between the first and second coupling members that is dependent on the torque transmitted from one of the first and second coupling members to the other of the first and second coupling members.

18. The electromechanical strut of claim 16 wherein the first coupling member has a drive chamber defining a scalloped inner surface configured to provide a plurality of lobes and recesses wherein the second coupling member is disposed within the drive chamber and has lugs configured to provide a plurality of retention slots, and wherein the plurality of flex members are resilient plugs configured to be preloaded into engagement with lobes and drive retention slots so as to normally transfer torque without slip between the first and second coupling members while accommodating axial concentric and angular misalignment there between.

19. The electromechanical strut of claim 14 wherein the clutch/coupling assembly includes a first coupling member, a second coupling member, and wherein said slip component is provided as a resilient tubular slip member, and a plurality of flex members allowing misalignment between said first coupling member and said second coupling member.

20. The electromechanical strut of claim 19 wherein said resilient tubular slip member is configured to establish a drive state and a slip state between the first and second coupling members that is dependent on the torque transmitted from one of the first and second coupling members to the other of the first and second coupling members.

21. The electromechanical strut of claim 20 wherein said first coupling member provides a plurality of drive surfaces, wherein said resilient tubular slip member engages said drive surfaces to prevent rotational slip between said first coupling member and said second coupling member in said drive state.

22. The electromechanical strut of claim 21 wherein said tubular slip member has a plurality of radially inwardly extending lobes engaging said drive surfaces and a plurality of radially outwardly facing elongate channels, wherein said flex members are maintained in said channels.

23. The electromechanical strut of claim 22 wherein said second coupling member has a non-circular inner surface providing plurality of radially inwardly extending lobes spaced from one another by recesses, each of said flex members being maintained in a separate one of said recesses.

24. The electromechanical strut of claim 19 wherein said flex members are contained between said tubular slip member and said second coupling member.

25. An electromechanical strut for moving a pivotal lift gate between an open position and closed position relative to a motor vehicle body, the electromechanical strut comprising:
    a housing operably connected to one of the pivotal lift gate and the motor vehicle body;
    an extensible member operably and slidably mounted to the housing, the extensible member operably connected to the other of the pivotal lift gate and the motor vehicle body;

a drive mechanism including a power screw driven by a motor-gear assembly for converting rotary motion of the power screw into linear motion of the extensible member to move the extensible member between a retracted position corresponding to the closed position of the pivotal lift gate and an extended position corresponding to the open position of the pivotal lift gate; and a clutch/coupling assembly operably disposed between the motor-gear assembly and the power screw, the clutch/coupling assembly including a first coupling member coupled for rotation with an output member of the motor-gear assembly, a second coupling member coupled for rotation with an input member of the power screw, a plurality of resilient flex members biased into engagement with at least one of the first and second coupling members and allowing axial misalignment between the output member of the motor-gear assembly and the input member of the power screw, and a slip component allowing relative rotation between the output member and the input member.

26. The electromechanical strut of claim 25 wherein said flex members are in biased engagement with portions of both of the first and second coupling members.

27. The electromechanical strut of claim 26 wherein said flex members are configured to establish a drive state and a slip state between the first and second coupling members that is dependent on the torque transmitted from one of the first and second coupling members to the other of the first and second coupling members.

28. The electromechanical strut of claim 26 wherein the first coupling member has a drive chamber defining a scalloped inner surface providing a plurality of lobes, wherein the second coupling member is disposed within the drive chamber and has a plurality of elongated lugs, adjacent lugs having sidewall portions spaced from one another by a retention slot, and wherein the flex members are resilient plugs preloaded in engagement with lobes and said sidewall portions so as to normally transfer torque without slip between the first and second coupling members while accommodating axial, concentric and angular misalignment therebetween.

29. The electromechanical strut of claim 28 wherein the resilient plugs deform to permit relative rotation between the first and second coupling members when a torque exceeding a predefined slip torque is exerted on one of the first and second coupling members.

30. The electromechanical strut of claim 28 wherein said lobes pass over said resilient plugs when a torque exceeds a predetermined slip torque.

31. The electromechanical strut of claim 25 wherein said slip component includes a resilient tubular slip member having radially inwardly extending lobes spaced from one another by radially outwardly extending pockets, wherein said plurality of flex members are in biased engagement with portions of said resilient tubular slip member and one of said first and second coupling members.

32. The electromechanical strut of claim 31 wherein said resilient tubular slip member is spring steel.

33. The electromechanical strut of claim 31 wherein the first coupling member is configured to establish a drive state and a slip state between the first and second coupling members that is dependent on the torque transmitted from one of the first and second coupling members to the other of the first and second coupling members, and wherein the flex members are configured to allow misalignment between the motor gear-assembly and said power screw.

34. The electromechanical strut of claim 33 wherein said first coupling member provides a plurality of drive surfaces, wherein said resilient tubular slip member engages said drive surfaces to prevent slip between said first coupling member and said second coupling member.

35. The electromechanical strut of claim 34 wherein the drive surfaces have lengthwise extending recessed scallops, said radially inwardly extending lobes disposed in said recessed scallops to increase the torque required to create relative rotation between the output member and the input member.

36. The electromechanical strut of claim 25 wherein said slip component includes a resilient tubular slip member and wherein said flex members are contained between said tubular slip member and said second coupling member.

37. The electromechanical strut of claim 36 wherein said tubular slip member has a plurality of radially outwardly facing elongate channels, wherein said flex members are maintained in said channels.

38. The electromechanical strut of claim 37 wherein said second coupling member has a non-circular inner surface providing plurality of radially inwardly extending lobes spaced from one another by recesses, each of said flex members being maintained in a separate one of said recesses.

39. The electromechanical strut of claim 25 wherein the clutch/coupling assembly is configured to integrate a flexible coupling and a slip clutch into a common assembly that is operable to accommodate misalignment between the output member of the motor-gear assembly and the input member of the power screw while permitting relative rotation therebetween in response to a torque exceeding a slip torque value.

40. The electromechanical strut of claim 25 wherein the first coupling member has a drive chamber defining a scalloped inner surface configured to provide a plurality of lobed drive surfaces, wherein the second coupling member is disposed within the drive chamber and has lugs configured to define a plurality of retention slots each having driven surfaces, and wherein the plurality of flex members is a plurality of resilient plugs configured to be preloaded into engagement with drive and driven surfaces so as to normally transfer torque without slip between the first and second coupling members while accommodating axial, concentric and angular misalignment therebetween.

41. The electromechanical strut of claim 40 wherein the resilient plugs deform to permit relative rotation between the first and second coupling members when a torque exceeding a predefined slip torque is exerted on one of the first and second coupling members.

* * * * *